US012097604B2

(12) United States Patent
Kamiya et al.

(10) Patent No.: US 12,097,604 B2
(45) Date of Patent: Sep. 24, 2024

(54) ELECTRIC POWER TOOL AND AUXILIARY HANDLE

(71) Applicant: MAKITA CORPORATION, Anjo (JP)

(72) Inventors: Takeshi Kamiya, Anjo (JP); Koji Takahagi, Anjo (JP); Tomohiko Imae, Anjo (JP); Jun Ueda, Anjo (JP); Yuta Araki, Anjo (JP); Hidenori Nagasaka, Anjo (JP)

(73) Assignee: MAKITA CORPORATION, Anjo (JP)

( * ) Notice: Subject to any disclaimer, the term of this patent is extended or adjusted under 35 U.S.C. 154(b) by 58 days.

(21) Appl. No.: 17/795,398

(22) PCT Filed: Mar. 2, 2021

(86) PCT No.: PCT/JP2021/007888
§ 371 (c)(1),
(2) Date: Jul. 26, 2022

(87) PCT Pub. No.: WO2021/192850
PCT Pub. Date: Sep. 30, 2021

(65) Prior Publication Data
US 2023/0356382 A1 Nov. 9, 2023

(30) Foreign Application Priority Data

Mar. 24, 2020 (JP) ................................ 2020-053315
Jan. 29, 2021 (JP) ................................ 2021-013474

(51) Int. Cl.
*B25F 5/00* (2006.01)
*B25F 5/02* (2006.01)

(52) U.S. Cl.
CPC .................................. *B25F 5/026* (2013.01)

(58) Field of Classification Search
CPC ..................................................... B25F 5/026
See application file for complete search history.

(56) References Cited

U.S. PATENT DOCUMENTS

2003/0089511 A1* 5/2003 Tsuneda .................. B25B 21/00 173/217
2011/0232933 A1* 9/2011 Kondo .................... B25B 21/00 173/217

(Continued)

FOREIGN PATENT DOCUMENTS

JP 2015-123521 A 7/2015
JP 5914809 B2 5/2016

OTHER PUBLICATIONS

May 18, 2021 International Search Report issued in Patent Application No. PCT/JP2021/007888.

(Continued)

*Primary Examiner* — Eyamindae C Jallow
(74) *Attorney, Agent, or Firm* — Oliff PLC

(57) ABSTRACT

A power tool receives a reaction force with an auxiliary handle attached to the power tool. An auxiliary handle attachable to a power tool includes a first arm, a second arm that fastens, together with the first arm, at least a part of the power tool located between the first arm and the second arm, a handle, a grip sensor that detects the handle being gripped with the first arm and the second arm fastening at least the part of the power tool in between, and a signal output unit that outputs, to the power tool, a grip signal indicating that the handle is gripped based on a detection signal from the grip sensor.

17 Claims, 36 Drawing Sheets

(56) References Cited

U.S. PATENT DOCUMENTS

| | | | | |
|---|---|---|---|---|
| 2013/0162188 | A1 | 6/2013 | Koeder | |
| 2014/0231113 | A1* | 8/2014 | Steurer | B25F 5/00 173/1 |
| 2015/0174753 | A1* | 6/2015 | Kamiya | B25F 5/02 16/426 |
| 2021/0331306 | A1* | 10/2021 | Ito | B25F 5/008 |

OTHER PUBLICATIONS

Sep. 22, 2022 International Preliminary Report on Patentability issued in Patent Application No. PCT/ JP2021/007888.

* cited by examiner

ELECTRIC POWER TOOL AND AUXILIARY HANDLE

FIELD

The present disclosure relates to a power tool and an auxiliary handle.

BACKGROUND

To machine a workpiece with a power tool, the power tool receives a tip tool on its output shaft. The power tool machines the workpiece with the rotating tip tool. The power tool may receive a reaction force during machining of the workpiece. An operator holds an auxiliary handle attached to the power tool to receive the reaction force acting on the power tool. Japanese Unexamined Patent Application Publication No. 2015-123521 describes an example auxiliary handle.

BRIEF SUMMARY

Technical Problem

One or more aspects of the present disclosure are directed to a power tool that receives a reaction force with an auxiliary handle attached to the power tool.

Solution to Problem

A first aspect of the present disclosure provides an auxiliary handle attachable to a power tool, the handle including:

- a first arm;
- a second arm configured to fasten, together with the first arm, at least a part of the power tool located between the first arm and the second arm;
- a handle;
- a grip sensor configured to detect the handle being gripped with the first arm and the second arm fastening at least the part of the power tool in between; and
- a signal output unit configured to output, to the power tool, a grip signal indicating that the handle is gripped based on a detection signal from the grip sensor.

A second aspect of the present disclosure provides a power tool to which an auxiliary handle is attachable, the power tool including:

- a motor;
- a housing including a motor compartment accommodating the motor;
- a gear case located in front of the motor compartment;
- an output shaft protruding frontward from the gear case and rotatable with a rotational force from the motor;
- an attachment sensor configured to detect the auxiliary handle being attached; and
- a controller configured to output a control signal to control rotation of the output shaft based on a detection signal from the attachment sensor.

Advantageous Effects

The power tool according to the above aspects of the present disclosure receives a reaction force with the auxiliary handle attached to the power tool.

DETAILED DESCRIPTION

Although one or more embodiments of the present disclosure will now be described with reference to the drawings, the present disclosure is not limited to the present embodiments. The components in the embodiments described below may be combined as appropriate. One or more components may be eliminated.

In the embodiments, the positional relationships between the components will be described using the directional terms such as right and left (or lateral), front and rear (or forward and backward), and up and down (or vertical). The terms indicate relative positions or directions with respect to the center of a power tool.

The power tool according to the embodiments is a vibration driver drill including a motor. In the embodiments, a direction parallel to a rotation axis AX of the motor is referred to as an axial direction for convenience. A direction radial from the rotation axis AX of the motor is referred to as a radial direction or radially for convenience. A direction about the rotation axis AX of the motor is referred to as a circumferential direction, circumferentially, or a rotation direction for convenience. A position nearer the rotation axis AX of the motor in the radial direction, or a radial direction toward the rotation axis AX of the motor, is referred to as radially inside or radially inward for convenience. A position farther from the rotation axis AX of the motor in the radial direction, or a radial direction away from the rotation axis AX, is referred to as radially outward for convenience. In the embodiments, the axial direction corresponds to the front-rear direction.

First Embodiment

Overview of Power Tool

Figure 1:
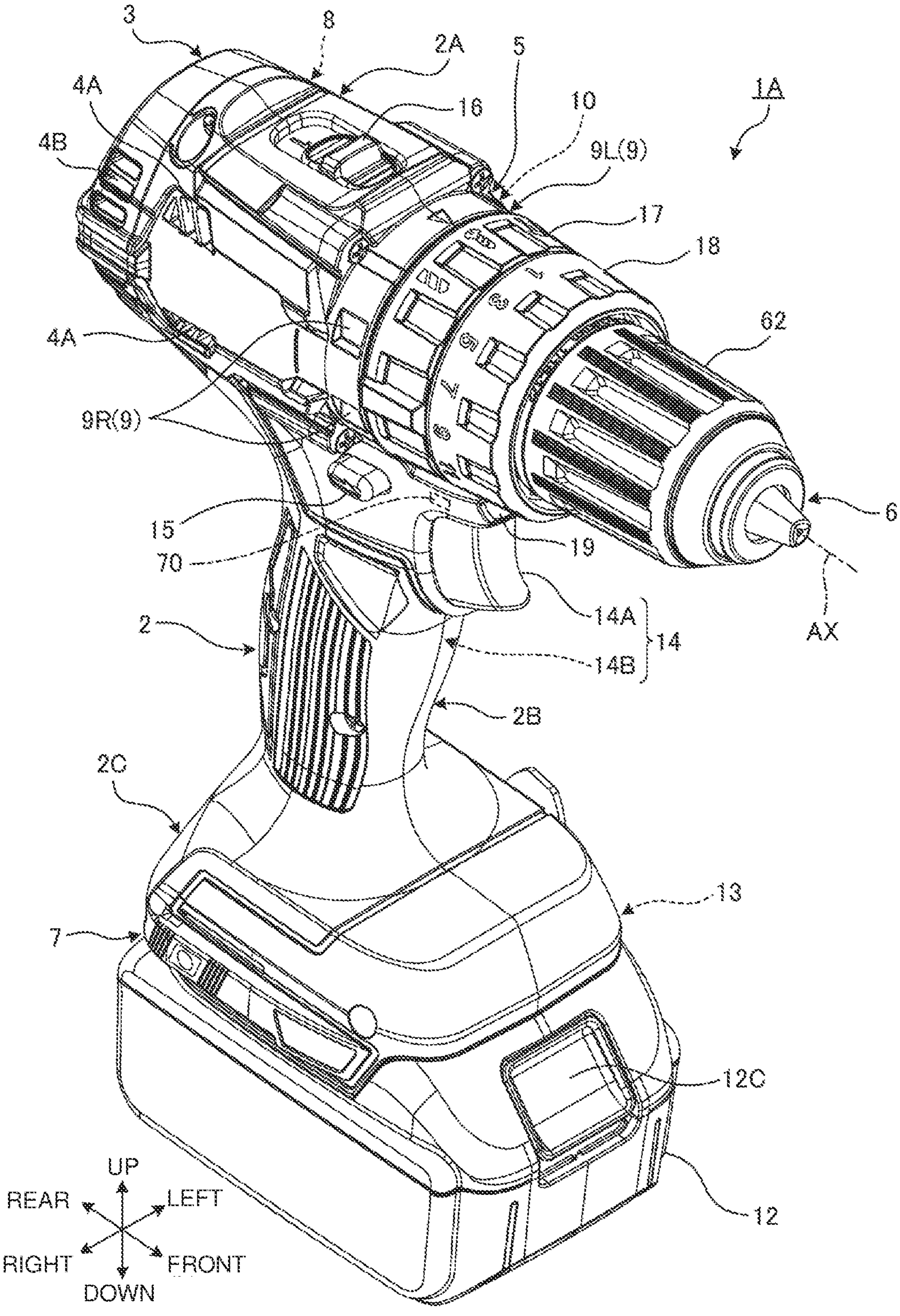
FIG. 1 is a perspective view of a power tool according to a first embodiment.

FIG. 1 is a perspective view of a power tool 1A according to the present embodiment. As shown in FIG. 1, the power tool 1A includes a housing 2, a rear cover 3, a gear case 5, an output shaft 6, a battery mount 7, a motor 8, a power transmission 10, a controller 13, a trigger switch 14, a forward-reverse switch lever 15, a speed switch lever 16, a mode change ring 17, a change ring 18, and a lamp 19.

The housing 2 is formed from a synthetic resin. The housing 2 includes a motor compartment 2A, a grip 2B, and a controller compartment 2C.

The motor compartment 2A accommodates the motor 8. The motor compartment 2A is cylindrical. The grip 2B is grippable by an operator. The grip 2B protrudes downward from a lower portion of the motor compartment 2A. The controller compartment 2C accommodates the controller 13. The controller compartment 2C is located below the grip 2B.

The rear cover 3 is connected to the rear of the motor compartment 2A to cover a rear opening of the motor compartment 2A. The rear cover 3 is formed from a synthetic resin.

The motor compartment 2A has inlets 4A. The rear cover 3 has outlets 4B. The outlets 4B are located behind the inlets 4A. The inlets 4A connect the inside and the outside of the housing 2. The outlets 4B connect the inside and the outside of the housing 2. The inlets 4A are located on the right and the left of the motor compartment. The outlets 4B are located on the right and the left of the rear cover 3. Air outside the housing 2 flows into an internal space of the housing 2 through the inlets 4A. This cools the motor 8. Air inside the housing 2 flows out of the housing 2 through the outlets 4B.

The gear case 5 accommodates the power transmission 10 including multiple gears. The gear case 5 is cylindrical. The power transmission 10 is located in an internal space of the gear case 5. The gear case 5 is located in front of the motor compartment 2A. The gear case 5 is formed from a metal such as aluminum.

The gear case 5 has engaging portions 9. The engaging portions 9 are located in side portions of the surface of the gear case 5. The engaging portions 9 in the present embodiment include left engaging portions 9L in a left portion of the gear case 5 and right engaging portions 9R in a right portion of the gear case 5. Each left engaging portion 9L has a recess on the left portion of the gear case 5. Each right engaging portion 9R has a recess on the right portion of the gear case 5.

The output shaft 6 receiving a tip tool rotates with a rotational force from the motor 8. The output shaft 6 includes a chuck 62 to hold the tip tool. The output shaft 6 protrudes frontward from the gear case 5.

The battery mount 7 is located below the controller compartment 2C. A battery 12 is attached to the battery mount 7 in a detachable manner. The battery 12 attached to the battery mount 7 powers the power tool 1A.

The battery 12 may be a secondary battery. The battery 12 in the present embodiment may be a rechargeable lithium-ion battery. The battery 12 includes a release button 12C. The release button 12C is operable to release the battery 12 fastened on the battery mount 7. The release button 12C is located on the front surface of the battery 12.

The motor 8 generates a rotational force for rotating the output shaft 6. The motor 8 rotates with power supplied from the battery 12. The power transmission 10 transmits the rotational force generated by the motor 8 to the output shaft 6. The output shaft 6 rotates with the rotational force transmitted from the motor 8 through the power transmission 10.

The controller 13 outputs a control signal for controlling the power tool 1A. The controller 13 is accommodated in the controller compartment 2C.

The trigger switch 14 is located on the grip 2B. The trigger switch 14 includes a trigger 14A and a switch body 14B. The trigger 14A protrudes frontward from the upper front of the grip 2B. The trigger 14A is operable by the operator to rotate the motor 8. The operator holding the grip 2B with one (right or left) hand operates the trigger 14A with fingers. The trigger 14A is movable in the front-rear direction. In response to an operation on the trigger 14A for moving backward, the motor 8 rotates.

The grip 2B has an internal space for accommodating the switch body 14B. The switch body 14B is located in the internal space of the grip 2B. In response to an operation on the trigger 14A, the switch body 14B outputs a trigger signal. The controller 13 allows the battery 12 to supply power to the motor 8 in response to the trigger signal output from the switch body 14B. This rotates the motor 8. The trigger 14A is operable to switch the motor 8 between the rotating state and the stopped state.

The forward-reverse switch lever 15 is located on an upper side surface of the grip 2B. The forward-reverse switch lever 15 is operable by the operator. The forward-reverse switch lever 15 is operable to switch the rotation direction of the motor 8. The operator operates the forward-reverse switch lever 15 to switch the rotation direction of the motor 8 between forward and reverse. This switches the rotation direction of the output shaft 6.

The speed switch lever 16 is located in an upper portion of the motor compartment 2A. The speed switch lever 16 is operable by the operator to switch the rotational speed of the output shaft 6. The speed switch lever 16 is movable in the front-rear direction. The speed switch lever 16 moves forward to switch the rotational speed of the output shaft 6 to a low-speed mode in which the rotational speed is at a first speed. The speed switch lever 16 moves backward to switch the rotational speed of the output shaft 6 to a high-speed mode in which the rotational speed is at a second speed higher than the first speed.

The mode change ring 17 is located in front of the gear case 5. The mode change ring 17 is operable by the operator to switch the operation mode of the power tool 1A. The mode change ring 17 is rotatable in a circumferential direction about the rotation axis AX. The mode change ring 17 rotates to switch the operation mode.

The operation mode of the power tool 1A includes a vibration mode and a non-vibration mode. In the vibration mode, the output shaft 6 vibrates in the front-rear direction. In the non-vibration mode, the output shaft 6 does not vibrate in the front-rear direction.

The non-vibration mode includes a clutch mode and a drill mode. In the clutch mode, transmission of a rotational force from the motor 8 to the output shaft 6 is disabled in response to a rotational load on the output shaft 6 reaching a release value. In the drill mode, transmission of a rotational force from the motor 8 to the output shaft 6 is enabled independently of a rotational load on the output shaft 6. The release value indicates a rotation load on the output shaft 6. The operator operates the mode change ring 17 to switch the operation mode between the vibration mode, the drill mode, and the clutch mode.

The change ring 18 is located in front of the mode change ring 17. The change ring 18 is operable by the operator to change the release value in the clutch mode. The change ring 18 is rotatable in the circumferential direction about the rotation axis AX. The change ring 18 rotates to change the release value in the clutch mode.

The lamp 19 is located at the upper front of the grip 2B. The lamp 19 emits illumination light that illuminates ahead of the power tool 1A. The lamp 19 includes, for example, a light-emitting diode (LED).

Overview of Internal Structure of Power Tool

Figure 2:
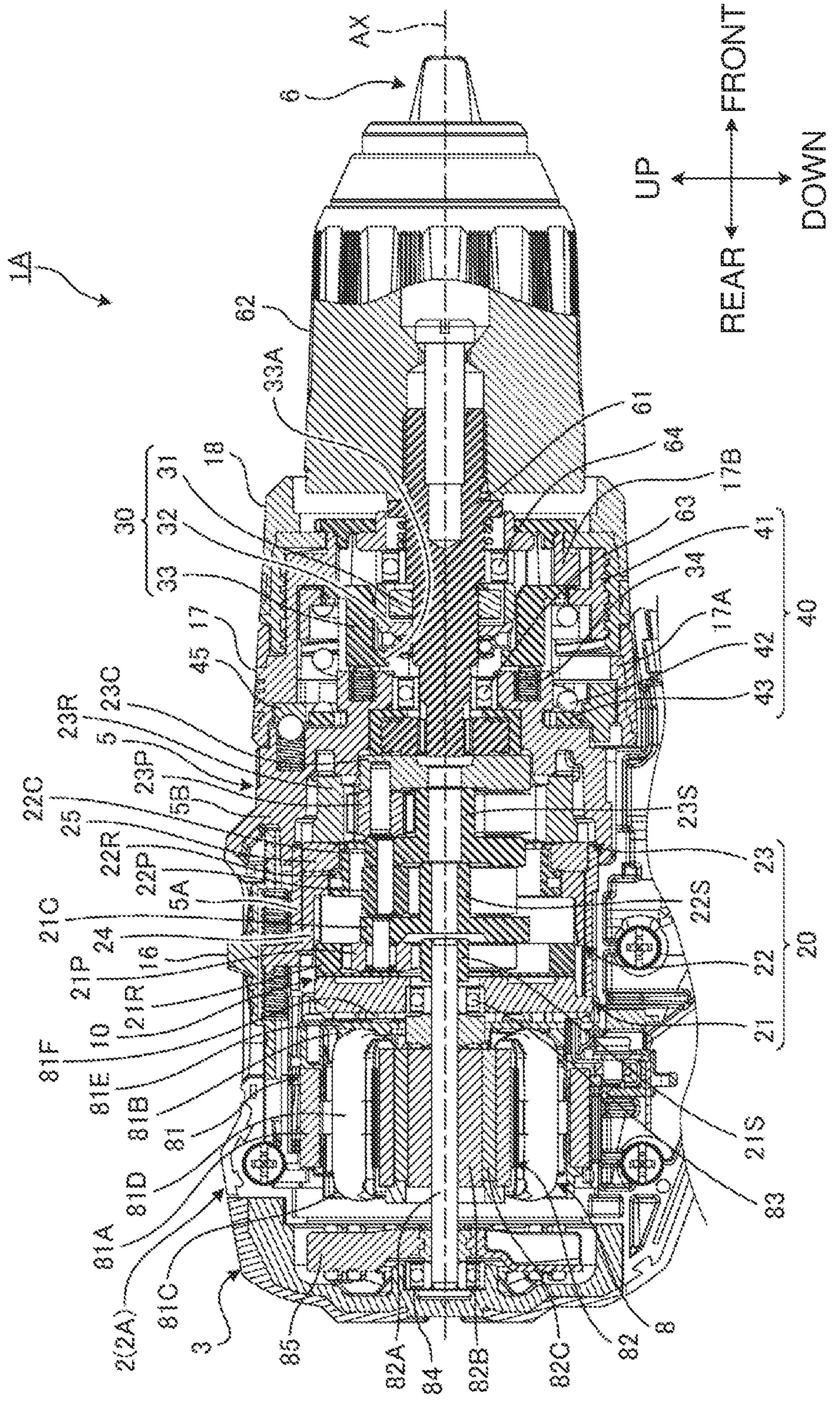
FIG. 2 is a partial sectional view of the power tool according to the first embodiment.

FIG. 2 is a sectional view of the power tool 1A according to the present embodiment. As shown in FIG. 2, the power tool 1A includes the motor 8, the power transmission 10, and the output shaft 6. The motor 8 is accommodated in the motor compartment 2A. The power transmission 10 is accommodated in the gear case 5. The output shaft 6 receives the tip tool.

The motor 8 generates a rotational force for rotating the output shaft 6. The motor 8 is an inner-rotor brushless motor. The motor 8 includes a cylindrical stator 81 and a rotor 82 located inside the stator 81. The motor 8 (rotor 82) has the rotation axis AX extending in the front-rear direction.

The stator 81 includes a stator core 81A, a front insulator 81B, a rear insulator 81C, multiple coils 81D, a sensor circuit board 81E, and a connection wire 81F. The stator core 81A includes multiple steel plates stacked on one another. The front insulator 81B is located in front of the stator core 81A. The rear insulator 81C is located behind the stator core 81A. The coils 81D are wound around the stator core 81A with the front insulator 81B and the rear insulator 81C in between. The sensor circuit board 81E is attached to the front insulator 81B. The connection wire 81F is supported by the front insulator 81B. The sensor circuit board 81E includes multiple rotation detectors to detect rotation of the rotor 82. The connection wire 81F connects the coils 81D with one another.

The rotor 82 includes a rotor shaft 82A, a rotor core 82B, and multiple permanent magnets 82C. The rotor core 82B is cylindrical and surrounds the rotor shaft 82A. The permanent magnets 82C are held by the rotor core 82B. The rotor core 82B is fixed to the rotor shaft 82A. The rotor shaft 82A has a front portion supported by a bearing 83 to allow rotation. The rotor shaft 82A has a rear portion supported by a bearing 84 to allow rotation.

A centrifugal fan 85 is mounted on a part of the rotor shaft 82A between the bearing 84 and the stator 81. The outlets 4B surround parts of the centrifugal fan 85. As the rotor shaft 82A rotates and the centrifugal fan 85 rotates, air inside the motor compartment 2A is discharged out of the motor compartment 2A through the outlets 4B.

The rotor shaft 82A receives a pinion gear 21S on its front end. The rotor shaft 82A is connected to the power transmission 10 with the pinion gear 21S.

The gear case 5 includes a first gear case 5A and a second gear case 5B. The second gear case 5B is located in front of the first gear case 5A. The second gear case 5B includes the engaging portions 9 on its surface.

The power transmission 10 transmits the rotational force generated by the motor 8 to the output shaft 6. The power transmission 10 includes a reducer 20, a vibrator 30, and a clutch assembly 40.

The reducer 20 reduces rotation of the rotor shaft 82A and rotates the output shaft 6 at a lower rotational speed than the rotor shaft 82A.

The reducer 20 includes a first planetary gear assembly 21, a second planetary gear assembly 22, and a third planetary gear assembly 23. The second planetary gear assembly 22 is located in front of the first planetary gear assembly 21. The third planetary gear assembly 23 is located in front of the second planetary gear assembly 22.

The first planetary gear assembly 21 includes multiple planetary gears 21P, a first carrier 21C, and an internal gear 21R. The planetary gears 21P surround the pinion gear 21S. The first carrier 21C supports the planetary gears 21P. The internal gear 21R surrounds the planetary gears 21P.

The second planetary gear assembly 22 includes a sun gear 22S, multiple planetary gears 22P, a second carrier 22C, and an internal gear 22R. The planetary gears 22P surround the sun gear 22S. The second carrier 22C supports the planetary gears 22P. The internal gear 22R surrounds the planetary gears 22P. The sun gear 22S is located in front of the first carrier 21C. The sun gear 22S has a smaller diameter than the first carrier 21C. The sun gear 22S is integral with the first carrier 21C. The sun gear 22S and the first carrier 21C rotate together.

The third planetary gear assembly 23 includes a sun gear 23S, multiple planetary gears 23P, a third carrier 23C, and an internal gear 23R. The planetary gears 23P surround the sun gear 23S. The third carrier 23C supports the planetary gears 23P. The internal gear 23R surrounds the planetary gears 23P. The sun gear 23S is located in front of the second carrier 22C. The sun gear 23S has a smaller diameter than the second carrier 22C. The sun gear 23S is integral with the second carrier 22C. The sun gear 23S and the second carrier 22C rotate together.

The rotation axis AX of the rotor shaft 82A corresponds to the rotation axes of the first carrier 21C, the second carrier 22C, and the third carrier 23C.

The reducer 20 includes a speed switch ring 24 and a connection ring 25. The speed switch ring 24 is connected to the speed switch lever 16. The connection ring 25 is located in front of the speed switch ring 24. The connection ring 25 is fixed to the inner surface of the first gear case 5A.

The speed switch lever 16 is connected to the internal gear 22R with the speed switch ring 24. As the speed switch lever 16 moves in the front-rear direction, the internal gear 22R moves inside the first gear case 5A in the front-rear direction. The internal gear 22R, meshing with the planetary gears 22P, is movable in the front-rear direction.

As the speed switch lever 16 moves forward, the internal gear 22R moves forward. The internal gear 22R then comes in contact with the connection ring 25. This restricts rotation of the internal gear 22R.

As the speed switch lever 16 moves backward, the internal gear 22R moves backward. The internal gear 22R then separates from the connection ring 25. This allows rotation of the internal gear 22R.

The internal gear 22R moves forward to mesh with the planetary gears 22P alone. The internal gear 22R moves backward to mesh with both the planetary gears 22P and the first carrier 21C.

When the rotor shaft 82A rotates with the internal gear 22R having moved forward, the pinion gear 21S rotates, and the planetary gears 21P revolve about the pinion gear 21S. The revolving planetary gears 21P rotate the first carrier 21C and the sun gear 22S at a rotational speed lower than the rotational speed of the rotor shaft 82A. As the sun gear 22S rotates, the planetary gears 22P revolve about the sun gear 22S. The revolving planetary gears 22P rotate the second carrier 22C and the sun gear 23S at a rotational speed lower than the rotational speed of the first carrier 21C. When the motor 8 is driven with the internal gear 22R having moved forward, both the first planetary gear assembly 21 and the second planetary gear assembly 22 operate for rotation reduction, causing the second carrier 22C and the sun gear 23S to rotate in the low-speed mode.

When the rotor shaft 82A rotates as driven by the motor 8 with the internal gear 22R having moved backward, the pinion gear 21S rotates, and the planetary gears 21P revolve about the pinion gear 21S. The revolving planetary gears 21P rotate the first carrier 21C and the sun gear 22S at a rotational speed lower than the rotational speed of the rotor shaft 82A. The internal gear 22R having moved backward meshes with both the planetary gears 22P and the first carrier 21C and thus rotates together with the first carrier 21C. As the internal gear 22R rotates, the planetary gears 22P revolve at the same revolution speed as the rotational speed of the internal gear 22R. The revolving planetary gears 22P rotate the second carrier 22C and the sun gear 23S at the same rotational speed as the first carrier 21C. When the motor 8 is driven with the internal gear 22R having moved backward, the first planetary gear assembly 21 operates for rotation reduction without the second planetary gear assembly 22 operating for rotation reduction, thus causing the second carrier 22C and the sun gear 23S to rotate in the high-speed mode.

As the second carrier 22C and the sun gear 23S rotate, the planetary gears 23P revolve about the sun gear 23S. This causes the third carrier 23C to rotate.

The output shaft 6 receiving the tip tool rotates. The output shaft 6 includes a spindle 61 and the chuck 62. The chuck 62 is connected to the front of the spindle 61.

The spindle 61 is connected to the third carrier 23C. As the third carrier 23C rotates, the spindle 61 rotates. The rotation axis of the spindle 61 corresponds to the rotation axis AX of the motor 8.

The spindle 61 is supported by the bearings 63 and 64 to allow rotation. The spindle 61, supported by the bearings 63 and 64, is movable in the front-rear direction.

The chuck 62 holds the tip tool. The chuck 62 is connected to the front of the spindle 61. The chuck 62 rotates as the spindle 61 rotates. The chuck 62 rotates while holding the tip tool.

The vibrator 30 vibrates the output shaft 6 in the front-rear direction. The vibrator 30 includes a first cam 31, a second cam 32, and a vibration switch lever 33.

The first cam 31 surrounds the spindle 61. The first cam 31 is fixed to the spindle 61. The first cam 31 rotates together with the spindle 61. The first cam 31 includes cam teeth on its rear surface.

The second cam 32 is located behind the first cam 31. The second cam 32 surrounds the spindle 61. The second cam 32 is rotatable relative to the spindle 61. The second cam 32 includes cam teeth on its front surface. The cam teeth on the front surface of the second cam 32 mesh with the cam teeth on the rear surface of the first cam 31. The second cam 32 includes a tab on its rear surface.

The vibration switch lever 33 switches between the vibration mode and the non-vibration mode. In the vibration mode, the spindle 61 vibrates in the front-rear direction. In the non-vibration mode, the spindle 61 does not vibrate in the front-rear direction. The vibration switch lever 33 is movable in the front-rear direction. The vibration switch lever 33 moves in the front-rear direction to switch the operation mode between the vibration mode and the non-vibration mode.

The mode change ring 17 is connected to the vibration switch lever 33. The operator operates the mode change ring 17 to move the vibration switch lever 33 in the front-rear direction. In response to an operation on the mode change ring 17, the operation mode is switched between the vibration mode and the non-vibration mode.

In the vibration mode, the second cam 32 is restricted from rotating. In the non-vibration mode, the second cam 32 is rotatable. With the vibration switch lever 33 having moved forward, the second cam 32 is restricted from rotating to switch the operation mode to the vibration mode. With the vibration switch lever 33 having moved backward, the second cam 32 becomes rotatable to switch the operation mode to the non-vibration mode.

In the vibration mode, the vibration switch lever 33 having moved forward is at least partially in contact with the second cam 32. This restricts rotation of the second cam 32. When the motor 8 rotates in this state, the first cam 31 fixed to the spindle 61 rotates while being in contact with the cam teeth on the second cam 32. The spindle 61 thus rotates while vibrating in the front-rear direction.

In the non-vibration mode, the vibration switch lever 33 having moved backward separates from the second cam 32. This allows rotation of the second cam 32. When the motor 8 rotates in this state, the second cam 32 rotates together with the first cam 31 and the spindle 61. The spindle 61 thus rotates without vibrating in the front-rear direction.

The vibration switch lever 33 surrounds the first cam 31 and the second cam 32. The vibration switch lever 33 includes an opposing portion 33A facing the rear surface of the second cam 32. The opposing portion 33A protrudes radially inward from the rear of the vibration switch lever 33.

Coil springs 34 are located behind the vibration switch lever 33. The coil springs 34 generate an urging force for moving the vibration switch lever 33 forward.

The mode change ring 17 includes an operation ring 17A and a cam ring 17B. The operation ring 17A is operable by the operator. The cam ring 17B is connected to the operation ring 17A. The cam ring 17B is located radially inward from the operation ring 17A. The cam ring 17B has a rear surface at least partially in contact with the front surface of the vibration switch lever 33.

The cam ring 17B has a recess on a portion of its rear surface. The mode change ring 17 rotates with the vibration switch lever 33 receiving an elastic force from the coil springs 34, placing a front portion of the vibration switch lever 33 into or out of the recess on the cam ring 17B.

The vibration switch lever 33 with the front portion received in the recess on the cam ring 17B moves forward and causes the opposing portion 33A of the vibration switch lever 33 to come in contact with the tab on the rear surface of the second cam 32. This switches the operation mode to the vibration mode in which the second cam 32 is restricted from rotating.

The vibration switch lever 33 with the front portion out of the recess on the cam ring 17B moves backward and causes the opposing portion 33A of the vibration switch lever 33 to separate from the tab on the rear surface of the second cam 32. This switches the operation mode to the non-vibration mode in which the second cam 32 is rotatable.

The clutch assembly 40 disables transmission of a rotational force from the motor 8 to the output shaft 6 in response to the rotational load on the output shaft 6 reaching the release value.

The clutch assembly 40 includes a spring holder 41, a coil spring 42, a washer 43, a pressure pin (not shown), and a coupling ring 45.

The spring holder 41 holds the coil spring 42. The spring holder 41 is movable in the front-rear direction. The spring holder 41 has an external thread. The external thread is engaged with an internal thread on the change ring 18. The change ring 18 rotates to move the spring holder 41 in the front-rear direction.

The coil spring 42 generates an urging force for moving the internal gear 23R in the third planetary gear assembly 23 backward. The rear end of the coil spring 42 is in contact with the washer 43. The coil spring 42 generates an urging force for moving the internal gear 23R backward through the washer 43 and the pressure pin.

The washer 43 is located behind the coil spring 42. The washer 43 is movable in the front-rear direction. The washer 43 is rotatable. The washer 43 surrounds an inner cylinder in the second gear case 5B. The washer 43 surrounding the inner cylinder in the second gear case 5B is rotatable and movable in the front-rear direction.

The pressure pin is located behind the washer 43. The pressure pin is in contact with the front surface of the internal gear 23R in the third planetary gear assembly 23. The internal gear 23R includes a clutch cam on its front surface. The pressure pin is engageable with the clutch cam in the internal gear 23R.

The coil spring 42 generates an urging force for pressing the pressure pin against the front surface of the internal gear 23R. The pressure pin is pressed against the internal gear 23R to cause engagement between the clutch cam in the internal gear 23R and the pressure pin, and thus the internal gear 23R is restricted from rotating. In other words, the internal gear 23R is restricted from rotating under the urging force from the coil spring 42.

When the rotational load on the output shaft 6 is lower than the urging force applied from the coil spring 42 to the internal gear 23R, the pressure pin cannot move over the clutch cam in the internal gear 23R and remains engaged with the clutch cam in the internal gear 23R. This restricts rotation of the internal gear 23R. The motor 8 is driven in this state to rotate the spindle 61.

In response to the rotational load on the output shaft 6 exceeding the urging force applied from the coil spring 42 to the internal gear 23R, the pressure pin moves over the clutch cam in the internal gear 23R and is disengaged from the clutch cam in the internal gear 23R. This allows rotation of the internal gear 23R. When the motor 8 is driven in this state, the internal gear 23R rotates without engagement, and the spindle 61 does not rotate.

As described above, when the rotational load on the output shaft 6 is lower than the urging force applied from the coil spring 42 to the internal gear 23R, the internal gear 23R despite being in a rotatable state is restricted from rotating under an elastic force from the coil spring 42. In response to the rotational load on the output shaft 6 exceeding the urging force applied from the coil spring 42 to the internal gear 23R, the internal gear 23R in a rotatable state rotates without engagement. This disables transmission of a rotational force from the motor 8 to the output shaft 6.

In response to an operation on the change ring 18, the spring holder 41 moves in the front-rear direction. This changes the length (compression amount) of the coil spring 42. More specifically, the spring holder 41 moves to change the elastic force applied from the coil spring 42 and thus to change the urging force applied to the internal gear 23R. The release value is thus set for disabling power transmission to the output shaft 6.

The coupling ring 45 surrounds the washer 43. The washer 43 includes a protrusion on its outer surface. The coupling ring 45 has a recess on its inner surface to receive the protrusion on the washer 43. With the protrusion on the washer 43 aligned with the recess on the coupling ring 45 in the rotation direction, the washer 43 is movable in the front-rear direction. With the protrusion on the washer 43 received in the recess on the coupling ring 45, the washer 43 is movable together with the coupling ring 45.

As the mode change ring 17 rotates, the coupling ring 45 can rotate together with the washer 43 and the operation ring 17A.

The second gear case 5B includes a forward-movement restrictor for restricting the washer 43 from moving forward. When the washer 43 is restricted from moving forward, the pressure pin engaged with the clutch cam in the internal gear 23R is also restricted from moving forward.

Switching of Operation Mode

In response to an operation on the mode change ring 17, the operation mode of the power tool 1A is changed. The operation mode includes the drill mode, the clutch mode, and the vibration mode.

In the drill mode, the output shaft 6 does not vibrate in the front-rear direction, and the clutch assembly 40 does not disable transmission of a rotational force. For example, the drill mode is selected for cutting a hole in a workpiece with the tip tool. The drill mode is included in the non-vibration mode.

In the clutch mode, the output shaft 6 does not vibrate in the front-rear direction, and the clutch assembly 40 disables transmission of a rotational force. For example, the clutch mode is selected for fastening a screw into a workpiece with the tip tool. The clutch mode is included in the non-vibration mode.

In the vibration mode, the output shaft 6 vibrates in the front-rear direction, and the clutch assembly 40 does not disable transmission of a rotational force. For example, the vibration mode is selected for cutting a hole in a workpiece with the tip tool.

To set the drill mode, the operator rotates the mode change ring 17 to a first rotational position. In response to an operation on the mode change ring 17, the cam ring 17B rotates. This rotates the coupling ring 45 and the washer 43. The cam ring 17B and the washer 43 are at the first rotational position.

With the washer 43 at the first rotational position, the forward-movement restrictor in the second gear case 5B is engaged with the washer 43 to restrict the washer 43 and the pressure pin from moving forward. The pressure pin restricted from moving forward is engaged with the clutch cam in the internal gear 23R.

Although the internal gear 23R is driven to rotate by the motor 8, the pressure pin is restricted from moving forward and thus remains engaged with the clutch cam in the internal gear 23R. More specifically, the pressure pin is restricted from moving forward and thus cannot move over the clutch cam in the internal gear 23R. This thus restricts rotation of the internal gear 23R. In this state, the output shaft 6 rotates with the rotational force transmitted from the motor 8. Thus, the output shaft 6 rotates independently of the magnitude of a rotational load on the output shaft 6.

With the cam ring 17B at the first rotational position, the vibration switch lever 33 has the front portion out of the recess on the cam ring 17B and is at the rear in the movable range. Thus, the opposing portion 33A of the vibration switch lever 33 separates from the second cam 32. The second cam 32 is rotatable together with the first cam 31 and the spindle 61. The output shaft 6 does not vibrate in the front-rear direction.

To set the clutch mode, the operator rotates the mode change ring 17 to a second rotational position. In response to an operation on the mode change ring 17, the cam ring 17B rotates. This rotates the coupling ring 45 and the washer 43. The cam ring 17B and the washer 43 are at the second rotational position.

With the washer 43 at the second rotational position, the forward-movement restrictor in the second gear case 5B is engaged with the washer 43, and the washer 43 and the pressure pin are movable forward. In this state, the pressure pin is engaged with the clutch cam in the internal gear 23R. The pressure pin is pressed against the clutch cam in the internal gear 23R under an urging force from the coil spring 42.

When the rotational load on the output shaft 6 is lower than the urging force applied from the coil spring 42 to the internal gear 23R with the internal gear 23R driven to rotate by the motor 8, the pressure pin cannot move over the clutch cam in the internal gear 23R. Thus, the pressure pin remains engaged with the clutch cam in the internal gear 23R. This restricts rotation of the internal gear 23R. The motor 8 rotates in this state to rotate the output shaft 6.

In response to the rotational load on the output shaft 6 exceeding the urging force applied from the coil spring 42 to the internal gear 23R, the pressure pin moves over the clutch cam in the internal gear 23R. Thus, the pressure pin is disengaged from the clutch cam in the internal gear 23R. This allows rotation of the internal gear 23R. When the motor 8 is driven in this state, the internal gear 23R rotates without engagement, and transmission of a rotational force to the output shaft 6 is disabled. The output shaft 6 does not rotate.

With the cam ring 17B at the second rotational position, the vibration switch lever 33 has the front portion out of the recess on the cam ring 17B and is at the rear in the movable range. Thus, the opposing portion 33A of the vibration switch lever 33 separates from the second cam 32. The second cam 32 is rotatable together with the first cam 31 and the spindle 61. The output shaft 6 does not vibrate in the front-rear direction.

To set the vibration mode, the operator rotates the mode change ring 17 to a third rotational position. In response to an operation on the mode change ring 17, the cam ring 17B rotates. This rotates the coupling ring 45 and the washer 43. The cam ring 17B and the washer 43 are at the third rotational position.

With the washer 43 at the third rotational position, the forward-movement restrictor in the second gear case 5B is engaged with the washer 43, and the washer 43 and the pressure pin are restricted from moving forward. In this state, the pressure pin is engaged with the clutch cam in the internal gear 23R.

Although the internal gear 23R is driven to rotate by the motor 8, the pressure pin is restricted from moving forward and thus remains engaged with the clutch cam in the internal gear 23R. More specifically, the pressure pin is restricted from moving forward and thus cannot move over the clutch cam in the internal gear 23R. This restricts rotation of the internal gear 23R. In this state, the output shaft 6 rotates with the rotational force transmitted from the motor 8. Thus, the output shaft 6 rotates independently of the magnitude of a rotational load on the output shaft 6.

With the cam ring 17B at the third rotational position, the vibration switch lever 33 has the front portion received in the recess on the cam ring 17B and is at the front in the movable range. The opposing portion 33A of the vibration switch lever 33 is in contact with the tab on the second cam 32 to restrict rotation of the second cam 32. When the motor 8 rotates in this state, the first cam 31 fixed to the spindle 61 rotates while being in contact with the cam teeth on the second cam 32. The output shaft 6 thus rotates while vibrating in the front-rear direction.

Operation

An example operation of the power tool 1A according to the present embodiment will now be described. The battery 12 is attached to the battery mount 7 to power the power tool 1A. In response to an operation on the trigger 14A in this state, the switch body 14B outputs a trigger signal. The controller 13 supplies a current to the motor 8 in response to the trigger signal output from the switch body 14B. This rotates the rotor shaft 82A.

As the rotor shaft 82A rotates, the spindle 61 rotates with the power transmission 10. This rotates the chuck 62 and the tip tool attached to the chuck 62.

As the rotor shaft 82A rotates, the centrifugal fan 85 rotates. The air flowing around the motor 8 cools the motor 8. The air flowing around the motor 8 is discharged through the outlets 4B.

Auxiliary Handle

Figure 3:
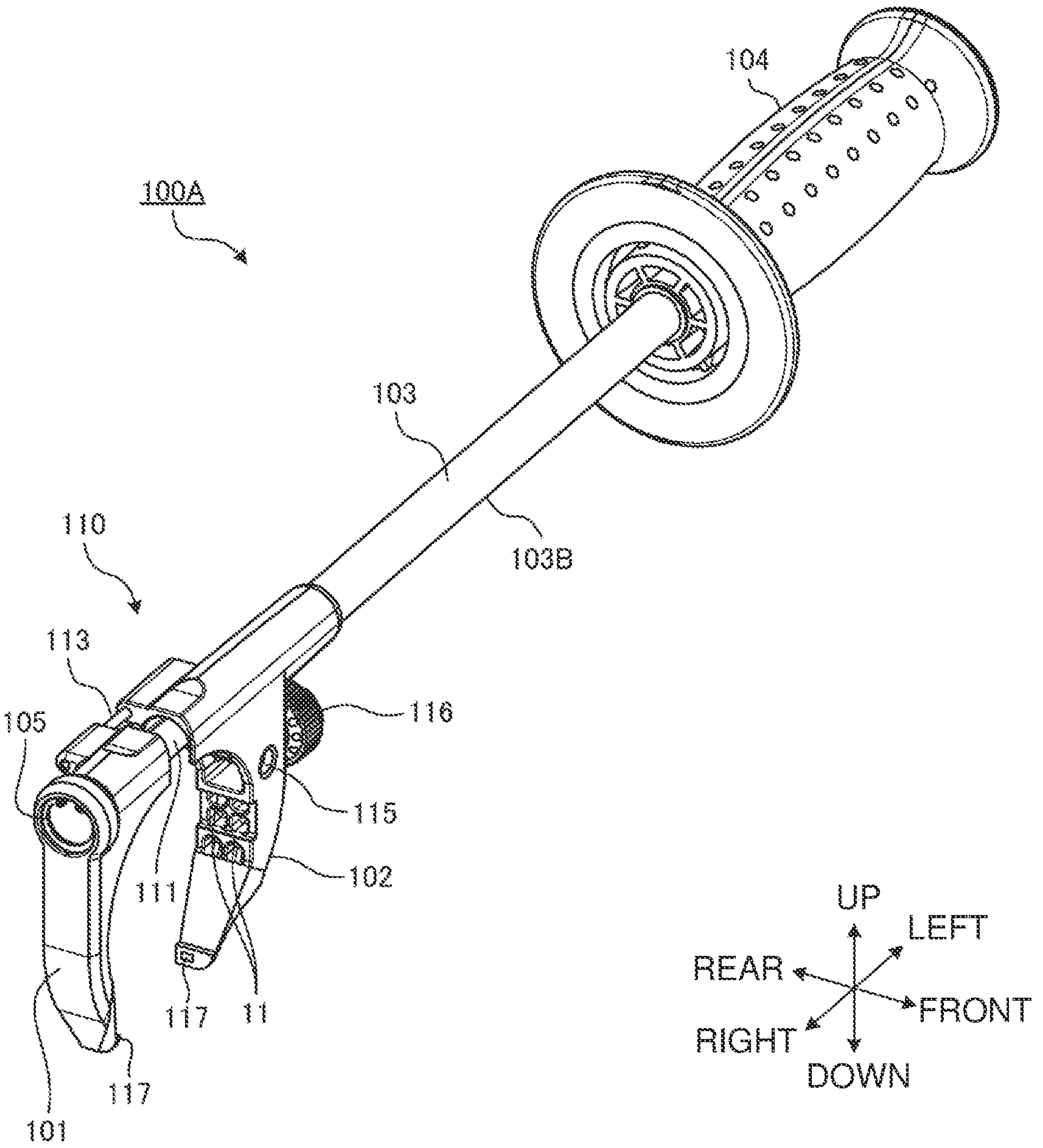
FIG. 3 is a perspective view of an auxiliary handle according to the first embodiment.
Figure 4:
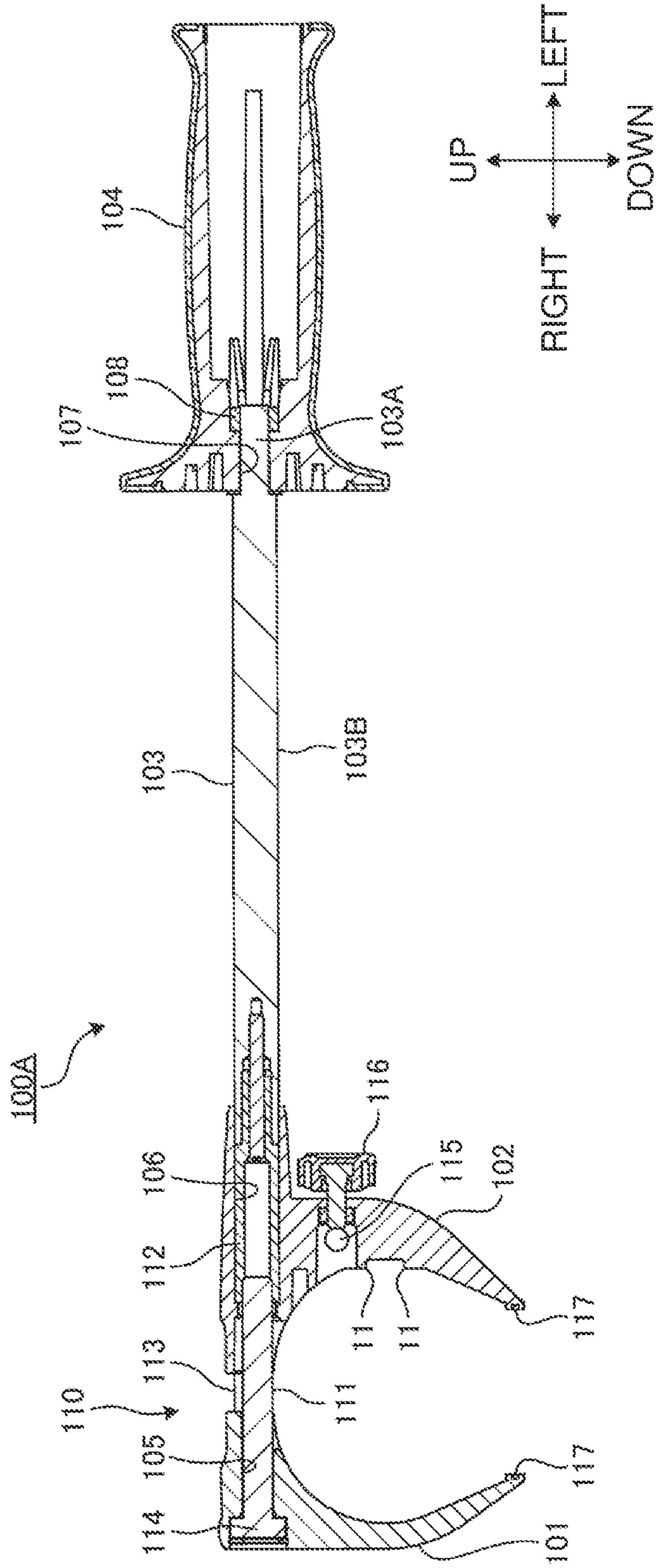
FIG. 4 is a sectional view of the auxiliary handle according to the first embodiment.

FIG. 3 is a perspective view of an auxiliary handle 100A according to the present embodiment. FIG. 4 is a sectional view of the auxiliary handle 100A according to the present embodiment.

The auxiliary handle 100A is attached to the power tool 1A. The auxiliary handle 100A according to the embodiment is attached to the gear case 5. The auxiliary handle 100A receives a reaction force transmitted from the output shaft 6 to the gear case 5.

As shown in FIGS. 3 and 4, the auxiliary handle 100A includes a first arm 101, a second arm 102, a rod 103, and a handle 104. The second arm 102 is movable relative to the first arm 101.

The first arm 101 and the second arm 102 are each attached to the gear case 5. The second arm 102 is movable relative to the first arm 101. The second arm 102 fastens the gear case 5 between the second arm 102 and the first arm 101. The auxiliary handle 100A is attached to the power tool 1A with the first arm 101 and the second arm 102 holding the gear case 5.

The rod 103 is connected to the second arm 102. In the example shown in FIGS. 3 and 4, the first arm 101 is located on the right of the second arm 102. The rod 103 extends leftward from the second arm 102. The second arm 102 is connected to a distal end (right end) of the rod 103. The handle 104 is fixed to a basal end (left end) of the rod 103.

The handle 104 is grippable by the operator. The handle 104 has an internal space. The handle 104 has, in its right end, a through-hole 107 receiving the basal end of the rod 103. The through-hole 107 connects the inside and the outside of the handle 104.

The rod 103 includes a smaller-diameter portion 103A and a larger-diameter portion 103B. The smaller-diameter portion 103A is received in the through-hole 107 in the handle 104. The larger-diameter portion 103B is located outside the handle 104. The smaller-diameter portion 103A is located at the basal end (left end) of the rod 103. The smaller-diameter portion 103A includes a threaded portion. The handle 104 accommodates a nut 108 in its internal space. The nut 108 is fixed to the inner surface of the handle 104. The threaded portion of the smaller-diameter portion 103A and the nut 108 are engaged with each other to fasten the rod 103 and the handle 104 together.

The auxiliary handle 100A includes a fastener 110. The fastener 110 moves the first arm 101 and the second arm 102 relative to each other. The fastener 110 is operable by the operator. In response to an operation on the fastener 110, the first arm 101 and the second arm 102 move relative to each other, or specifically, toward each other or away from each other.

The fastener 110 includes a rod 111, a slider 112, and a guide 113. The rod 111 is fixed to the first arm 101. The slider 112 is movable relative to the rod 111. The guide 113 guides the relative movement between the first arm 101 and the second arm 102.

The first arm 101 has a through-hole 105 receiving at least a part of the rod 111. The through-hole 105 extends laterally through an upper portion of the first arm 101. The through-hole 105 receives a nut 114 at its right end. The nut 114 fastens the rod 111 and the first arm 101 together.

The slider 112 is cylindrical. The second arm 102 has a through-hole 106 receiving the slider 112. The through-hole 106 extends laterally through an upper portion of the second arm 102. The slider 112 has a left end connected to the rod 103. The slider 112 has a threaded portion on its outer surface. The inner surface defining the through-hole 106 has a threaded portion.

The rod 111 is connected to the slider 112. The first arm 101 and the second arm 102 are connected with the rod 111 and the slider 112 in between.

The operator uses the handle 104 to operate the fastener 110. In response to a rotating operation on the handle 104 by the operator, the slider 112 rotates relative to the rod 111. The rod 111 is fixed to the first arm 101. As the slider 112 rotates, the second arm 102 moves in a direction toward the first arm 101 or in a direction away from the first arm 101.

The guide 113 is a rod. The guide 113 guides the relative movement between the first arm 101 and the second arm 102. The guide 113 has a right end connected to the first arm 101. The guide 113 has a left end connected to the second arm 102.

Figure 5:
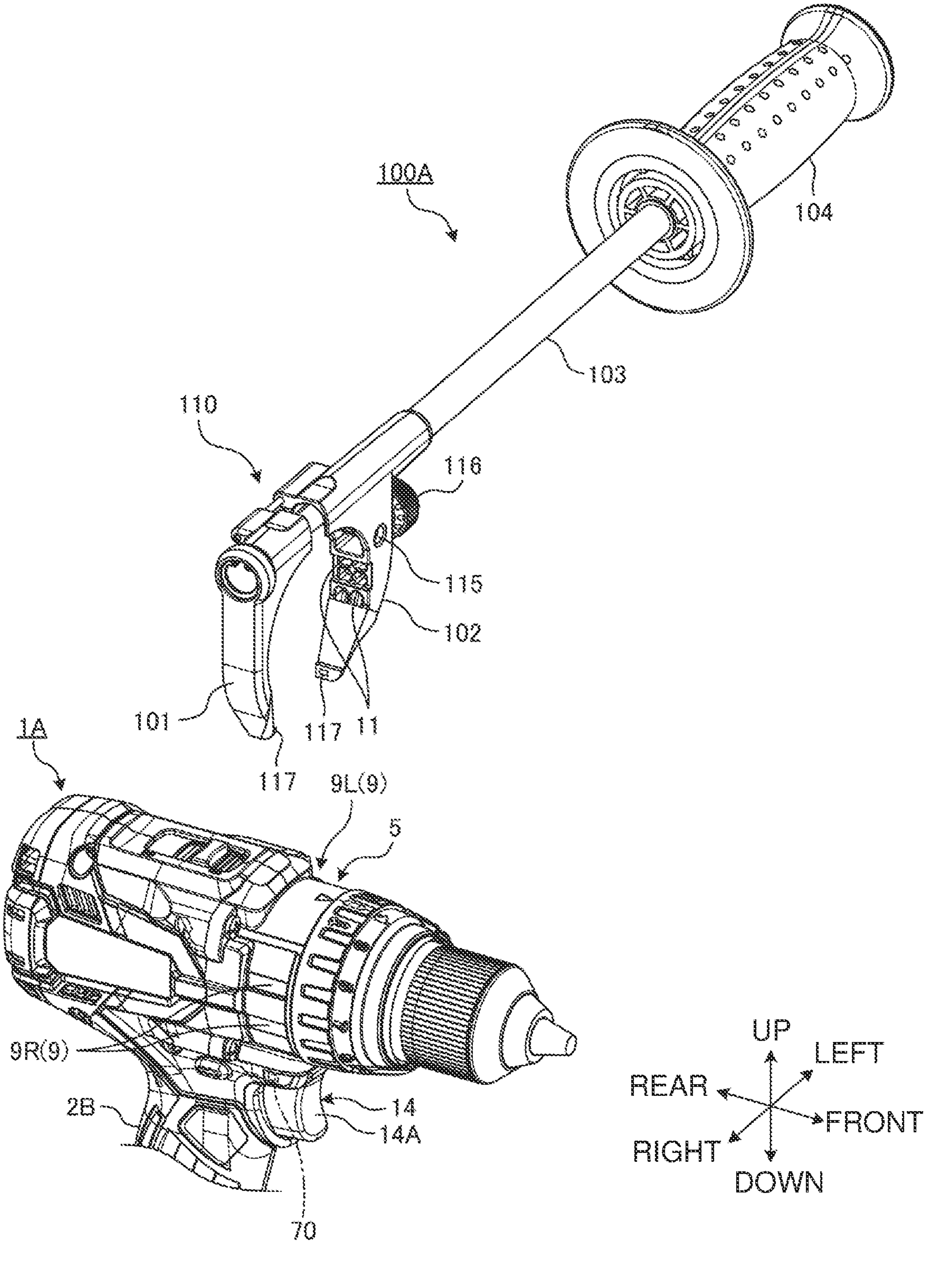
FIG. 5 is a diagram describing the relationship between the power tool and the auxiliary handle according to the first embodiment.
Figure 6:
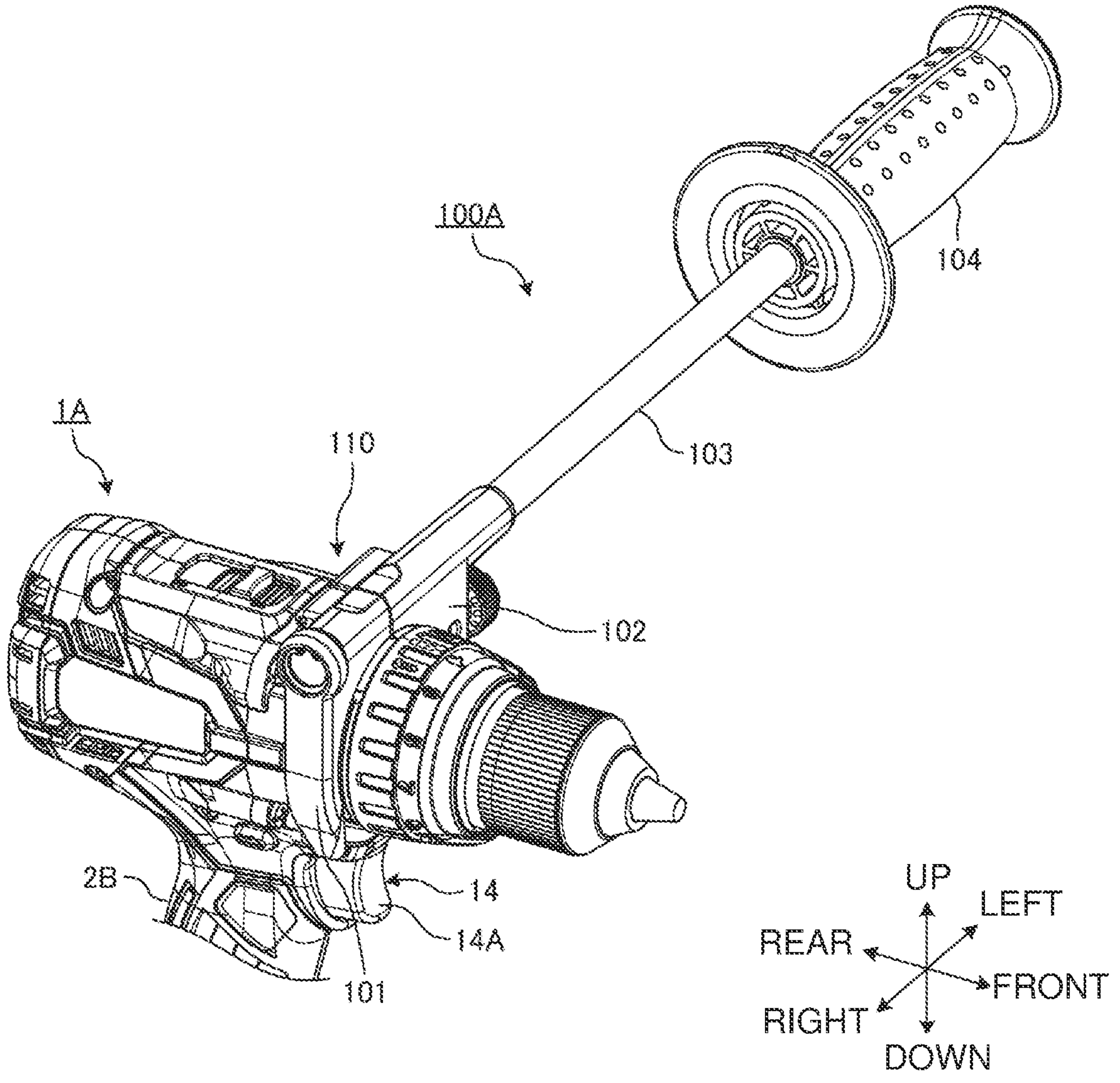
FIG. 6 is a diagram describing the relationship between the power tool and the auxiliary handle according to the first embodiment.

FIGS. 5 and 6 are diagrams each describing the relationship between the power tool 1A and the auxiliary handle 100A according to the present embodiment. As shown in FIG. 5, the operator operates the handle 104 to separate the first arm 101 and the second arm 102 from each other before attaching the auxiliary handle 100A to the power tool 1A. The operator places the gear case 5 between the first arm 101 and the second arm 102.

The operator then operates the handle 104 to move the first arm 101 and the second arm 102 toward each other. As shown in FIG. 6, the gear case 5 is fastened between the first arm 101 and the second arm 102.

The second arm 102 includes joints 11 engageable with the engaging portions 9 of the gear case 5. The joints 11 include protrusions to be fitted into the recesses on the engaging portions 9. The engaging portions 9 are engageable with the joints 11 in the auxiliary handle 100A. In the examples shown in FIGS. 5 and 6, the joints 11 are engaged with the left engaging portions 9L. The joints 11 are engageable with the right engaging portions 9R when the lateral orientation of the auxiliary handle 100A is changed.

The second arm 102 in the present embodiment includes a through-hole 115 and a dial 116. The through-hole 115 receives a stopper pole (not shown). The dial 116 fastens the stopper pole received in the through-hole 115.

The auxiliary handle 100A according to the present embodiment includes permanent magnets 117. The permanent magnets 117 are each located at a lower end of the first arm 101 and a lower end of the second arm 102. In some embodiments, a single permanent magnet 117 may be located in either the first arm 101 or the second arm 102.

Attachment Sensor

As shown in FIGS. 1 and 5, the power tool 1A includes an attachment sensor 70 for detecting the auxiliary handle 100A being attached to the gear case 5. The attachment sensor 70 in the present embodiment is a magnetic sensor that detects the permanent magnets 117 in the auxiliary handle 100A. The attachment sensor 70 faces the permanent magnets 117 when the gear case 5 is fastened between the first arm 101 and the second arm 102. The attachment sensor 70 detects the auxiliary handle 100A being attached to the gear case 5 by detecting magnetism from the permanent magnets 117.

Controller

Figure 7:
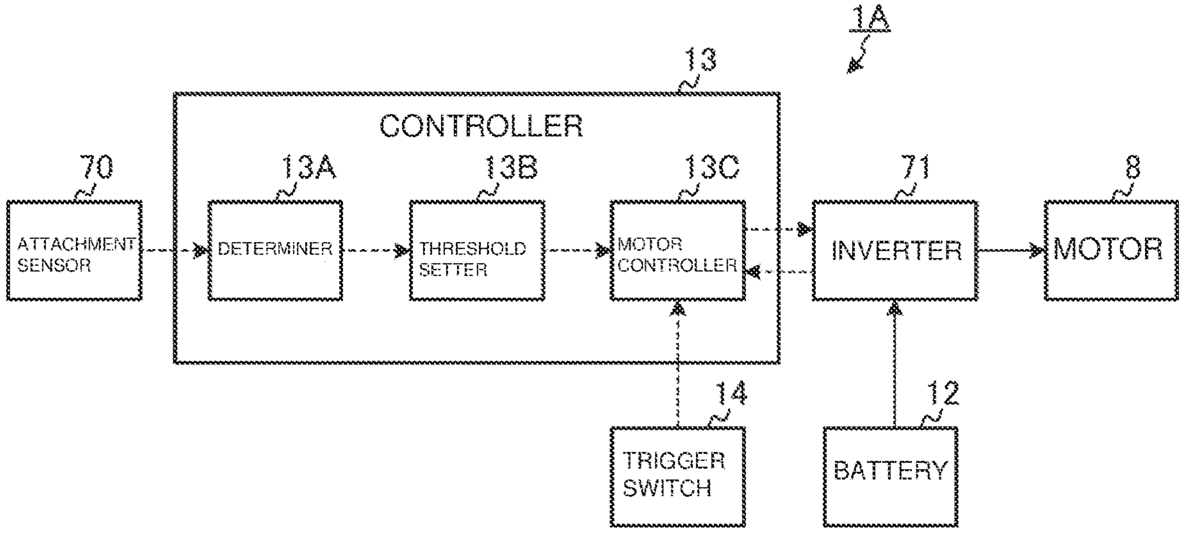
FIG. 7 is a block diagram of the power tool according to the first embodiment.

FIG. 7 is a block diagram of the power tool 1A according to the present embodiment. As shown in FIG. 7, the power tool 1A includes the attachment sensor 70, the controller 13, the trigger switch 14, an inverter 71, the battery 12, and the motor 8.

The controller 13 outputs a control signal for controlling the rotation of the output shaft 6 based on a detection signal from the attachment sensor 70. The controller 13 in the present embodiment sets a threshold for rotation of the output shaft 6 based on the detection signal from the attachment sensor 70, and outputs a control signal for controlling the rotation of the output shaft 6 based on the threshold.

The threshold in the present embodiment indicates a rotational load on the output shaft 6. Based on the detection signal from the attachment sensor 70, the controller 13 sets the threshold for a rotational load to a first torque value in response to determining that the auxiliary handle 100A is attached, and sets the threshold for a rotational load to a second torque value less than the first torque value in response to determining that the auxiliary handle 100A is not attached.

The controller 13 includes a determiner 13A, a threshold setter 13B, and a motor controller 13C.

The determiner 13A receives a detection signal from the attachment sensor 70. The determiner 13A determines whether the auxiliary handle 100A is attached to the gear case 5 based on the detection signal from the attachment sensor 70.

The threshold setter 13B sets a threshold for a rotational load on the output shaft 6 based on the detection signal from the attachment sensor 70. When the determiner 13A determines that the auxiliary handle 100A is attached to the gear case 5, the threshold setter 13B sets the threshold to the first torque value. When the determiner 13A determines that the auxiliary handle 100A is not attached to the gear case 5, the threshold setter 13B sets the threshold to the second torque value. The second torque value is less than the first torque value.

The motor controller 13C outputs a control signal for controlling the rotation of the output shaft 6. The motor controller 13C in the present embodiment outputs a control signal for controlling the rotation of the motor 8. The rotation of the motor 8 is controlled to control the rotation of the output shaft 6.

Upon receiving a trigger signal generated in response to an operation on the trigger switch 14, the motor controller 13C outputs a control signal for rotating the motor 8.

In the present embodiment, the control signal output from the motor controller 13C includes a control signal for stopping the rotation of the motor 8 in response to a rotational load on the output shaft 6 exceeding the threshold.

The motor controller 13C outputs the control signal to the inverter 71. The inverter 71 includes multiple switching elements. Based on the control signal output from the motor controller 13C, the inverter 71 switches a current supplied from the battery 12 to the coils 81D in the motor 8. With six coils 81D, for example, the inverter 71 controls the switching elements based on the control signal output from the motor controller 13C, allowing a first pair of coils 81D (two coils) to serve as U-phase coils, a second pair of coils 81D (two coils) to serve as V-phase coils, and a third pair of coils 81D (two coils) to serve as W-phase coils. Thus, the rotor 82 in the motor 8, or a direct current (DC) brushless motor, rotates with a current supplied from the battery 12.

The motor controller 13C monitors a current supplied from the battery 12 to the coils 81D through the inverter 71. A rotational load on the output shaft 6 correlates with a current supplied from the battery 12 to the coils 81D. A higher rotational load on the output shaft 6 causes a greater current to be supplied from the battery 12 to the coils 81D. A lower rotational load on the output shaft 6 causes a less current to be supplied from the battery 12 to the coils 81D. The motor controller 13C calculates a rotational load on the output shaft 6 based on a current supplied from the battery 12 to the coils 81D in the motor 8. In response to the rotational load on the output shaft 6 exceeding the threshold, the motor controller 13C outputs a control signal for stopping the rotation of the motor 8 to the inverter 71.

Control Method

Figure 8:
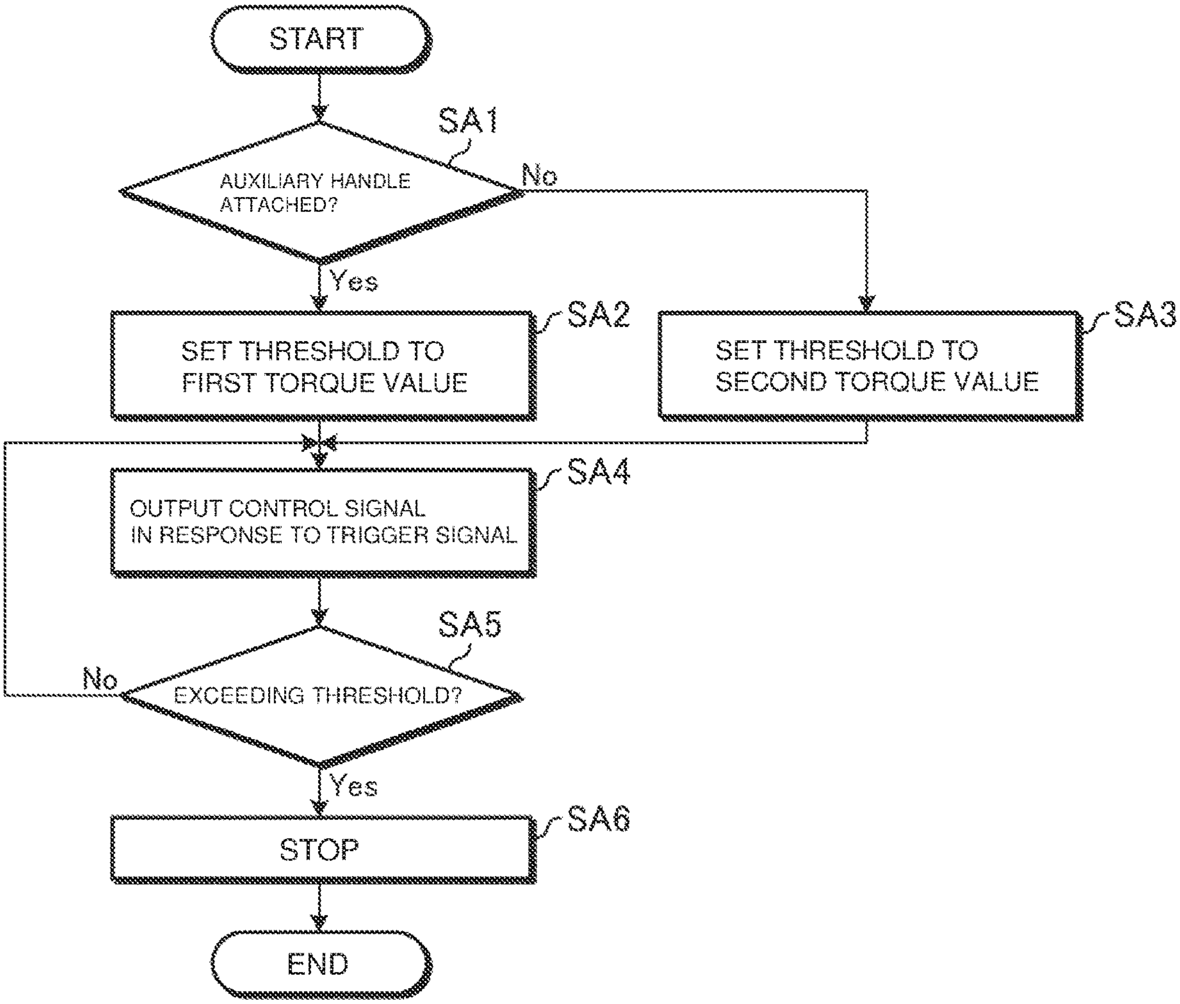
FIG. 8 is a flowchart of a method for controlling the power tool according to the first embodiment.

FIG. 8 is a flowchart of a method for controlling the power tool 1A according to the present embodiment. The determiner 13A receives a detection signal from the attachment sensor 70. The determiner 13A determines whether the auxiliary handle 100A is attached to the gear case 5 based on the detection signal from the attachment sensor 70 (step SA1).

When the auxiliary handle 100A is determined to be attached to the gear case 5 in step SA1 (Yes in step SA1), the threshold setter 13B sets the threshold to the first torque value (step SA2).

When the auxiliary handle 100A is determined not to be attached to the gear case 5 in step SA1 (No in step SA1), the threshold setter 13B sets the threshold to the second torque value less than the first torque value (step SA3).

In response to an operation on the trigger switch 14, the trigger switch 14 outputs a trigger signal for rotating the motor 8. The motor controller 13C receives the trigger signal from the trigger switch 14. In response to the trigger signal, the motor controller 13C outputs a control signal for rotating the motor 8 to the inverter 71 (step SA4).

The battery 12 supplies a current to the coils 81D in the motor 8. The motor controller 13C monitors a current supplied from the battery 12 to the coils 81D in the motor 8 through the inverter 71. The motor controller 13C supplies a current from the battery 12 to the coils 81D in the motor 8. The motor controller 13C calculates a rotational load on the output shaft 6 based on the current flowing through the coils 81D.

The motor controller 13C determines whether the rotational load on the output shaft 6 exceeds the threshold (step SA5).

When the rotational load on the output shaft 6 is determined not to exceed the threshold in step SA5 (No in step SA5), the motor controller 13C allows continuous rotation of the motor 8.

When the rotational load on the output shaft 6 is determined to exceed the threshold in step SA5 (Yes in step SA5), the motor controller 13C outputs a control signal for stopping the rotation of the motor 8 to the inverter 71 (step SA6).

As described above, the power tool 1A according to the present embodiment includes the attachment sensor 70 for detecting the auxiliary handle 100A being attached. The controller 13 outputs a control signal for controlling the rotation of the output shaft 6 based on a detection signal from the attachment sensor 70.

In response to determining that the auxiliary handle 100A is not attached to the power tool 1A, the controller 13 controls the rotation of the output shaft 6 to avoid an increase in the rotational load on the output shaft 6. In response to determining that the auxiliary handle 100A is not attached to the power tool 1A, the controller 13 in the present embodiment rotates the motor 8 until the rotational load on the output shaft 6 exceeds the second torque value, and stops rotating the motor 8 in response to the rotational load on the output shaft 6 exceeding the second torque value. When the power tool 1A is operated without the auxiliary handle 100A, the maximum rotational load on the output shaft 6 is the second torque value less than the first torque value. Thus, the power tool 1A is less likely to receive a greater reaction force.

In response to determining that the auxiliary handle 100A is attached to the power tool 1A, the controller 13 rotates the motor 8 until the rotational load on the output shaft 6 exceeds the first torque value, and stops rotating the motor 8 in response to the rotational load on the output shaft 6 exceeding the first torque value. During work using the power tool 1A with the auxiliary handle 100A attached to it, the maximum rotational load on the output shaft 6 is the first torque value greater than the second torque value. With the auxiliary handle 100A attached to the power tool 1A and the operator holding the auxiliary handle 100A, the power tool 1A receives the first torque value.

Second Embodiment

A second embodiment will now be described. The same or corresponding components as those in the above embodiment are herein given the same reference numerals, and will be described briefly or will not be described.

Controller

Figure 9:
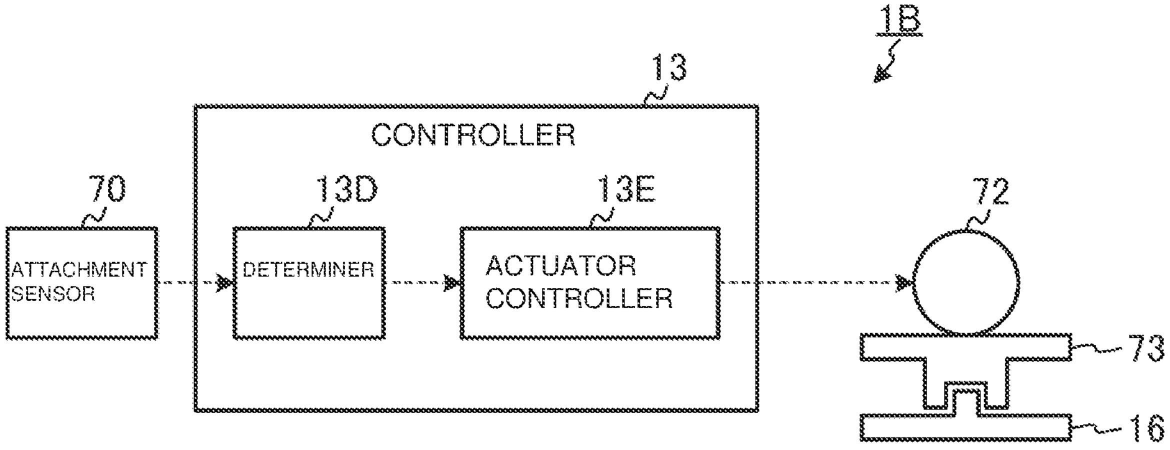
FIG. 9 is a block diagram of a power tool according to a second embodiment.

FIG. 9 is a block diagram of a power tool 1B according to the present embodiment. As shown in FIG. 9, the power tool 1A includes the attachment sensor 70, the controller 13, the speed switch lever 16, a connector 73, and an actuator 72. The connector 73 is connected to the speed switch lever 16. The actuator 72 can operate the speed switch lever 16 with the connector 73.

As described above, the speed switch lever 16 switches the rotational speed of the output shaft 6 between the high-speed mode and the low-speed mode. The actuator 72 is connected to the speed switch lever 16 with the connector 73. In response to the actuator 72 being driven, the speed switch lever 16 moves in the front-rear direction. The speed switch lever 16 moves forward to switch the rotational speed to the low-speed mode. The speed switch lever 16 moves backward to switch the rotational speed to the high-speed mode.

In response to determining that the auxiliary handle 100A is not attached to the gear case 5 based on a detection signal from the attachment sensor 70, the controller 13 controls the actuator 72 to switch the rotational speed of the output shaft 6 to the high-speed mode. In other words, the controller 13 controls the actuator 72 to move the speed switch lever 16 backward.

In response to determining that the auxiliary handle 100A is attached to the gear case 5 based on a detection signal from the attachment sensor 70, the controller 13 controls the actuator 72 to switch the rotational speed of the output shaft 6 to the low-speed mode. In other words, the controller 13 controls the actuator 72 to move the speed switch lever 16 forward.

The controller 13 includes a determiner 13D and an actuator controller 13E.

The determiner 13A receives a detection signal from the attachment sensor 70. The determiner 13A determines whether the auxiliary handle 100A is attached to the gear case 5 based on the detection signal from the attachment sensor 70.

The actuator controller 13E outputs a control signal for controlling the rotation of the output shaft 6. The actuator controller 13E in the present embodiment outputs a control signal for moving the speed switch lever 16 to the actuator 72. The speed switch lever 16 moves to control the rotational speed of the output shaft 6 between the low-speed mode and the high-speed mode.

Control Method

Figure 10:
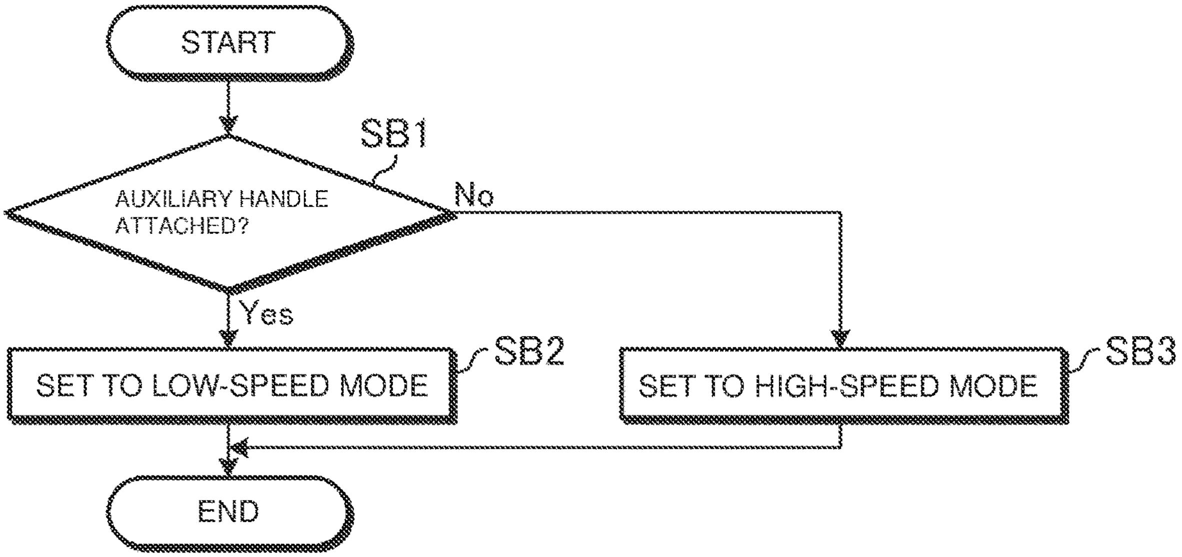
FIG. 10 is a flowchart of a method for controlling the power tool according to the second embodiment.

FIG. 10 is a flowchart of a method for controlling the power tool 1B according to the present embodiment. The determiner 13D receives a detection signal from the attachment sensor 70. The determiner 13D determines whether the auxiliary handle 100A is attached to the gear case 5 based on the detection signal from the attachment sensor 70 (step SB1).

When the auxiliary handle 100A is determined to be attached to the gear case 5 in step SB1 (Yes in step SB1), the actuator controller 13E outputs a control signal for setting the output shaft 6 to the low-speed mode to the actuator 72. In other words, the actuator controller 13E outputs the control signal to the actuator 72 to move the speed switch lever 16 forward (step SB2).

When the auxiliary handle 100A is determined not to be attached to the gear case 5 in step SB1 (No in step SB1), the actuator controller 13E outputs a control signal for setting the output shaft 6 to the high-speed mode to the actuator 72. In other words, the actuator controller 13E outputs the control signal to the actuator 72 to move the speed switch lever 16 backward (step SB3).

As described above, the output shaft 6 in the present embodiment is set to the high-speed mode without the auxiliary handle 100A attached to the gear case 5, and is set to the low-speed mode with the auxiliary handle 100A attached to the gear case 5. The power tool 1B may receive a greater reaction force during work in the low-speed mode than in the high-speed mode. In other words, the output shaft 6 generates a higher torque in the low-speed mode than in the high-speed mode. Thus, the power tool 1B may receive a greater reaction force during work in the low-speed mode.

In the present embodiment, the power tool 1B without the auxiliary handle 100A includes the output shaft 6 set to the high-speed mode, and thus cannot operate in the low-speed mode. In other words, when the auxiliary handle 100A is not attached to the power tool 1B, the power tool 1B is less likely to receive a greater reaction force. When the auxiliary handle 100A is attached to the power tool 1B, the output shaft 6 is set to the low-speed mode. When the auxiliary handle 100A is attached to the power tool 1B and the operator holds the auxiliary handle 100A during work in the low-speed mode, the power tool 1B receives a greater reaction force.

Third Embodiment

A third embodiment will now be described. The same or corresponding components as those in the above embodiments are herein given the same reference numerals, and will be described briefly or will not be described.

Controller

Figure 11:
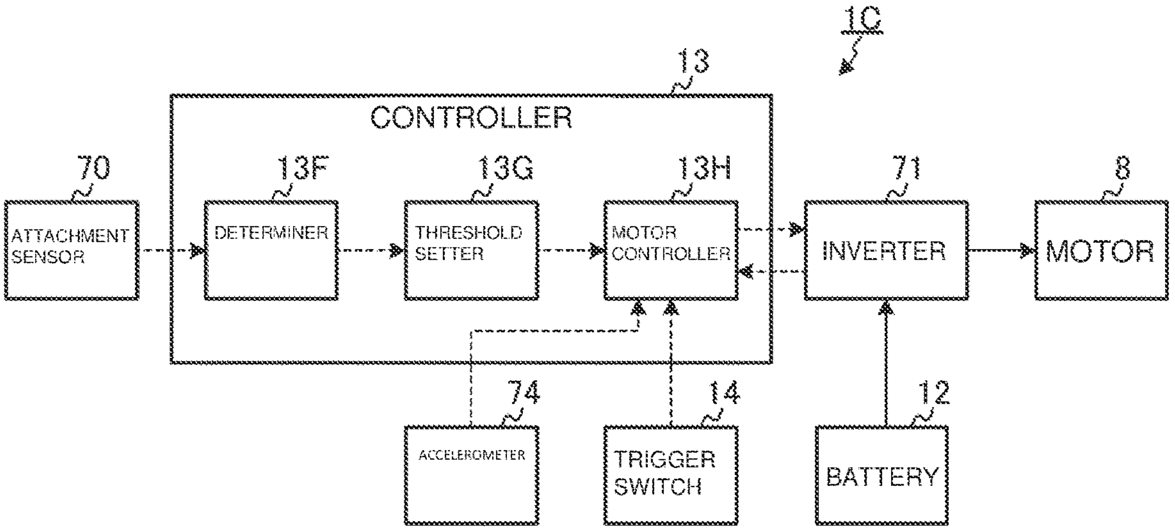
FIG. 11 is a block diagram of a power tool according to a third embodiment.

FIG. 11 is a block diagram of a power tool 1C according to the present embodiment. As shown in FIG. 11, the power tool 1C includes the attachment sensor 70, the controller 13, the trigger switch 14, the inverter 71, the battery 12, the motor 8, and an accelerometer 74.

The housing 2 accommodates an accelerometer 74. The accelerometer 74 may be located in, for example, the controller compartment 2C. The accelerometer 74 detects the acceleration of the housing 2. During work using the power tool 1C, the operator may have difficulty in holding the power tool 1C stably when the output shaft 6 receives a reaction force. The power tool 1C may then spin on the output shaft 6. The accelerometer 74 detects the acceleration of the housing 2 when the power tool 1C spins on the output shaft 6. When the power tool 1C spins rapidly on the output shaft 6, the housing 2 has a greater acceleration.

The controller 13 outputs a control signal for controlling the rotation of the output shaft 6 based on a detection signal from the attachment sensor 70. Based on the detection signal from the attachment sensor 70, the controller 13 in the present embodiment sets a threshold for the acceleration of the housing 2, and outputs a control signal for controlling the rotation of the output shaft 6 based on the threshold.

Based on the detection signal from the attachment sensor 70, the controller 13 sets the threshold for the acceleration to a first acceleration value in response to determining that the auxiliary handle 100A is attached, and sets the threshold for the acceleration to a second acceleration value less than the first acceleration value in response to determining that the auxiliary handle 100A is not attached.

The controller 13 includes a determiner 13F, a threshold setter 13G, and a motor controller 13H.

The determiner 13F receives a detection signal from the attachment sensor 70. The determiner 13F determines whether the auxiliary handle 100A is attached to the gear case 5 based on the detection signal from the attachment sensor 70.

The threshold setter 13G sets a threshold for the acceleration of the housing 2 based on the detection signal from the attachment sensor 70. When the determiner 13F determines that the auxiliary handle 100A is attached to the gear case 5, the threshold setter 13G sets the threshold to the first acceleration value. When the determiner 13F determines that the auxiliary handle 100A is not attached to the gear case 5, the threshold setter 13G sets the threshold to the second acceleration value. The second acceleration value is less than the first acceleration value.

The motor controller 13H outputs a control signal for controlling the rotation of the motor 8. The rotation of the motor 8 is controlled to control the rotation of the output shaft 6.

In the present embodiment, the control signal output from the motor controller 13H includes a control signal for stopping the rotation of the motor 8 in response to the acceleration of the housing 2 exceeding the threshold.

Control Method

Figure 12:
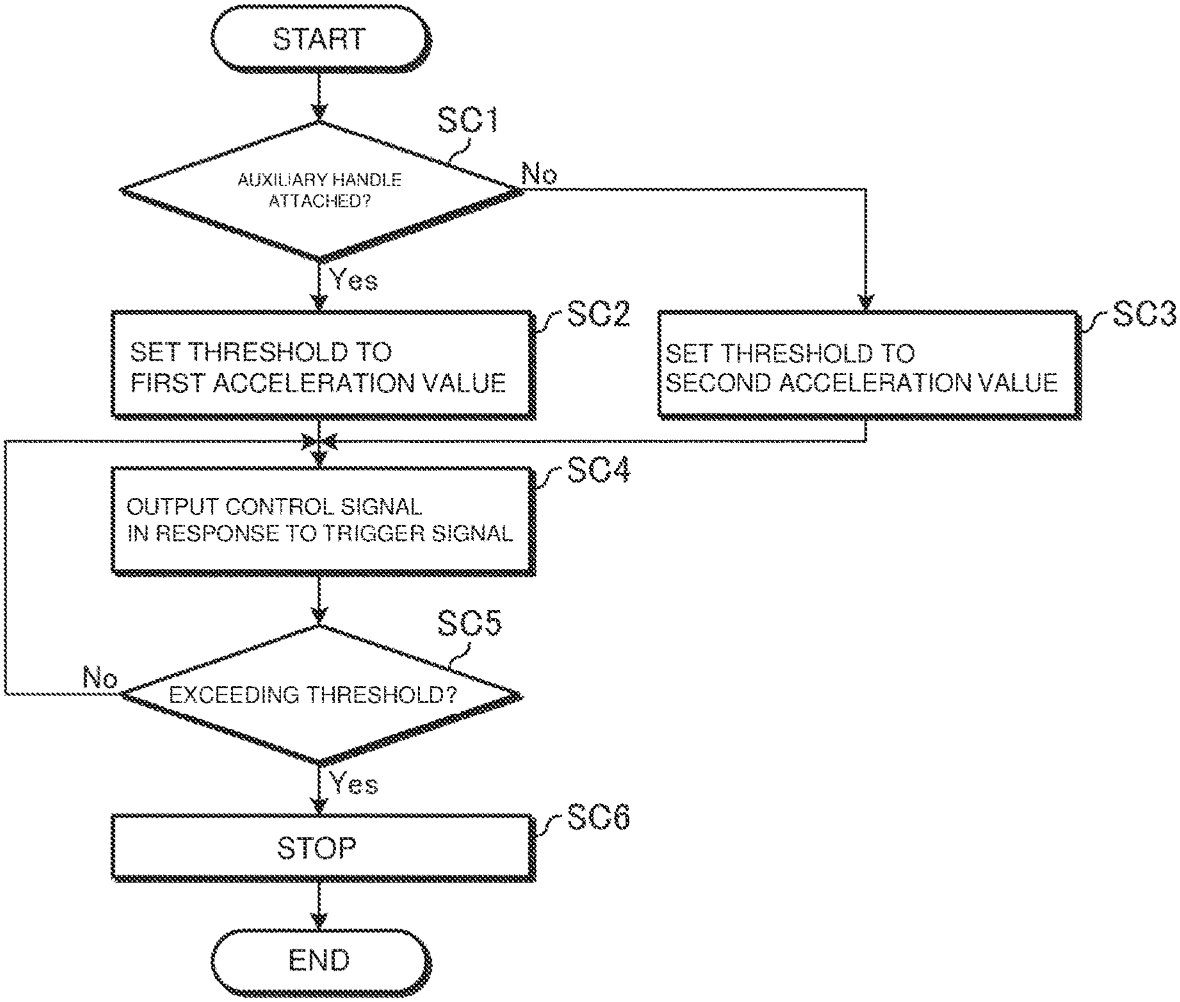
FIG. 12 is a flowchart of a method for controlling the power tool according to the third embodiment.

FIG. 12 is a flowchart of a method for controlling the power tool 1C according to the present embodiment. The determiner 13F receives a detection signal from the attachment sensor 70. The determiner 13F determines whether the auxiliary handle 100A is attached to the gear case 5 based on the detection signal from the attachment sensor 70 (step SC1).

When the auxiliary handle 100A is determined to be attached to the gear case 5 in step SC1 (Yes in step SC1), the threshold setter 13G sets the threshold to the first acceleration value (step SC2).

When the auxiliary handle 100A is determined not to be attached to the gear case 5 in step SC1 (No in step SC1), the threshold setter 13G sets the threshold to the second acceleration value less than the first acceleration value (step SC3).

In response to an operation on the trigger switch 14, the trigger switch 14 outputs a trigger signal for rotating the motor 8. The motor controller 13H receives the trigger signal from the trigger switch 14. In response to the trigger signal, the motor controller 13H outputs a control signal for rotating the motor 8 to the inverter 71 (step SC4).

The motor controller 13H receives a detection signal from the accelerometer 74. Based on the detection signal from the accelerometer 74, the motor controller 13H determines whether the acceleration of the housing 2 exceeds the threshold (step SC5).

When the acceleration of the housing 2 is determined not to exceed the threshold in step SC5 (No in step SC5), the motor controller 13H allows continuous rotation of the motor 8.

When the acceleration of the housing 2 is determined to exceed the threshold in step SC5 (Yes in step SC5), the motor controller 13H outputs a control signal for stopping the rotation of the motor 8 to the inverter 71 (step SC6).

As described above, in response to determining that the auxiliary handle 100A is not attached to the power tool 1C, the controller 13 in the present embodiment rotates the motor 8 until the acceleration of the housing 2 exceeds the second acceleration value, and stops rotating the motor 8 in response to the acceleration of the housing 2 exceeding the second acceleration value. When the power tool 1C without the auxiliary handle 100A receives a reaction force on the output shaft 6, the operator may have difficulty in holding the power tool 1C stably. Thus, the power tool 1C may spin on the output shaft 6. In the present embodiment, the rotation of the motor 8 is stopped in response to the acceleration of the housing 2 exceeding the second acceleration value less than the first acceleration value. In other words, the motor 8 stops rotating before the power tool 1C receives a greater reaction force. Thus, the power tool 1C is less likely to receive a greater reaction force.

In response to determining that the auxiliary handle 100A is attached to the power tool 1C, the controller 13 rotates the motor 8 until the acceleration of the housing 2 exceeds the first acceleration value, and stops rotating the motor 8 in response to the acceleration of the housing 2 exceeding the first acceleration value. When the auxiliary handle 100A is attached to the power tool 1C and the operator holds the auxiliary handle 100A, the power tool 1C receives a greater reaction force.

Fourth Embodiment

A fourth embodiment will now be described. The same or corresponding components as those in the above embodiments are herein given the same reference numerals, and will be described briefly or will not be described.

Controller

Figure 13:
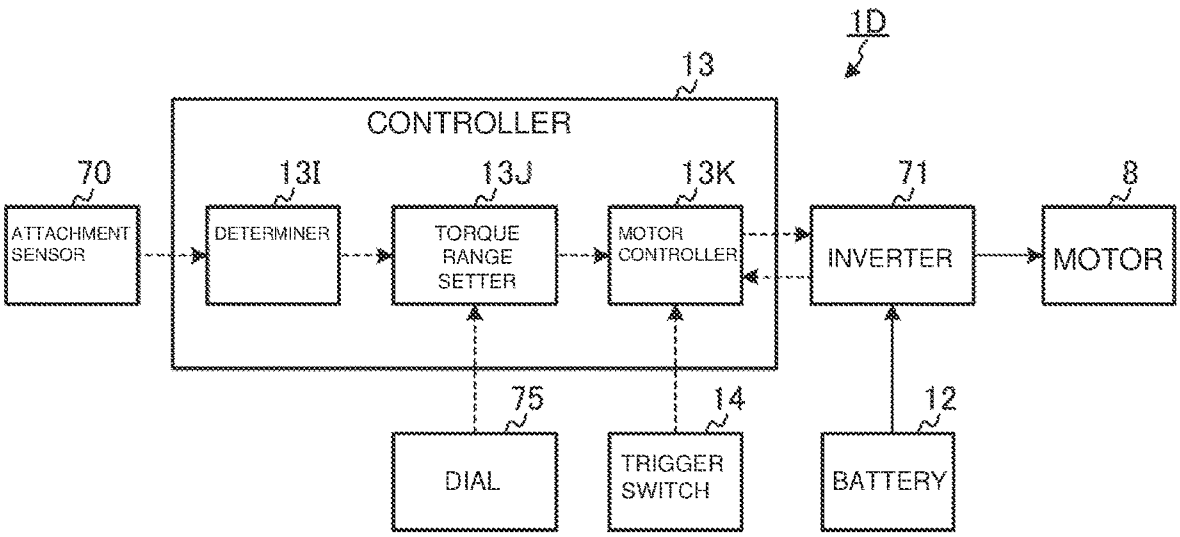
FIG. 13 is a block diagram of a power tool according to a fourth embodiment.

FIG. 13 is a block diagram of a power tool 1D according to the present embodiment. As shown in FIG. 13, the power tool 1D includes the attachment sensor 70, the controller 13, the trigger switch 14, the inverter 71, the battery 12, the motor 8, and a dial 75.

The power tool 1D according to the present embodiment includes no clutch assembly 40 in the embodiments described above. The controller 13 may set the clutch mode or the drill mode. In the clutch mode, the controller 13 stops rotating the motor 8 in response to a rotational load on the output shaft 6 reaching a release value. In the drill mode, the controller 13 rotates the motor 8 with any rotational load on the output shaft 6.

The release value is set through an operation on the dial 75. The dial 75 is located, for example, in the controller compartment 2C. The operator operates the dial 75 to set the release value.

The controller 13 includes a determiner 13I, a torque range setter 13J, and a motor controller 13K.

The determiner 13I receives a detection signal from the attachment sensor 70. The determiner 13I determines whether the auxiliary handle 100A is attached to the gear case 5 based on the detection signal from the attachment sensor 70.

The torque range setter 13J sets a torque range indicating the range of release values that can be set with the dial 75. When the determiner 13I determines that the auxiliary handle 100A is attached to the gear case 5, the torque range setter 13J sets the torque range to a first torque range. When the determiner 13I determines that the auxiliary handle 100A is not attached to the gear case 5, the torque range setter 13J sets the torque range to a second torque range.

The maximum value of the second torque range is less than the maximum value of the first torque range. For the release value settable to one of 40 release values, the first torque range includes the 40 release values when the auxiliary handle 100A is attached to the gear case 5. In other words, the first torque range includes first to 40th release values. Of the 40 release values, the first release value is the least. The release values become greater toward the 40th release value. The 40th release value is the greatest.

When the auxiliary handle 100A is not attached to the gear case 5, the second torque range includes, for example, 20 release values. The second torque range includes the first to 20th release values. The 20th release value, or the maximum value of the second torque range, is less than the 40th release value, or the maximum value of the first torque range.

The motor controller 13K outputs a control signal for controlling the rotation of the motor 8. The rotation of the motor 8 is controlled to control the rotation of the output shaft 6.

The motor controller 13K monitors a current supplied from the battery 12 to the coils 81D in the motor 8 through the inverter 71. The motor controller 13K calculates a rotational load on the output shaft 6 based on the current supplied from the battery 12 to the coils 81D in the motor 8.

Control Method

Figure 14:
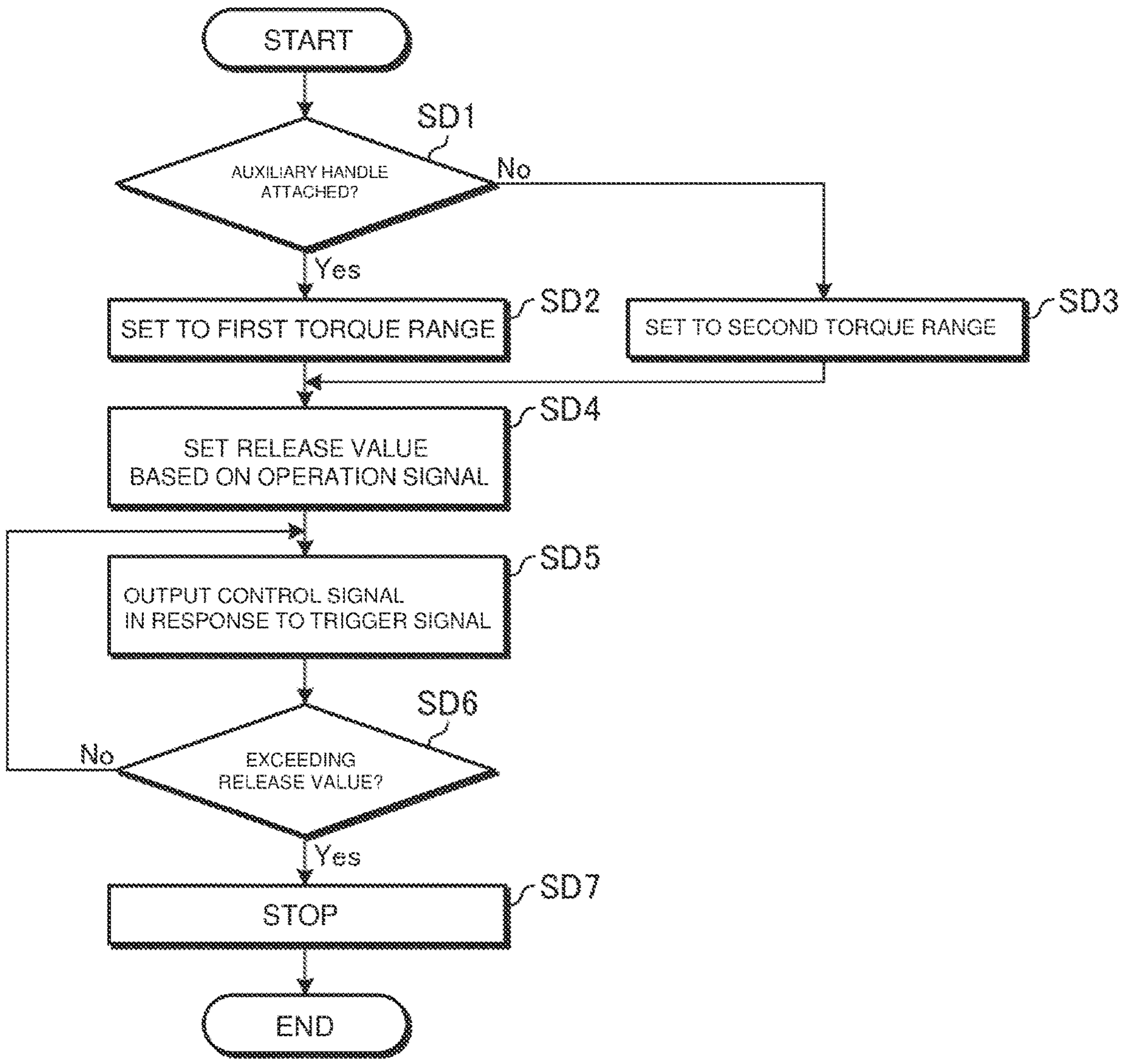
FIG. 14 is a flowchart of a method for controlling the power tool according to the fourth embodiment.

FIG. 14 is a flowchart of a method for controlling the power tool 1D according to the present embodiment. The determiner 13I receives a detection signal from the attachment sensor 70. The determiner 13I determines whether the auxiliary handle 100A is attached to the gear case 5 based on the detection signal from the attachment sensor 70 (step SD1).

When the auxiliary handle 100A is determined to be attached to the gear case 5 in step SD1 (Yes in step SD1), the torque range setter 13J sets the torque range to the first torque range (step SD2).

When the auxiliary handle 100A is determined not to be attached to the gear case 5 in step SD1 (No in step SD1), the torque range setter 13J sets the threshold to the second torque range (step SD3).

The operator operates the dial 75 to set a release value for a rotational load for stopping the rotation of the motor 8. The dial 75 outputs an operation signal to the torque range setter 13J. The torque range setter 13J sets a release value based on the operation signal from the dial 75 (step SD4).

When the auxiliary handle 100A is attached to the gear case 5, or the torque range is set to the first torque range, the operator can set any release value from the first to 40th release values.

When the auxiliary handle 100A is not attached to the gear case 5, or the torque range is set to the second torque range, the operator can set any release value from the first to 20th release values but cannot set a release value from the 21st to 40th release values.

In response to an operation on the trigger switch 14, the trigger switch 14 outputs a trigger signal for rotating the motor 8. The motor controller 13K receives the trigger signal from the trigger switch 14. In response to the trigger signal, the motor controller 13K outputs a control signal for rotating the motor 8 to the inverter 71 (step SD5).

The battery 12 supplies a current to the coils 81D in the motor 8. The motor controller 13K monitors a current supplied from the battery 12 to the coils 81D in the motor 8 through the inverter 71. The motor controller 13K calculates a rotational load on the output shaft 6 based on the current supplied from the battery 12 to the coils 81D in the motor 8.

The motor controller 13K determines whether the rotational load on the output shaft 6 exceeds the release value (step SD6).

When the rotational load on the output shaft 6 is determined not to exceed the release value in step SD6 (No in step SD6), the motor controller 13K allows continuous rotation of the motor 8.

When the rotational load on the output shaft 6 is determined to exceed the release value in step SD6 (Yes in step SD6), the motor controller 13K outputs a control signal for stopping the rotation of the motor 8 to the inverter 71 (step SD7).

As described above, when the controller 13 in the present embodiment determines that the auxiliary handle 100A is not attached to the power tool 1D, the 21st and greater release values are excluded. The rotational load on the output shaft 6 is less likely to increase. Thus, the power tool 1D is less likely to receive a greater reaction force. When the controller 13 determines that the auxiliary handle 100A is attached to the power tool 1A, the greater release values (the 21st to 40th release values) may be set. When the auxiliary handle 100A is attached to the power tool 1D and the operator holds the auxiliary handle 100A, the power tool 1D receives a greater reaction force.

Fifth Embodiment

A fifth embodiment will now be described. The same or corresponding components as those in the above embodiments are herein given the same reference numerals, and will be described briefly or will not be described.

Controller

Figure 15:
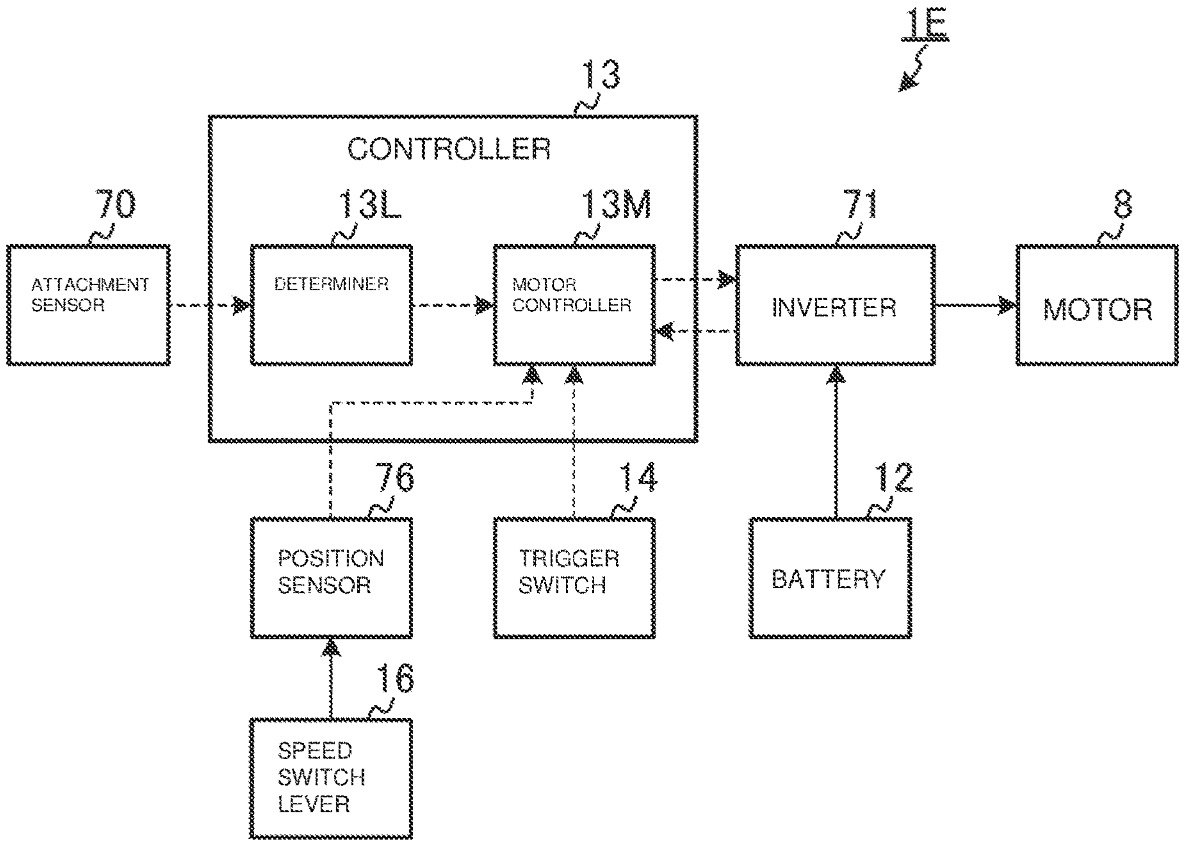
FIG. 15 is a block diagram of a power tool according to a fifth embodiment.

FIG. 15 is a block diagram of a power tool 1E according to the present embodiment. As shown in FIG. 15, the power tool 1E includes the attachment sensor 70, the controller 13, the trigger switch 14, the inverter 71, the battery 12, the motor 8, and a position sensor 76.

The position sensor 76 detects the position of the speed switch lever 16. As described above, the speed switch lever 16 switches the rotational speed of the output shaft 6 between the high-speed mode and the low-speed mode. The speed switch lever 16 moves forward to set the rotational speed of the output shaft 6 to the low-speed mode. The speed switch lever 16 moves backward to set the rotational speed of the output shaft 6 to the high-speed mode. The position sensor 76 detects the speed switch lever 16 located at the front end or the rear end in the movable range of the speed switch lever 16. In other words, the position sensor 76 detects the rotational speed of the output shaft 6 being set to the low-speed mode or the high-speed mode.

In response to determining that the auxiliary handle 100A is not attached and the low-speed mode is set based on the detection signals from the attachment sensor 70 and the position sensor 76, the controller 13 disables rotation of the motor 8.

In response to determining that the auxiliary handle 100A is not attached and the high-speed mode is set based on the detection signals from the attachment sensor 70 and the position sensor 76, the controller 13 rotates the motor 8.

In response to determining that the auxiliary handle 100A is attached based on the detection signals from the attachment sensor 70 and the position sensor 76, the controller 13 rotates the motor 8.

The controller 13 includes a determiner 13L and a motor controller 13M.

The determiner 13L receives a detection signal from the attachment sensor 70. The determiner 13L determines whether the auxiliary handle 100A is attached to the gear case 5 based on the detection signal from the attachment sensor 70.

The motor controller 13M outputs a control signal for controlling the rotation of the motor 8. The rotation of the motor 8 is controlled to control the rotation of the output shaft 6.

Control Method

Figure 16:
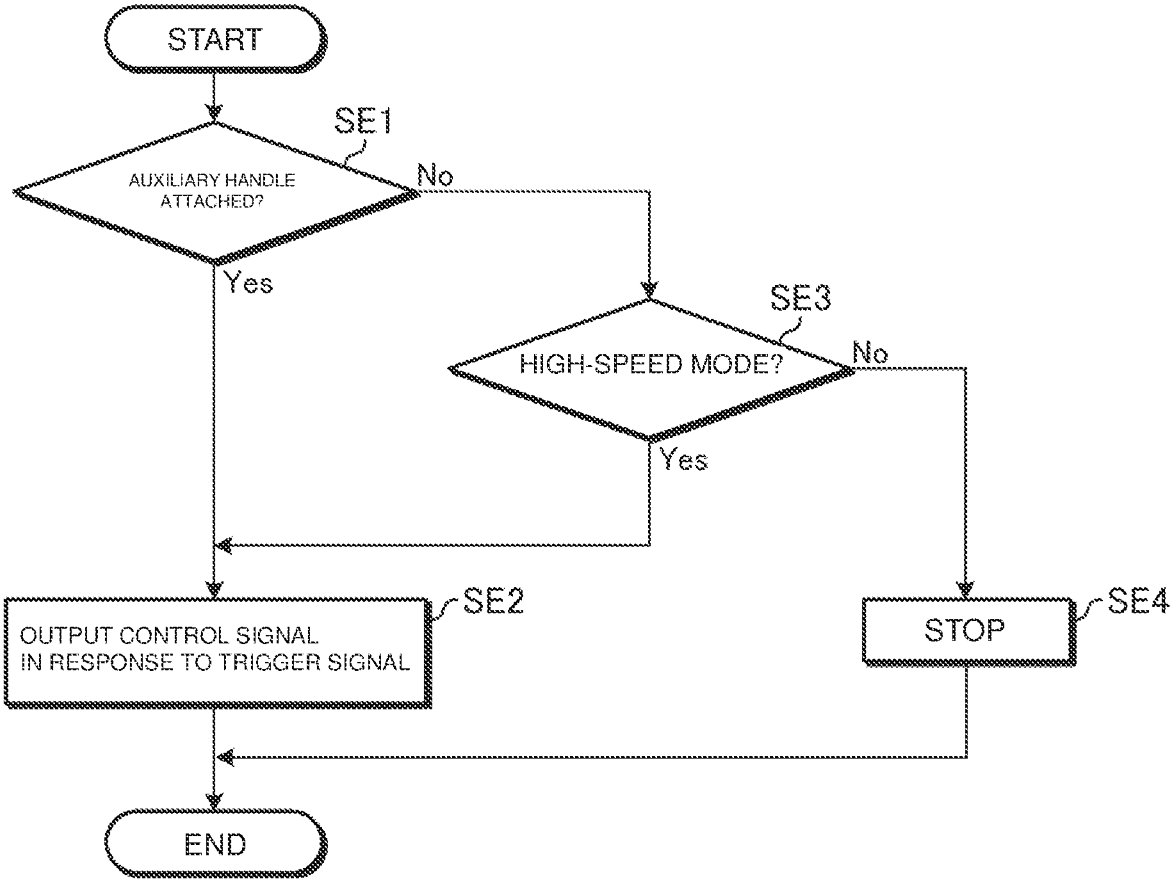
FIG. 16 is a flowchart of a method for controlling the power tool according to the fifth embodiment.

FIG. 16 is a flowchart of a method for controlling the power tool 1E according to the present embodiment. The determiner 13L receives a detection signal from the attachment sensor 70. The determiner 13L determines whether the auxiliary handle 100A is attached to the gear case 5 based on the detection signal from the attachment sensor 70 (step SE1).

When the auxiliary handle 100A is determined to be attached to the gear case 5 in step SE1 (Yes in step SE1), the motor controller 13M outputs a control signal for rotating the motor 8 to the inverter 71 in response to a trigger signal (step SE2).

When the auxiliary handle 100A is determined not to be attached to the gear case 5 in step SE1 (No in step SE1), the motor controller 13M determines whether the high-speed mode is set based on the detection signal from the position sensor 76 (step SE3).

When the high-speed mode is determined to be set in step SE3 (Yes in step SE3), the motor controller 13M outputs a control signal for rotating the motor 8 to the inverter 71 in response to a trigger signal (step SE2). The output shaft 6 rotates in the high-speed mode.

When the rotational speed is determined not to be set to the high-speed mode in step SE3 (No in step SE3), the motor controller 13M disables rotation of the motor 8. The motor controller 13M does not rotate the motor 8 upon receiving a trigger signal. The motor controller 13M outputs a control signal for stopping the motor 8 (step SE4).

As described above, the motor 8 in the present embodiment does not rotate when the auxiliary handle 100A is not attached and the low-speed mode is set. In other words, the power tool 1E without the auxiliary handle 100A is less likely to receive a greater reaction force. When the auxiliary handle 100A is not attached but the high-speed mode is set, the motor 8 rotates, rotating the output shaft 6 in the high-speed mode. The output shaft 6 generates a lower torque in the high-speed mode than in the low-speed mode. Thus, the power tool 1E is less likely to spin on the output shaft 6 during work using the power tool 1E. When the auxiliary handle 100A is attached, the motor 8 rotates, rotating the output shaft 6 in the high-speed mode or in the low-speed mode. When the auxiliary handle 100A is attached to the power tool 1E and the operator holds the auxiliary handle 100A, the power tool 1E receives a greater reaction force.

Sixth Embodiment

A sixth embodiment will now be described. The same or corresponding components as those in the above embodiments are herein given the same reference numerals, and will be described briefly or will not be described.

The present embodiment is a modification of the third embodiment described above.

Figure 17:
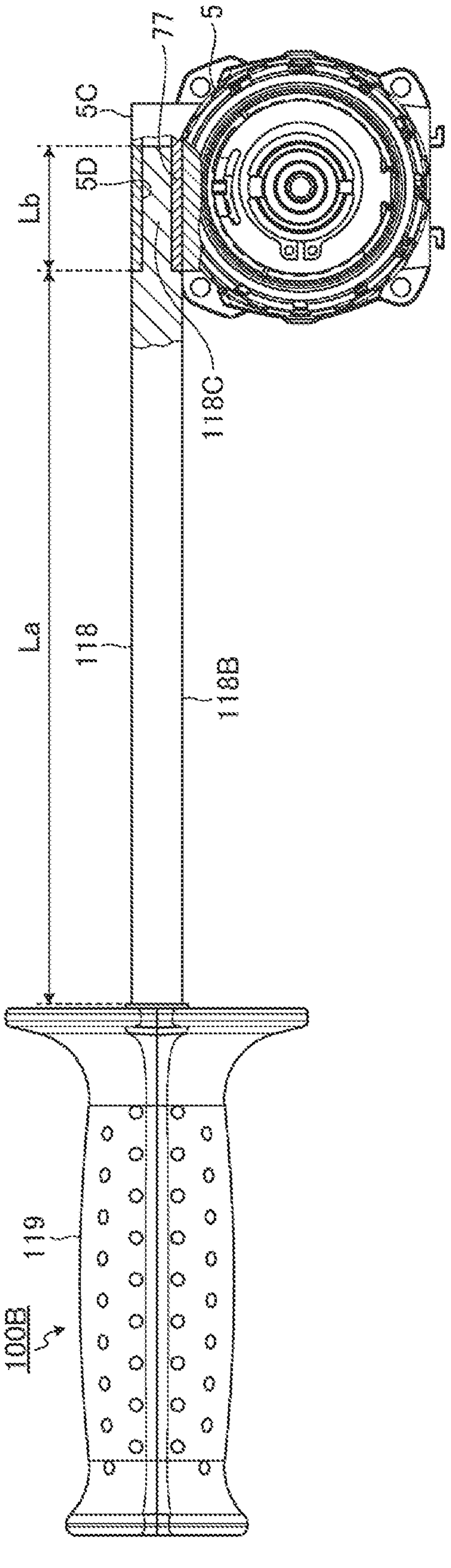
FIG. 17 is a side view of an auxiliary handle according to a sixth embodiment.

FIG. 17 is a side view of a first auxiliary handle 100B according to the present embodiment. The first auxiliary handle 100B according to the present embodiment does not include the first arm or the second arm. The first auxiliary handle 100B includes a rod 118 and a handle 119. The rod 118 includes a larger-diameter portion 118B and a threaded portion 118C. The threaded portion 118C has a smaller diameter than the larger-diameter portion 118B.

The gear case 5 includes a protrusion 5C protruding upward. The protrusion 5C has a threaded hole 5D. The threaded portion 118C of the first auxiliary handle 100B is placed into the threaded hole 5D in the gear case 5. The threaded portion 118C and the threaded hole 5D are engaged with each other, and the first auxiliary handle 100B is attached to the gear case 5.

Figure 18:
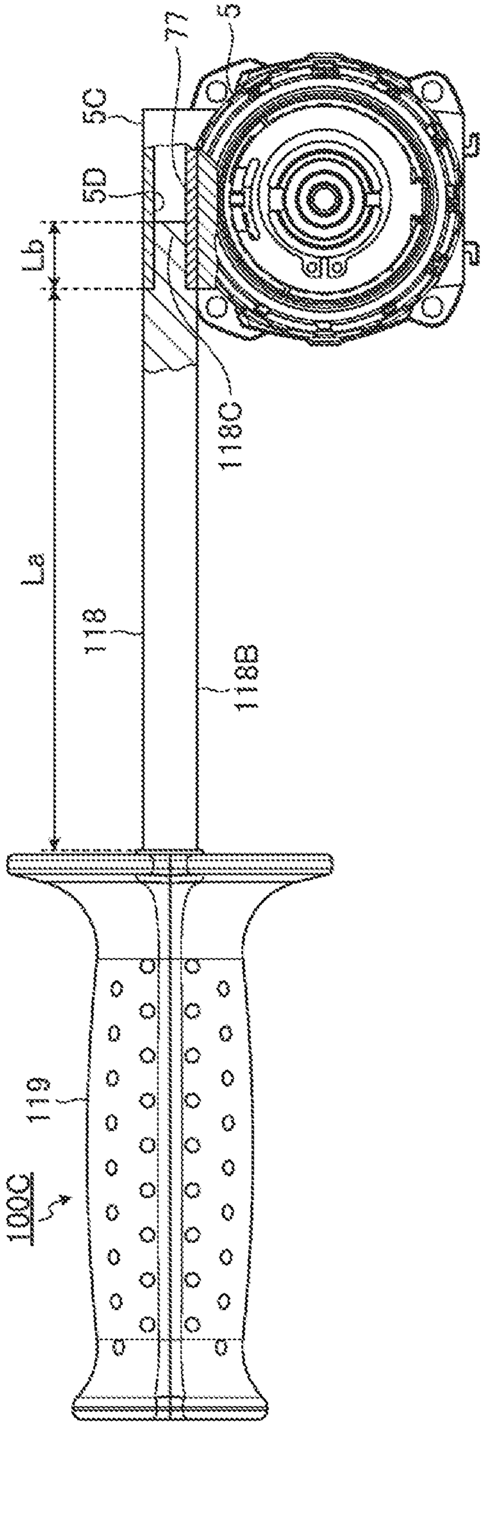
FIG. 18 is a side view of an auxiliary handle according to the sixth embodiment.

FIG. 18 is a side view of a second auxiliary handle 100C according to the present embodiment. Similarly to the first auxiliary handle 100B, the second auxiliary handle 100C includes the rod 118 and the handle 119. The rod 118 includes the larger-diameter portion 118B and the threaded portion 118C placed in the threaded hole 5D in the gear case 5.

The larger-diameter portion 118B of the first auxiliary handle 100B has a length La longer than a length La of the larger-diameter portion 118B of the second auxiliary handle 100C. The threaded portion 118C of the first auxiliary handle 100B has a length Lb longer than the length Lb of the threaded portion 118C of the second auxiliary handle 100C. The length Lb is substantially proportional to the length La. The length Lb is longer as the length La is longer. The length Lb is shorter as the length La is shorter.

The gear case 5 includes an attachment sensor 77. The attachment sensor 77 detects the first auxiliary handle 100B or the second auxiliary handle 100C being attached. The attachment sensor 77 is located inside the threaded hole 5D. The first auxiliary handle 100B or the second auxiliary handle 100C placed in the threaded hole 5D comes in contact with the attachment sensor 77. The attachment sensor 77 in contact with the first auxiliary handle 100B or the second auxiliary handle 100C detects the first auxiliary handle 100B or the second auxiliary handle 100C being attached.

The attachment sensor 77 determines the length Lb of the threaded portion 118C received in the threaded hole 5D. The attachment sensor 77 extends in the longitudinal direction of the threaded hole 5D. The attachment sensor 77 determines the length Lb based on its area of contact with the threaded portion 118C. As described above, the length Lb is substantially proportional to the length La. The attachment sensor 77 determines the length La by determining the length Lb.

Controller

Figure 19:
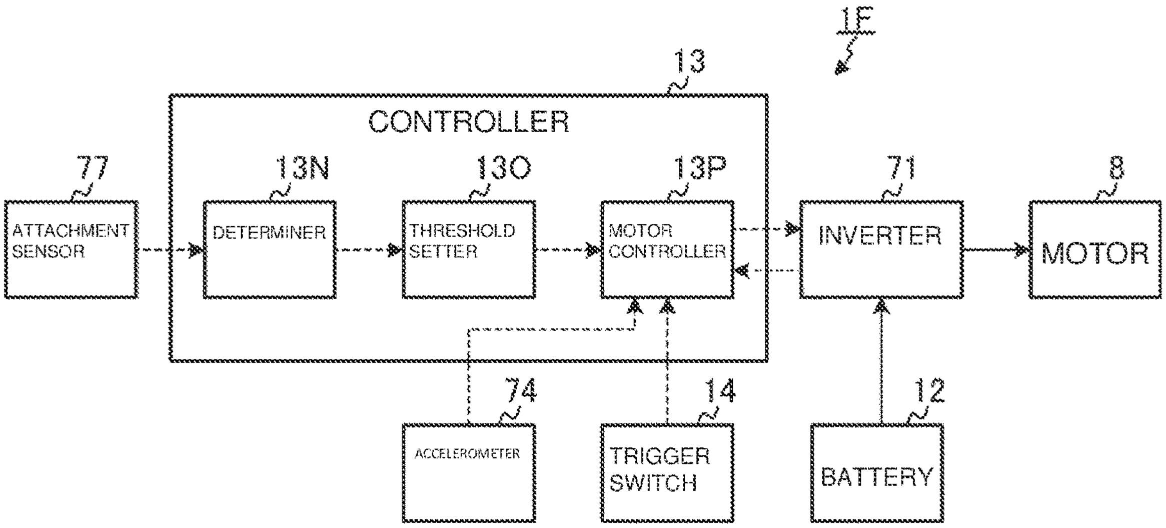
FIG. 19 is a block diagram of a power tool according to the sixth embodiment.

FIG. 19 is a block diagram of a power tool 1F according to the present embodiment. As shown in FIG. 19, the power tool 1F includes the attachment sensor 77, the controller 13, the trigger switch 14, the inverter 71, the battery 12, the motor 8, and the accelerometer 74.

As in the third embodiment described above, the accelerometer 74 detects the acceleration of the housing 2 when the power tool 1F spins on the output shaft 6 during work using the power tool 1F. When the power tool 1F spins rapidly on the output shaft 6, the housing 2 has a greater acceleration.

The controller 13 outputs a control signal for controlling the rotation of the output shaft 6 based on a detection signal from the attachment sensor 77. The controller 13 sets a threshold for the acceleration of the housing 2 based on the detection signal from the attachment sensor 77. The controller 13 outputs a control signal for controlling the rotation of the output shaft 6 based on the threshold. The control signal output from the controller 13 includes a control signal for stopping the rotation of the motor 8 in response to the acceleration of the housing 2 detected by the accelerometer 74 exceeding the threshold.

As described above, the attachment sensor 77 determines the length La of the larger-diameter portion 118B of the first auxiliary handle 100B or the length La of the larger-diameter portion 118B of the second auxiliary handle 100C. The length La of the larger-diameter portion 118B of the first auxiliary handle 100B is referred to as a first length for convenience. The length La of the larger-diameter portion 118B of the second auxiliary handle 100C is referred to as a second length for convenience.

In response to determining that the first auxiliary handle 100B with the first length is attached based on the detection signal from the attachment sensor 77, the controller 13 sets the threshold to a first acceleration value. In response to determining that the second auxiliary handle 100C with the second length shorter than the first length is attached based on the detection signal from the attachment sensor 77, the controller 13 sets the threshold to a second acceleration value less than the first acceleration value. In response to determining that neither the first auxiliary handle 100B nor the second auxiliary handle 100C is attached based on the detection signal from the attachment sensor 77, the controller 13 sets the threshold to a third acceleration value less than the second acceleration value.

The controller 13 includes a determiner 13N, a threshold setter 13O, and a motor controller 13P.

The determiner 13N receives a detection signal from the attachment sensor 77. The determiner 13N determines whether the first auxiliary handle 100B or the second auxiliary handle 100C is attached to the gear case 5 based on the detection signal from the attachment sensor 77. Based on the detection signal from the attachment sensor 77, the determiner 13N also determines the length Lb and identifies the auxiliary handle attached to the gear case 5 as either the first auxiliary handle 100B or the second auxiliary handle 100C.

The threshold setter 13O sets a threshold for the acceleration of the housing 2 based on the detection signal from the attachment sensor 77. When the determiner 13N determines that the first auxiliary handle 100B with the first length is attached to the gear case 5, the threshold setter 13O sets the threshold to the first acceleration value. When the determiner 13N determines that the second auxiliary handle 100C with the second length is attached to the gear case 5, the threshold setter 13O sets the threshold to the second acceleration value less than the first acceleration value. When the determiner 13N determines that neither the first auxiliary handle 100B nor the second auxiliary handle 100C is attached to the gear case 5, the threshold setter 13O sets the threshold to the third acceleration value less than the second acceleration value.

The motor controller 13P outputs a control signal for controlling the rotation of the motor 8. The rotation of the motor 8 is controlled to control the rotation of the output shaft 6.

Control Method

Figure 20:
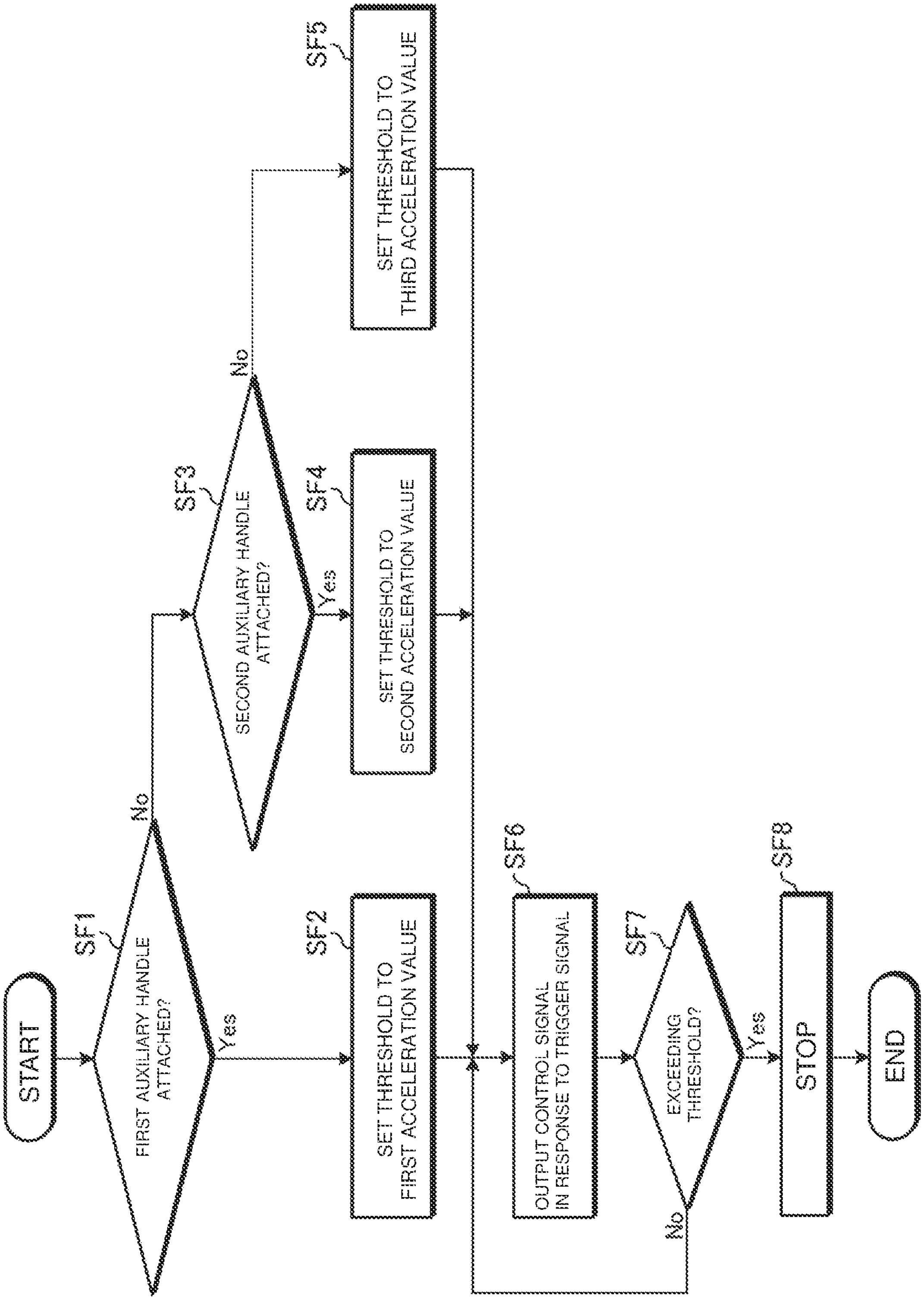
FIG. 20 is a flowchart of a method for controlling the power tool according to the sixth embodiment.

FIG. 20 is a flowchart of a method for controlling the power tool 1F according to the present embodiment. The determiner 13N receives a detection signal from the attachment sensor 77. The determiner 13N determines whether the first auxiliary handle 100B is attached to the gear case 5 based on the detection signal from the attachment sensor 77 (step SF1).

When the first auxiliary handle 100B is determined to be attached to the gear case 5 in step SF1 (Yes in step SF1), the threshold setter 13O sets the threshold to the first acceleration value (step SF2).

When the first auxiliary handle 100B is determined not to be attached to the gear case 5 in step SF1 (No in step SF1), the determiner 13N determines whether the second auxiliary handle 100C is attached to the gear case 5 based on the detection signal from the attachment sensor 77 (step SF3).

When the second auxiliary handle 100C is determined to be attached to the gear case 5 in step SF3 (Yes in step SF3), the threshold setter 13O sets the threshold to the second acceleration value less than the first acceleration value (step SF4).

When neither the first auxiliary handle 100B nor the second auxiliary handle 100C is determined to be attached to the gear case 5 in step SF3 (No in step SF3), the threshold setter 13O sets the threshold to the third acceleration value less than the second acceleration value (step SF5).

In response to an operation on the trigger switch 14, the trigger switch 14 outputs a trigger signal for rotating the motor 8. The motor controller 13P receives the trigger signal from the trigger switch 14. In response to the trigger signal, the motor controller 13P outputs a control signal for rotating the motor 8 to the inverter 71 (step SF6).

The motor controller 13P receives a detection signal from the accelerometer 74. Based on the detection signal from the accelerometer 74, the motor controller 13P determines whether the acceleration acting on the housing 2 exceeds the threshold (step SF7).

When the acceleration acting on the housing 2 is determined not to exceed the threshold in step SF7 (No in step SF7), the motor controller 13P allows continuous rotation of the motor 8.

When the acceleration acting on the housing 2 is determined to exceed the threshold in step SF7 (Yes in step SF7), the motor controller 13P outputs a control signal for stopping the rotation of the motor 8 to the inverter 71 (step SF8).

As described above, in response to determining that neither the first auxiliary handle 100B nor the second auxiliary handle 100C is attached to the power tool 1F, the controller 13 in the present embodiment rotates the motor 8 until the acceleration of the housing 2 exceeds the third acceleration value, and stops rotating the motor 8 in response to the acceleration of the housing 2 exceeding the third acceleration value. When the power tool 1F without the first auxiliary handle 100B or the second auxiliary handle 100C receives a reaction force on the output shaft 6, the power tool 1C may spin rapidly on the output shaft 6. In the present embodiment, the rotation of the motor 8 is stopped in response to the acceleration of the housing 2 exceeding the third acceleration value. In other words, the rotation of the motor 8 is stopped before the power tool 1F receives a greater reaction force. Thus, the power tool 1F is less likely to receive a greater reaction force.

In response to determining that the second auxiliary handle 100C is attached to the power tool 1F, the controller 13 rotates the motor 8 until the acceleration of the housing 2 exceeds the second acceleration value, and stops rotating the motor 8 in response to the acceleration of the housing 2 exceeding the second acceleration value. When the power tool 1F with the second auxiliary handle 100C attached to it receives a reaction force on the output shaft 6, the operator holding the second auxiliary handle 100C can stably hold the power tool 1F.

In response to determining that the first auxiliary handle 100B is attached to the power tool 1F, the controller 13 rotates the motor 8 until the acceleration of the housing 2 exceeds the first acceleration value, and stops rotating the motor 8 in response to the acceleration of the housing 2 exceeding the first acceleration value. The first auxiliary handle 100B is longer than the second auxiliary handle 100C. Thus, when the power tool 1F with the first auxiliary handle 100B attached to it receives a greater reaction force on the output shaft 6, the operator holding the first auxiliary handle 100B can stably hold the power tool 1F.

Seventh Embodiment

A seventh embodiment will now be described. The same or corresponding components as those in the above embodiments are herein given the same reference numerals, and will be described briefly or will not be described.

The present embodiment is a modification of the fourth embodiment described above. As in the sixth embodiment described above, the gear case 5 includes the threaded hole 5D, and the first auxiliary handle 100B or the second auxiliary handle 100C is attached to the gear case 5.

Controller

Figure 21:
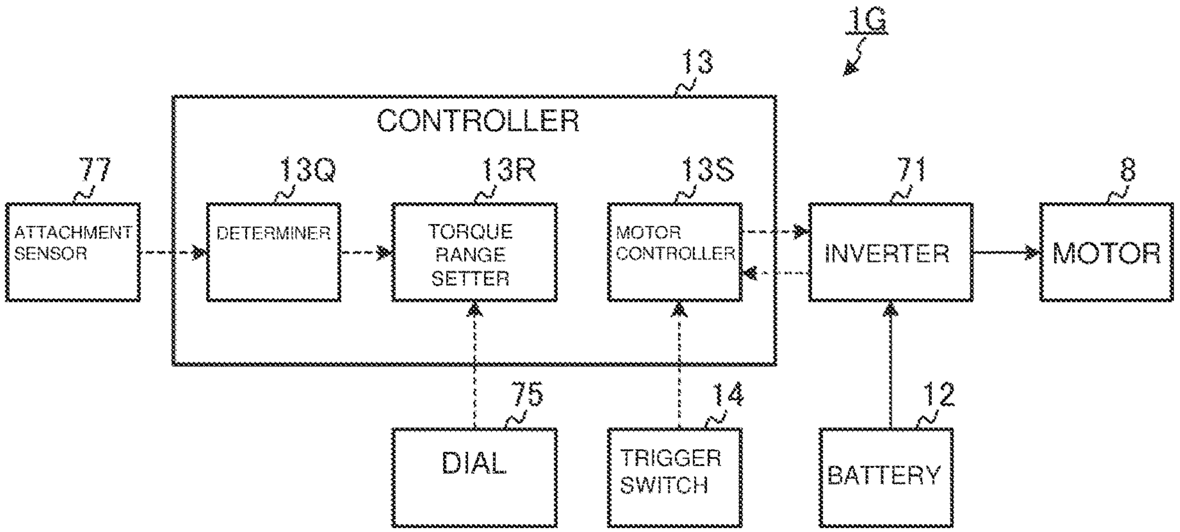
FIG. 21 is a block diagram of a power tool according to a seventh embodiment.

FIG. 21 is a block diagram of a power tool 1G according to the present embodiment. As shown in FIG. 21, the power tool 1D includes the attachment sensor 77, the controller 13, the trigger switch 14, the inverter 71, the battery 12, the motor 8, and the dial 75.

As in the fourth embodiment described above, the power tool 1F includes no clutch assembly 40. The controller 13 may set the clutch mode or the drill mode. In the clutch mode, the controller 13 stops rotating the motor 8 in response to a rotational load on the output shaft 6 reaching a release value. In the drill mode, the controller 13 rotates the motor 8 with any rotational load on the output shaft 6.

The release value is set through an operation on the dial 75. The dial 75 is located, for example, in the controller compartment 2C. The operator operates the dial 75 to set the release value.

The controller 13 includes a determiner 13Q, a torque range setter 13R, and a motor controller 13S.

The determiner 13Q receives a detection signal from the attachment sensor 77. The determiner 13Q determines whether the first auxiliary handle 100B or the second auxiliary handle 100C is attached to the gear case 5 based on the detection signal from the attachment sensor 77. The determiner 13Q also determines the length Lb based on the detection signal from the attachment sensor 77 to identify the auxiliary handle attached to the gear case 5 as either the first auxiliary handle 100B or the second auxiliary handle 100C.

The torque range setter 13R sets a torque range indicating the range of release values that can be set with the dial 75. When the determiner 13Q determines that the first auxiliary handle 100B is attached to the gear case 5, the torque range setter 13R sets the torque range to a first torque range. When the determiner 13Q determines that the second auxiliary handle 100C is attached to the gear case 5, the torque range setter 13R sets the torque range to a second torque range. When the determiner 13Q determines that neither the first auxiliary handle 100B nor the second auxiliary handle 100C is attached to the gear case 5, the torque range setter 13R sets the torque range to a third torque range.

The maximum value of the third torque range is less than the maximum value of the second torque range. The maximum value of the second torque range is less than the maximum value of the first torque range. For the release value settable to one of 40 release values, the first torque range includes the 40 release values when the first auxiliary handle 100B is attached to the gear case 5. In other words, the first torque range includes first to 40th release values. Of the 40 release values, the first release value is the least. The release values become greater toward the 40th release value. The 40th release value is the greatest. When the second auxiliary handle 100C is attached to the gear case 5, the second torque range includes, for example, 30 release values. The second torque range includes the first to 30th release values. When neither the first auxiliary handle 100B nor the second auxiliary handle 100C is attached to the gear case 5, the third torque range includes, for example, 20 release values. The third torque range includes the first to 20th release values.

The 20th release value, or the maximum value of the third torque range, is less than the 30th release value, or the maximum value of the second torque range. The 30th release value, or the maximum value of the second torque range, is less than the 40th release value, or the maximum value of the first torque range.

The motor controller 13S outputs a control signal for controlling the rotation of the motor 8. The rotation of the motor 8 is controlled to control the rotation of the output shaft 6.

The motor controller 13S monitors a current supplied from the battery 12 to the coils 81D in the motor 8 through the inverter 71. The motor controller 13S calculates a rotational load on the output shaft 6 based on the current supplied from the battery 12 to the coils 81D in the motor 8.

Control Method

Figure 22:
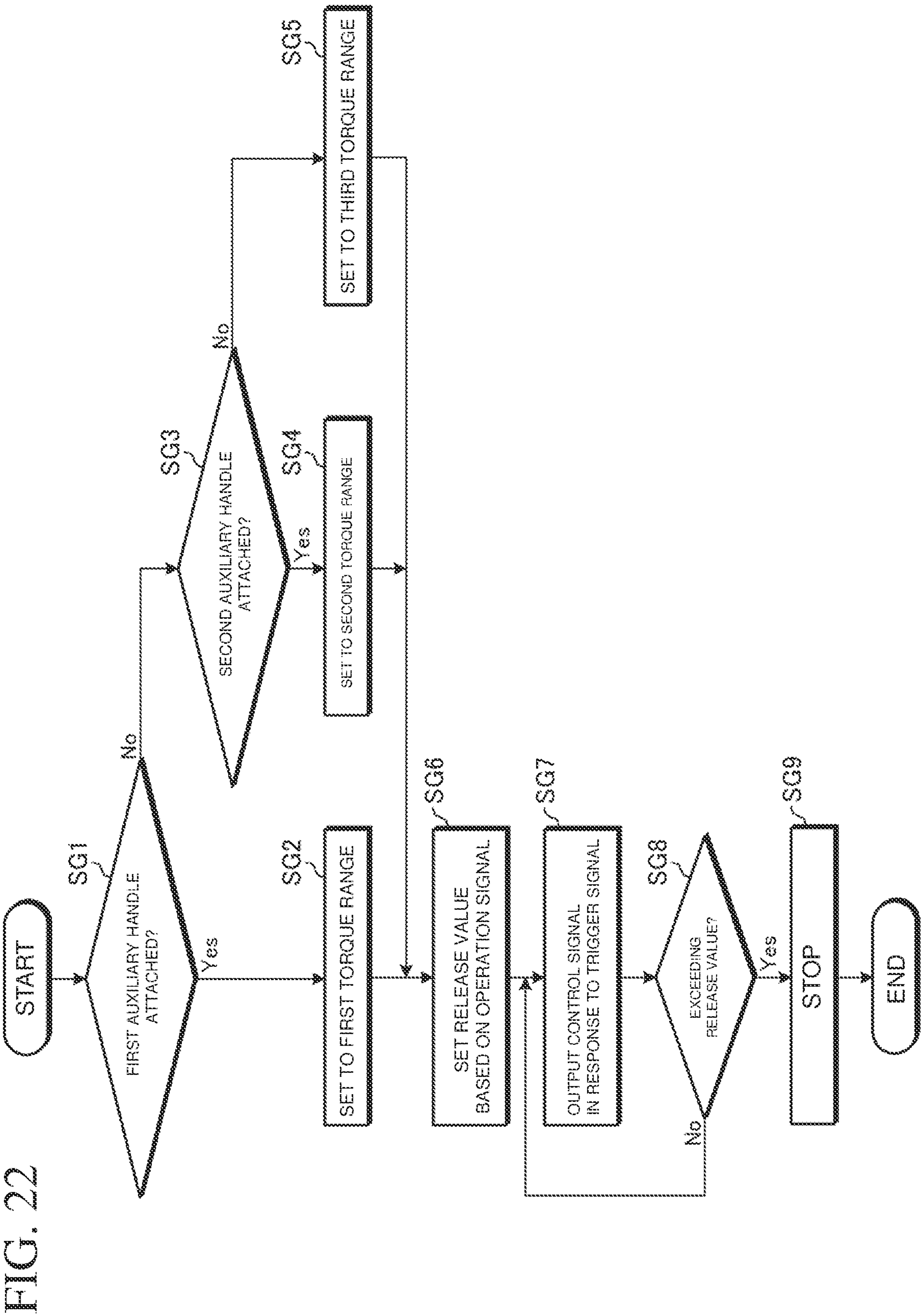
FIG. 22 is a flowchart of a method for controlling the power tool according to the seventh embodiment.

FIG. 22 is a flowchart of a method for controlling the power tool 1G according to the present embodiment. The determiner 13Q receives a detection signal from the attachment sensor 77. The determiner 13Q determines whether the first auxiliary handle 100B is attached to the gear case 5 based on the detection signal from the attachment sensor 77 (step SG1).

When the first auxiliary handle 100B is determined to be attached to the gear case 5 in step SG1 (Yes in step SG1), the torque range setter 13R sets the torque range to the first torque range (step SG2).

When the first auxiliary handle 100B is determined not to be attached to the gear case 5 in step SG1 (No in step SG1), the determiner 13Q determines whether the second auxiliary handle 100C is attached to the gear case 5 based on the detection signal from the attachment sensor 77 (step SG3).

When the second auxiliary handle 100C is determined to be attached to the gear case 5 in step SG3 (Yes in step SG3), the torque range setter 13R sets the torque range to the second torque range (step SG4).

When neither the first auxiliary handle 100B nor the second auxiliary handle 100C is determined to be attached to the gear case 5 in step SG3 (No in step SG3), the torque range setter 13R sets the torque range to the third torque range (step SG5).

The operator operates the dial 75 to set a release value for a rotational load for stopping the rotation of the motor 8. The dial 75 outputs an operation signal to the torque range setter 13R. The torque range setter 13R sets a release value based on the operation signal from the dial 75 (step SG6).

When the first auxiliary handle 100B is attached to the gear case 5, or the torque range is set to the first torque range, the operator can set any release value from the first to 40th release values. When the second auxiliary handle 100C is attached to the gear case 5, or the torque range is set to the second torque range, the operator can set any release value from the first to 30th release values but cannot set a release value from the 31st to 40th release values. When neither the first auxiliary handle 100B nor the second auxiliary handle 100C is attached to the gear case 5, or the torque range is set to the third torque range, the operator can set any release value from the first to 20th release values but cannot set a release value from the 21st to 40th release values.

In response to an operation on the trigger switch 14, the trigger switch 14 outputs a trigger signal for rotating the motor 8. The motor controller 13S receives the trigger signal from the trigger switch 14. In response to the trigger signal, the motor controller 13S outputs a control signal for rotating the motor 8 to the inverter 71 (step SG7).

The battery 12 supplies a current to the coils 81D in the motor 8. The motor controller 13S monitors a current supplied from the battery 12 to the coils 81D in the motor 8 through the inverter 71. The motor controller 13S calculates a rotational load on the output shaft 6 based on the current supplied from the battery 12 to the coils 81D in the motor 8.

The motor controller 13S determines whether the rotational load on the output shaft 6 exceeds the release value (step SG8).

When the rotational load on the output shaft 6 is determined not to exceed the release value in step SG8 (No in step SG8), the motor controller 13S allows continuous rotation of the motor 8.

When the rotational load on the output shaft 6 is determined to exceed the release value in step SG8 (Yes in step SG8), the motor controller 13S outputs a control signal for stopping the rotation of the motor 8 to the inverter 71 (step SG9).

As described above, when the controller 13 in the present embodiment determines that neither the first auxiliary handle 100B nor the second auxiliary handle 100C is attached to the power tool 1G, the 21st or greater release values are excluded. The rotational load on the output shaft 6 is less likely to increase. Thus, the power tool 1F is less likely to receive a greater reaction force.

When the controller 13 determines that the second auxiliary handle 100C is attached to the power tool 1A, a release value may be set from values up to the 30th release value. Although a greater release value such as the 30th release value increases a reaction force acting on the power tool 1G during work using the power tool 1G, the operator holding the second auxiliary handle 100C attached to the power tool 1G can receive the reaction force acting on the power tool 1G.

When the controller 13 determines that the first auxiliary handle 100B is attached to the power tool 1A, a release value may be set from values up to the 40th release value. Although a greater release value such as the 40th release value increases a reaction force to act on the power tool 1G during work using the power tool 1G, the operator holding the first auxiliary handle 100B attached to the power tool 1G can receive the reaction force acting on the power tool 1G.

Eighth Embodiment

An eighth embodiment will now be described. The same or corresponding components as those in the above embodiments are herein given the same reference numerals, and will be described briefly or will not be described.

Auxiliary Handle

Figure 23:
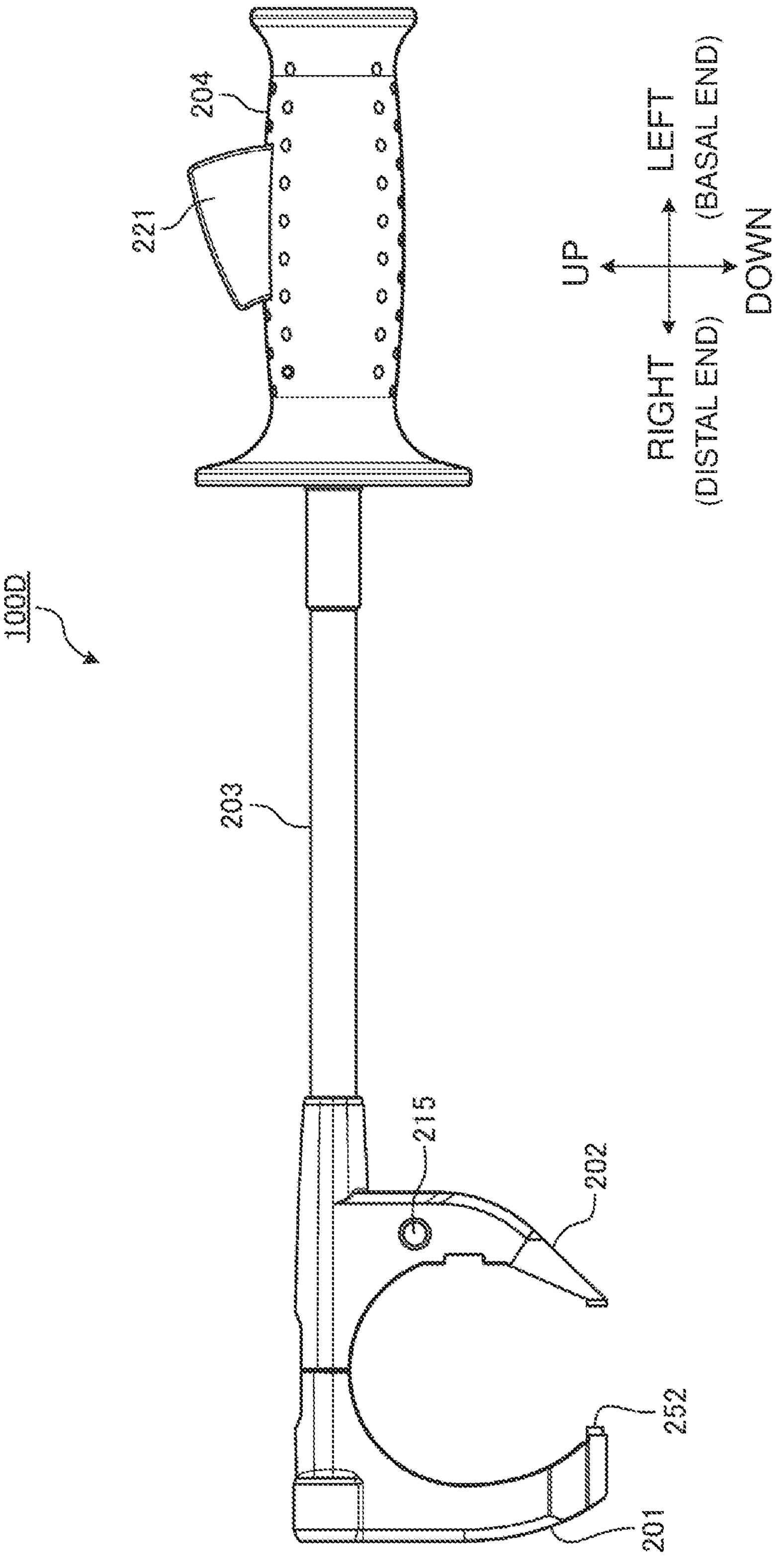
FIG. 23 is a side view of an auxiliary handle according to an eighth embodiment.
Figure 24:
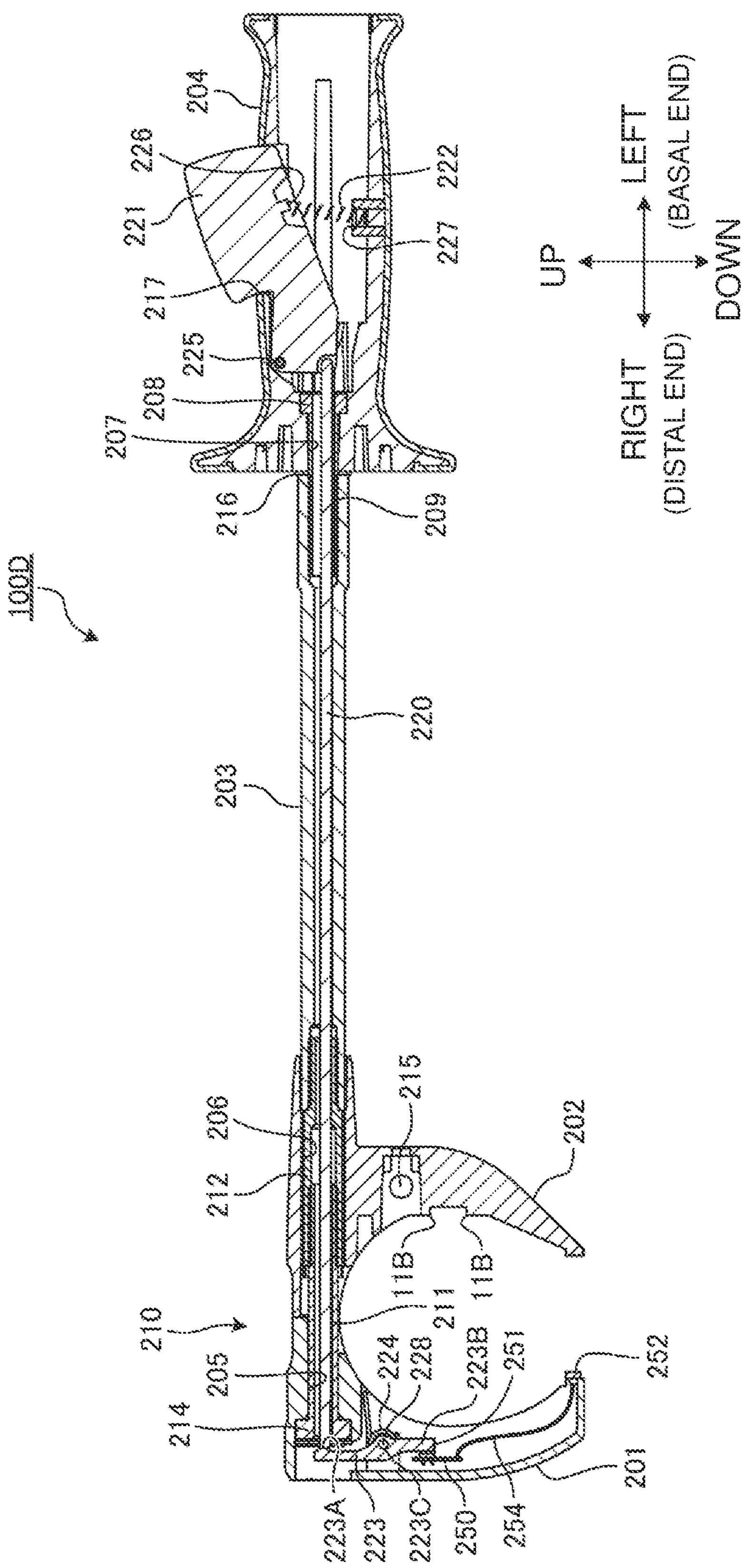
FIG. 24 is a sectional view of the auxiliary handle according to the eighth embodiment.

FIG. 23 is a side view of an auxiliary handle 100D according to the present embodiment. FIG. 24 is a sectional view of the auxiliary handle 100D according to the present embodiment.

The auxiliary handle 100D according to the present embodiment is used for the power tool 1A including the attachment sensor 70 described above in the first embodiment. The attachment sensor 70 in the present embodiment detects the auxiliary handle 100D being attached to at least a part of the power tool 1A and detects at least a portion of the auxiliary handle 100D being gripped by the operator. The attachment sensor 70 in the present embodiment is not limited to a magnetic sensor.

As shown in FIGS. 23 and 24, the auxiliary handle 100D includes a first arm 201, a second arm 202, a rod 203, a handle 204, and a pipe 209. The second arm 202 is movable relative to the first arm 201.

The first arm 201 and the second arm 202 are each attachable to the gear case 5. The first arm 201 and the second arm 202 are laterally movable relative to each other. The gear case 5 is fastened between the first arm 201 and the second arm 202. The gear case 5 is fastened as the first arm 201 and the second arm 202 move relative to each other in the lateral direction. Thus, the auxiliary handle 100D is attached to the power tool 1A.

The rod 203 extends in the lateral direction. The rod 203 is tubular. The rod 203 has an internal space. The rod 203 is connected to the second arm 202. The first arm 201 is located rightward from (closer to the distal end than) the second arm 202. The second arm 202 is connected to the right end (distal end) of the rod 203. The left end face of the rod 203 is connected to the right end face of the handle 204 with a washer 216 in between.

The handle 204 is grippable by the operator. The handle 204 has an internal space. The handle 204 has a through-hole 207 in its right end (distal end). The through-hole 207 connects the inside and the outside of the handle 204.

The pipe 209 is cylindrical. The pipe 209 includes a right portion located inside the rod 203. The pipe 209 includes a left portion received in the through-hole 207 in the handle 204. The rod 203 includes a nut 208 at its left end. The nut 208 is fixed to the inner surface of the handle 204. The pipe 209 and the handle 204 are fastened together with the nut 208. The pipe 209 and the rod 203 are fixed together. The rod 203 and the handle 204 are fixed together with the pipe 209 in between.

The auxiliary handle 100D includes a fastener 210. The fastener 210 allows relative movement between the first arm 201 and the second arm 202. The fastener 210 is operable by the operator. In response to an operation on the fastener 210, the first arm 201 and the second arm 202 move relative to each other, or specifically, toward each other or away from each other.

The fastener 210 includes a pipe 211 and a slider 212. The pipe 211 is fixed to the first arm 201. The slider 212 is supported by the second arm 202. The slider 212 is movable relative to the pipe 211.

The pipe 211 is cylindrical. The pipe 211 is at least partially received in a through-hole 205 in the first arm 201. The through-hole 205 extends laterally through an upper portion of the first arm 201. The pipe 211 includes a nut 214 at its right end. The nut 214 is fixed to the inner surface of the through-hole 205. The pipe 211 and the first arm 201 are fastened together with the nut 214.

The slider 212 is cylindrical. The slider 212 is received in a through-hole 206 in the second arm 202. The through-hole 206 extends laterally through an upper portion of the second arm 202. The left end of the slider 212 is fastened to the right end of the rod 203. The slider 212 has a thread on its outer surface. The inner surface defining the through-hole 206 has a threaded groove.

The pipe 211 is located at least partially inside the slider 212. The pipe 211 and the slider 212 move relative to each other in the axial direction of the pipe 211. The first arm 201 and the second arm 202 are connected together with the pipe 211 and the slider 212.

The operator uses the handle 204 to operate the fastener 210. The operator operates the handle 204 to rotate the handle 204. As the handle 204 rotates, the rod 203 and the slider 212 rotate. The pipe 211 is fixed to the first arm 201. As the slider 212 rotates, the second arm 202 moves in a direction toward the first arm 201 or in a direction away from the first arm 201.

The second arm 202 has a through-hole 215 for receiving a stopper pole (not shown).

To attach the auxiliary handle 100D to the power tool 1A, the operator operates the handle 204 to move the first arm 201 and the second arm 202 away from each other. The operator places the gear case 5 between the first arm 201 and the second arm 202.

With the gear case 5 located between the first arm 201 and the second arm 202, the operator operates the handle 204 to move the first arm 201 and the second arm 202 toward each other. The gear case 5 is fastened between the first arm 201 and the second arm 202.

The second arm 202 includes joints 11B engageable with the engaging portions 9 of the gear case 5. The joints 11B include protrusions to be fitted into the recesses on the engaging portions 9. The engaging portions 9 are engageable with the joints 11B in the auxiliary handle 100D.

Figure 25:
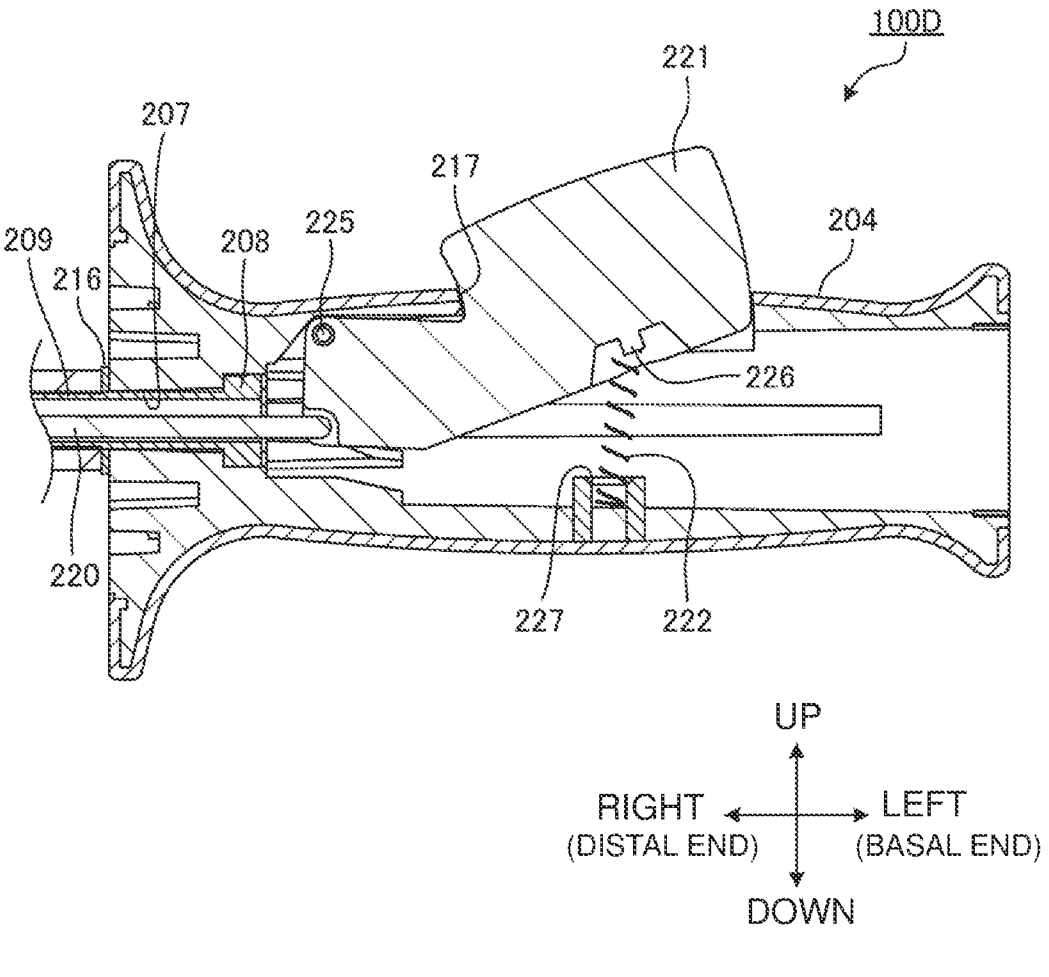
FIG. 25 is a sectional view of a handle in the auxiliary handle according to the eighth embodiment.
Figure 26:
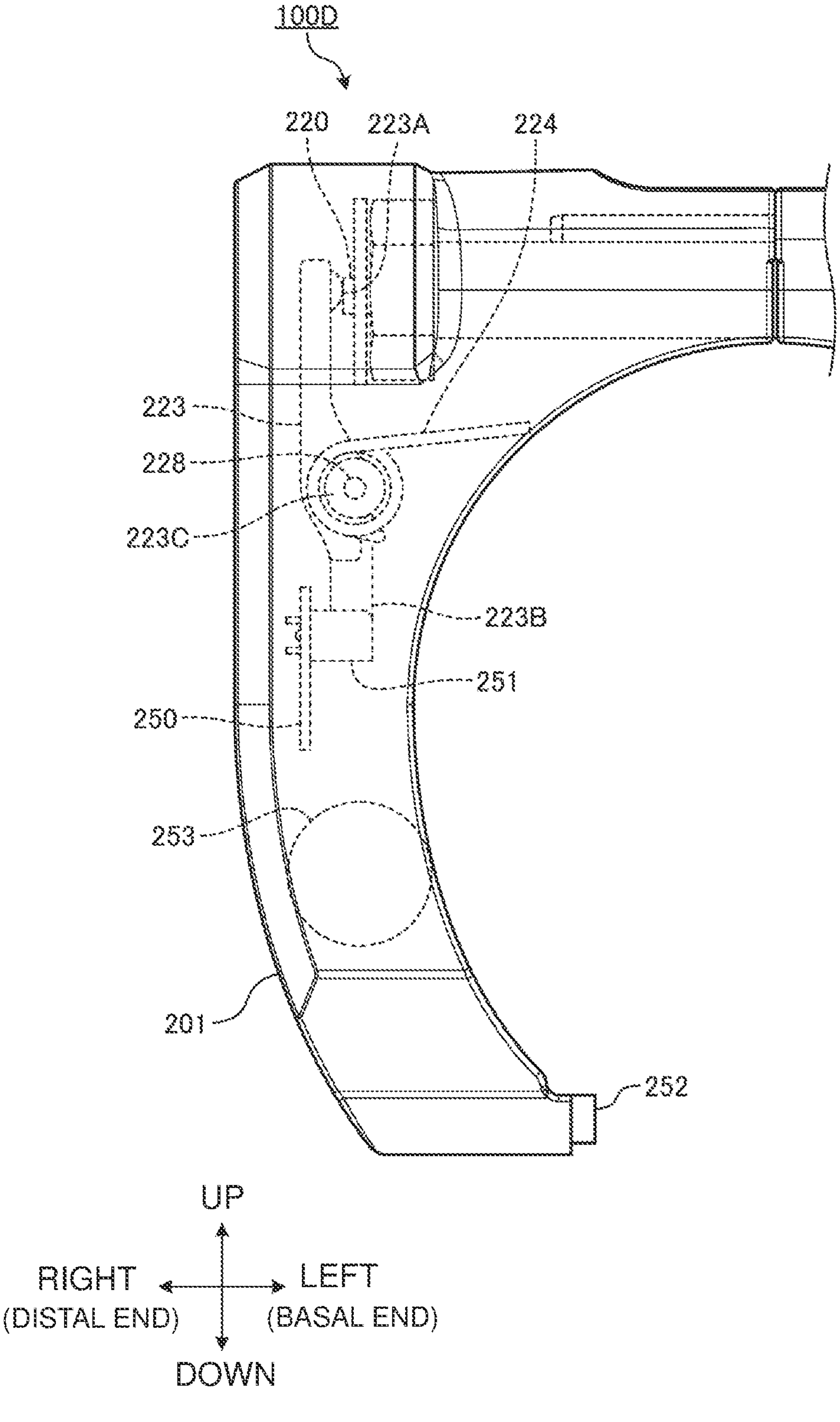
FIG. 26 is a view of a first arm in the auxiliary handle according to the eighth embodiment.

FIG. 25 is a sectional view of the handle 204 in the auxiliary handle 100D according to the present embodiment. FIG. 26 is a view of the first arm 201 in the auxiliary handle 100D according to the present embodiment.

As shown in FIGS. 24 to 26, the auxiliary handle 100D includes an actuation rod 220, an operation lever 221, a first elastic member 222, an actuation lever 223, and a second elastic member 224.

At least a part of the actuation rod 220 is supported by the first arm 201 and the second arm 202. The actuation rod 220 is movable relative to the first arm 201 and the second arm 202. The actuation rod 220 is laterally movable.

A part of the actuation rod 220 is located in an internal space of the pipe 211. A part of the actuation rod 220 is located in an internal space of the slider 212. A part of the actuation rod 220 is supported by the first arm 201 with the pipe 211 in between. A part of the actuation rod 220 is supported by the second arm 202 with the slider 212 in between. A part of the actuation rod 220 is located in the internal space of the rod 203. A part of the actuation rod 220 is located in an internal space of the pipe 209. A part of the actuation rod 220 is located in the internal space of the handle 204.

The operation lever 221 is located on the handle 204. A part of the operation lever 221 is received in an opening 217 in the handle 204. The opening 217 connects the inside and the outside of the handle 204. A part of the operation lever 221 is located in the internal space of the handle 204. A part of the operation lever 221 protrudes from the outer surface of the handle 204.

The left end (basal end) of the actuation rod 220 faces the right end of the operation lever 221 in the internal space of the handle 204.

The operation lever 221 is pivotably supported by the handle 204 with a pivot 225 (first pivot). The pivot 225 is located in the internal space of the handle 204. The pivot 225 connects the right end of the operation lever 221 to the handle 204. In FIG. 25, the pivot 225 is located above the left end of the actuation rod 220.

The first elastic member 222 is located in the internal space of the handle 204. The first elastic member 222 is connected to the operation lever 221 and the handle 204. The first elastic member 222 is a coil spring. In FIG. 25, the upper end of the first elastic member 222 is connected to a lower portion of the operation lever 221. The lower end of the first elastic member 222 is connected to the handle 204 at the bottom of the internal space. In the present embodiment, the operation lever 221 includes a protrusion 226 on its lower portion. The handle 204 has a recess 227 at the bottom of its internal space. The upper end of the first elastic member 222 is supported by the protrusion 226. The lower end of the first elastic member 222 is supported in the recess 227.

The first elastic member 222 is compressed between the operation lever 221 and the handle 204. The first elastic member 222 generates an elastic force (urging force) for moving the operation lever 221 outward from the internal space of the handle 204.

The actuation lever 223 is located inside the first arm 201. The actuation lever 223 is pivotably supported by the first arm 201 with a pivot 228 (second pivot). As shown in FIGS. 24 to 26, the actuation lever 223 includes an upper end 223A, a lower end 223B, and a middle portion 223C. The upper end 223A faces the right end face of the actuation rod 220. The middle portion 223C is connected to the first arm 201 with the pivot 228. The actuation lever 223 rotates about the pivot 228 with the upper end 223A moving rightward and the lower end 223B moving leftward. The actuation lever 223 rotates about the pivot 228 with the upper end 223A moving leftward and the lower end 223B moving rightward.

The second elastic member 224 is located inside the first arm 201. The second elastic member 224 surrounds the pivot 228. The second elastic member 224 is a torsion spring. The second elastic member 224 generates an elastic force (urging force) for rotating the actuation lever 223 in one direction. The second elastic member 224 generates an elastic force to move the upper end 223A leftward and the lower end 223B rightward.

The operation lever 221 is movable with the gear case 5 fastened between the first arm 201 and the second arm 202. The operator grips the handle 204 to operate the operation lever 221. The operation lever 221 moves when the handle 204 is gripped by the operator.

The operator operates the operation lever 221 to move the operation lever 221 into the internal space of the handle 204. The operation lever 221 is pivotably supported by the handle 204 with the pivot 225. When operated to move into the internal space of the handle 204, the operation lever 221 rotates about the pivot 225. The operation lever 221 rotates with its right end moving rightward.

As the operation lever 221 moves, the actuation rod 220 moves. As the right end of the operation lever 221 moves rightward, the actuation rod 220 is pushed by the operation lever 221 and moves rightward.

As the operation lever 221 and the actuation rod 220 move, the actuation lever 223 moves. As the right end of the operation lever 221 moves rightward, the actuation rod 220 moves rightward and pushes the upper end 223A of the actuation lever 223 rightward. The actuation lever 223 then rotates with its lower end 223B moving leftward.

The auxiliary handle 100D includes a control board 250, a grip sensor 251, a signal output unit 252, and a battery 253.

The control board 250 is located inside the first arm 201. The control board 250 is held by the first arm 201. The control board 250 is connected to the grip sensor 251 and the signal output unit 252.

The grip sensor 251 is located inside the first arm 201. The grip sensor 251 is supported by the control board 250.

The grip sensor 251 determines whether the handle 204 is gripped by the operator with the gear case 5 fastened between the first arm 201 and the second arm 202.

The grip sensor 251 in the present embodiment detects movement of the actuation lever 223 to detect the handle 204 being gripped by the operator. The grip sensor 251 detects movement of the lower end 223B of the actuation lever 223.

As described above, when the handle 204 is gripped by the operator, the operation lever 221 is operated. As the operation lever 221 moves into the internal space the handle 204, the actuation rod 220 is pushed by the operation lever 221 and moves rightward. Thus, the actuation lever 223 rotates with its lower end 223B moving leftward. In other words, when the handle 204 is gripped by the operator, the lower end 223B moves and changes its position. The grip sensor 251 detects the position of the lower end 223B to detect that the handle 204 is gripped by the operator. The grip sensor 251 detects the lower end 223B contactlessly. An example of the grip sensor 251 is a photo sensor.

The signal output unit 252 is located at the lower end of the first arm 201. The signal output unit 252 is connected to the control board 250 with a lead wire 254. The signal output unit 252 may be located at the lower end of the second arm 202, or at each of the lower ends of the first arm 201 and the second arm 202. The signal output unit 252 faces the attachment sensor 70 in the power tool 1A when the gear case 5 is fastened between the first arm 201 and the second arm 202.

Based on a detection signal from the grip sensor 251, the signal output unit 252 outputs a grip signal indicating that the handle 204 is gripped by the operator to the attachment sensor 70 in the power tool 1A.

The battery 253 supplies power to the control board 250, the grip sensor 251, and the signal output unit 252. The battery 253 serves as a power supply for the control board 250, the grip sensor 251, and the signal output unit 252.

The operator grips the handle 204 to operate the operation lever 221 to move the operation lever 221 into the internal space of the handle 204. The operation lever 221 is pivotably supported by the handle 204 with the pivot 225. When operated to move into the internal space of the handle 204, the operation lever 221 rotates about the pivot 225. The operation lever 221 rotates with its right end moving rightward.

As the operation lever 221 moves, the actuation rod 220 moves. As the right end of the operation lever 221 moves rightward, the actuation rod 220 is pushed by the operation lever 221 and moves rightward.

As the operation lever 221 and the actuation rod 220 move, the actuation lever 223 moves. As the right end of the operation lever 221 moves rightward, the actuation rod 220 moves rightward and pushes the upper end 223A of the actuation lever 223 rightward.

Thus, the actuation lever 223 rotates with its lower end 223B moving leftward.

The grip sensor 251 detects movement of the lower end 223B of the actuation lever 223. The grip sensor 251 detects the position of the lower end 223B to detect the handle 204 being gripped by the operator. The grip sensor 251 detects that the handle 204 is gripped by the operator by detecting the position of the lower end 223B having moved to the left. The grip sensor 251 transmits a detection signal to the control board 250.

In response to determining that the handle 204 is gripped by the operator based on the detection signal from the grip sensor 251, the control board 250 transmits a control signal for activating the signal output unit 252 to the signal output unit 252.

Based on the control signal from the control board 250, the signal output unit 252 outputs a grip signal indicating that the handle 204 is gripped by the operator. The attachment sensor 70 receives the grip signal from the signal output unit 252. Based on the grip signal from the signal output unit 252, the attachment sensor 70 detects the handle 204 being gripped by the operator.

Based on the detection signal from the attachment sensor 70, the controller 13 in the power tool 1A outputs a control signal for controlling the rotation of the output shaft 6. The detection signal from the attachment sensor 70 includes the grip signal. The controller 13 sets a threshold for rotation of the output shaft 6 based on the grip signal. The controller 13 outputs a control signal for controlling the rotation of the output shaft 6 based on the threshold. Based on the grip signal indicating that the handle 204 is gripped by the operator, the controller 13 sets the threshold to the first torque value.

In response to a release of the operation on the operation lever 221, an elastic force from the first elastic member 222 rotates the operation lever 221 to move from the internal space of the handle 204 to the outside. The operation lever 221 rotates with its right end moving leftward. The actuation rod 220 then moves leftward under an elastic force from the second elastic member 224. In other words, as the right end of the operation lever 221 moves leftward, the actuation rod 220 and the actuation lever 223 are free from a force from the operation lever 221. Thus, under an elastic force from the second elastic member 224, the actuation lever 223 rotates about the pivot 228 with its upper end 223A moving leftward and its lower end 223B moving rightward. As the upper end 223A of the actuation lever 223 moves leftward, the actuation rod 220 is pushed by the upper end 223A and moves leftward.

The grip sensor 251 detects the release of the operation on the operation lever 221 by detecting the position of the lower end 223B having moved rightward. The grip sensor 251 transmits a detection signal to the control board 250.

In response to determining that the operation on the operation lever 221 is released based on the detection signal from the grip sensor 251, the control board 250 transmits a control signal for stopping the activation of the signal output unit 252 to the signal output unit 252.

Based on the control signal from the control board 250, the signal output unit 252 outputs a grip release signal indicating that the operation on the operation lever 221 is released. The attachment sensor 70 receives the grip release signal from the signal output unit 252. In response to the grip release signal from the signal output unit 252, the attachment sensor 70 detects that the operation on the operation lever 221 is released.

Based on the detection signal from the attachment sensor 70, the controller 13 in the power tool 1A outputs a control signal for controlling the rotation of the output shaft 6. The detection signal from the attachment sensor 70 includes the grip release signal. In response to the grip release signal, the controller 13 sets the threshold to the second torque value less than the first torque value.

As described above, the power tool 1A according to the present embodiment includes the attachment sensor 70 that detects the auxiliary handle 100D being attached and the handle 204 of the auxiliary handle 100D is gripped by the operator. In response to a grip signal or a grip release signal received by the attachment sensor 70, the controller 13 outputs a control signal for controlling the rotation of the output shaft 6. In response to determining that the auxiliary handle 100D is attached to at least a part of the power tool 1A but not with its handle 204 gripped by the operator, the controller 13 controls the rotation of the output shaft 6 to avoid an increase in the rotational load on the output shaft 6. Thus, the power tool 1A is less likely to receive a greater reaction force. In response to determining that the auxiliary handle 100D is attached to at least a part of the power tool 1A with the handle 204 gripped by the operator, the controller 13 controls the rotation of the output shaft 6 to increase a rotational load on the output shaft 6. The operator gripping the handle 204 in the auxiliary handle 100D attached to the power tool 1A can receive a reaction force acting on the power tool 1A.

In the present embodiment, the control board 250 and the grip sensor 251 may be located in the second arm 202.

Ninth Embodiment

A ninth embodiment will now be described. The same or corresponding components as those in the above embodiments are herein given the same reference numerals, and will be described briefly or will not be described.

Auxiliary Handle

Figure 27:
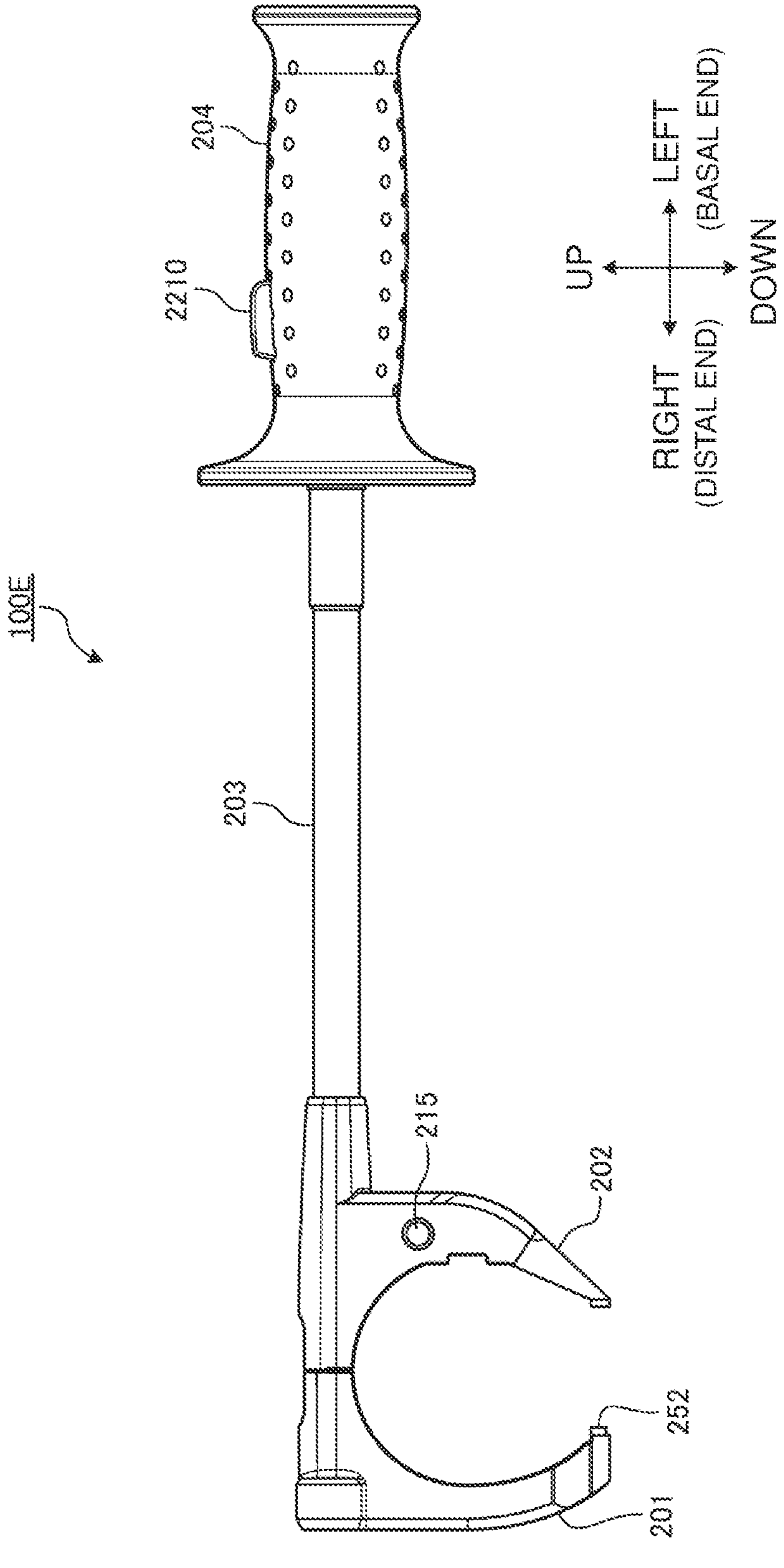
FIG. 27 is a side view of an auxiliary handle according to a ninth embodiment.
Figure 28:
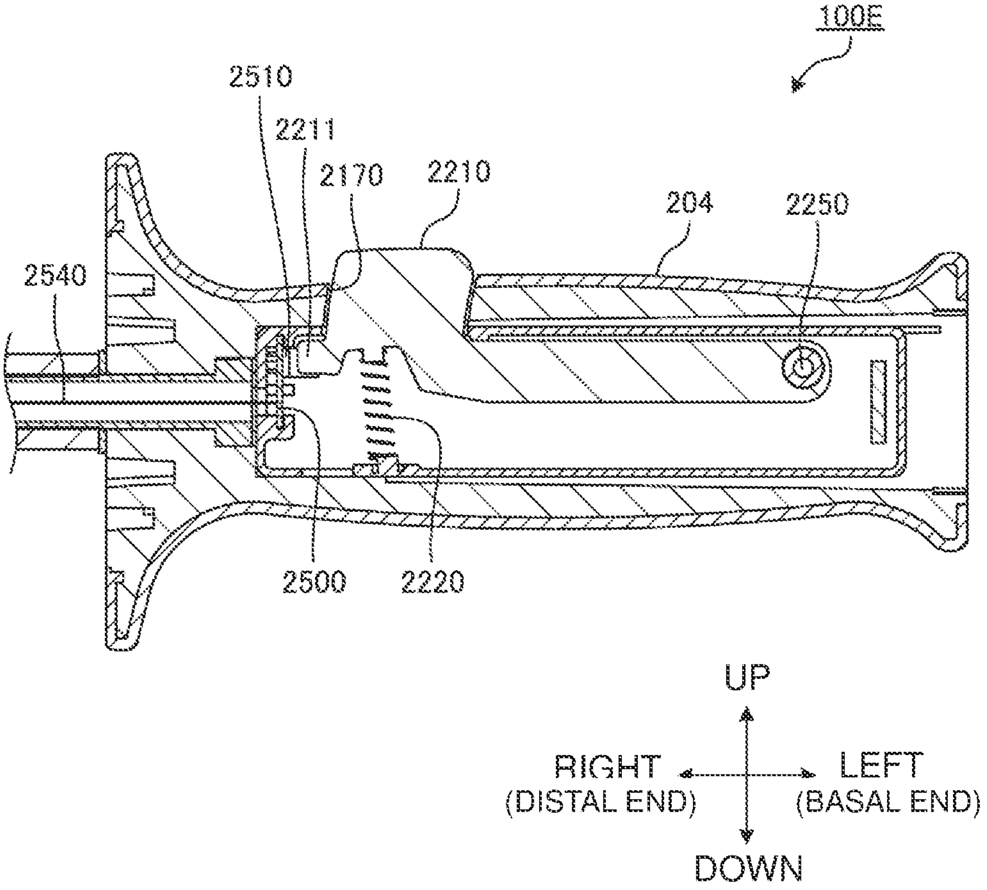
FIG. 28 is a sectional view of a handle in the auxiliary handle according to the ninth embodiment.

FIG. 27 is a side view of an auxiliary handle 100E according to the present embodiment. FIG. 28 is a sectional view of the handle 204 in the auxiliary handle 100E according to the present embodiment.

In the eighth embodiment, the control board 250 and the grip sensor 251 are located in the first arm 201. In the present embodiment, a control board 2500 and a grip sensor 2510 are located in the handle 204.

As shown in FIG. 27, the auxiliary handle 100E includes the signal output unit 252. As in the eighth embodiment, the signal output unit 252 is located at the lower end of the first arm 201.

As shown in FIG. 28, the auxiliary handle 100E includes an operation lever 2210, an elastic member 2220, the control board 2500, and the grip sensor 2510.

The operation lever 2210 is located on the handle 204. A part of the operation lever 2210 is received in an opening 2170 in the handle 204. The opening 2170 connects the inside and the outside of the handle 204. A part of the operation lever 2210 is located in the internal space of the handle 204. A part of the operation lever 2210 protrudes from the outer surface of the handle 204.

The operation lever 2210 is pivotably supported by the handle 204 with a pivot 2250. The pivot 2250 is located in the internal space of the handle 204. The pivot 2250 connects the left end of the operation lever 2210 to the handle 204.

The elastic member 2220 is located in the internal space of the handle 204. The elastic member 2220 is connected to the operation lever 2210 and the handle 204. The elastic member 2220 is a coil spring. In FIG. 28, the upper end of the elastic member 2220 is connected to a lower portion of the operation lever 2210. The lower end of the elastic member 2220 is connected to the handle 204 at the bottom of the internal space.

The elastic member 2220 is compressed between the operation lever 2210 and the handle 204. The elastic member 2220 generates an elastic force (urging force) for moving the operation lever 2210 from the internal space of the handle 204 to the outside.

The control board 2500 is located in the internal space of the handle 204. The control board 2500 is held by the handle 204. The control board 2500 is connected to the grip sensor 2510 and the signal output unit 252.

The grip sensor 2510 is located in the internal space of the handle 204. The grip sensor 2510 is supported by the control board 2500.

The grip sensor 2510 detects movement of the operation lever 2210 to detect the handle 204 being gripped by the operator. The grip sensor 2510 in the present embodiment detects movement of the right end of the operation lever 2210.

When the handle 204 is gripped by the operator, the operation lever 2210 rotates and the position of the right end of the operation lever 2210 changes. The grip sensor 2510 detects the position of the right end of the operation lever 2210 to detect the handle 204 being gripped by the operator. The grip sensor 2510 detects the right end of the operation lever 2210 contactlessly. In the present embodiment, the operation lever 2210 includes a permanent magnet 2211 at its right end. The grip sensor 2510 is a magnetic sensor.

The signal output unit 252 is connected to the control board 2500 with a lead wire 2540. At least a part of the lead wire 2540 is located in the internal space of the rod 203.

When the handle 204 is gripped by the operator, the operation lever 2210 moves into the internal space of the handle 204. The operation lever 2210 then rotates about the pivot 2250. The operation lever 2210 rotates with its right end moving rightward. This shortens the distance between the grip sensor 2510 and the permanent magnet 2211.

The grip sensor 2510 detects the permanent magnet 2211 to detect the right end of the operation lever 2210. The grip sensor 2510 detects the position of the right end of the operation lever 2210 to detect the handle 204 being gripped by the operator. The grip sensor 2510 detects that the handle 204 is gripped by the operator by detecting the position of the right end of the operation lever 2210 having moved rightward. The grip sensor 2510 transmits a detection signal to the control board 2500.

In response to determining that the handle 204 is gripped by the operator based on the detection signal from the grip sensor 2510, the control board 2500 transmits a control signal for activating the signal output unit 252 to the signal output unit 252.

Based on the control signal from the control board 2500, the signal output unit 252 outputs a grip signal indicating that the handle 204 is gripped by the operator. The attachment sensor 70 receives the grip signal from the signal output unit 252. Based on the grip signal received by the attachment sensor 70, the controller 13 in the power tool 1A outputs a control signal for controlling the rotation of the output shaft 6.

In response to a release of the operation on the operation lever 2210, an elastic force from the elastic member 2220 rotates the operation lever 2210 from the internal space of the handle 204 to the outside. The operation lever 2210 rotates with its right end moving leftward.

The grip sensor 2510 detects the position of the right end of the operation lever 2210. The grip sensor 2510 detects that the operation on the operation lever 2210 is released by detecting the position of the right end of the operation lever 2210 having moved rightward.

The grip sensor 2510 transmits a detection signal to the control board 2500.

In response to determining that the operation on the operation lever 2210 is released based on the detection signal from the grip sensor 2510, the control board 2500 transmits a control signal for stopping the activation of the signal output unit 252 to the signal output unit 252.

Based on the control signal from the control board 2500, the signal output unit 252 outputs a grip release signal indicating that the operation on the operation lever 2210 is released. The attachment sensor 70 receives the grip release signal from the signal output unit 252. Based on the grip release signal received by the attachment sensor 70, the controller 13 in the power tool 1A outputs a control signal for controlling the rotation of the output shaft 6.

As described above, the structure according to the present embodiment also controls the rotation of the output shaft 6 to avoid an increase in the rotational load on the output shaft 6 when the auxiliary handle 100D is attached to the power tool 1A but not with its handle 204 gripped by the operator.

Tenth Embodiment

A tenth embodiment will now be described. The same or corresponding components as those in the above embodiments are herein given the same reference numerals, and will be described briefly or will not be described.

Auxiliary Handle

Figure 29:
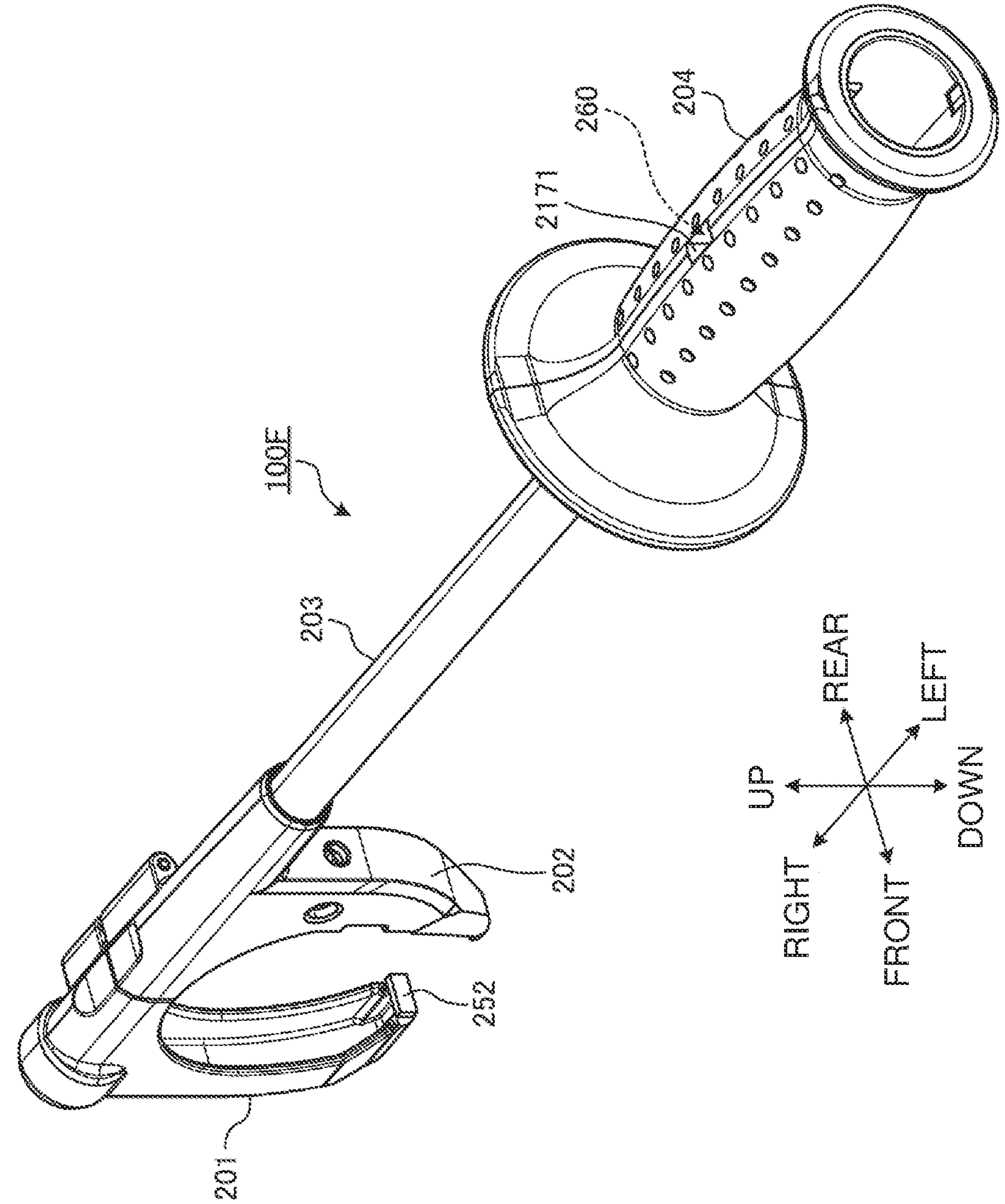
FIG. 29 is a perspective view of an auxiliary handle according to a tenth embodiment.

FIG. 29 is a perspective view of an auxiliary handle 100F according to the present embodiment. As in the above embodiments, the auxiliary handle 100F includes the signal output unit 252 located at the lower end of the first arm 201.

The handle 204 in the present embodiment includes a grip sensor 260 in its internal space. The grip sensor 260 is a photo sensor. The handle 204 has an opening 2171 connecting the inside and the outside of the handle 204. The grip sensor 260 faces the opening 2171.

The grip sensor 260 detects the handle 204 being gripped by the operator. The opening 2171 is covered when the handle 204 is gripped by the operator. Thus, the grip sensor 260 does not receive external light outside the handle 204. The opening 2171 is open when the handle 204 is not gripped by the operator. Thus, the grip sensor 260 receives external light outside the handle 204. The grip sensor 260 detects the handle 204 being gripped by the operator based on input of the external light.

The grip sensor 260 transmits a detection signal to a control board (not shown) located in the auxiliary handle 100F. Based on the detection signal from the grip sensor 260, the control board outputs a control signal to the signal output unit 252. Based on the control signal from the control board 2500, the signal output unit 252 outputs a grip signal indicating that the handle 204 is gripped by the operator. Based on the control signal from the control board 2500, the signal output unit 252 outputs a grip release signal indicating the handle 204 is not gripped by the operator.

As described above, the structure according to the present embodiment also controls the rotation of the output shaft 6 to avoid an increase in the rotational load on the output shaft 6 when the auxiliary handle 100F is attached to the power tool 1A but not with its handle 204 gripped by the operator.

Eleventh Embodiment

An eleventh embodiment will now be described. The same or corresponding components as those in the above embodiments are herein given the same reference numerals, and will be described briefly or will not be described.

Auxiliary Handle

Figure 30:
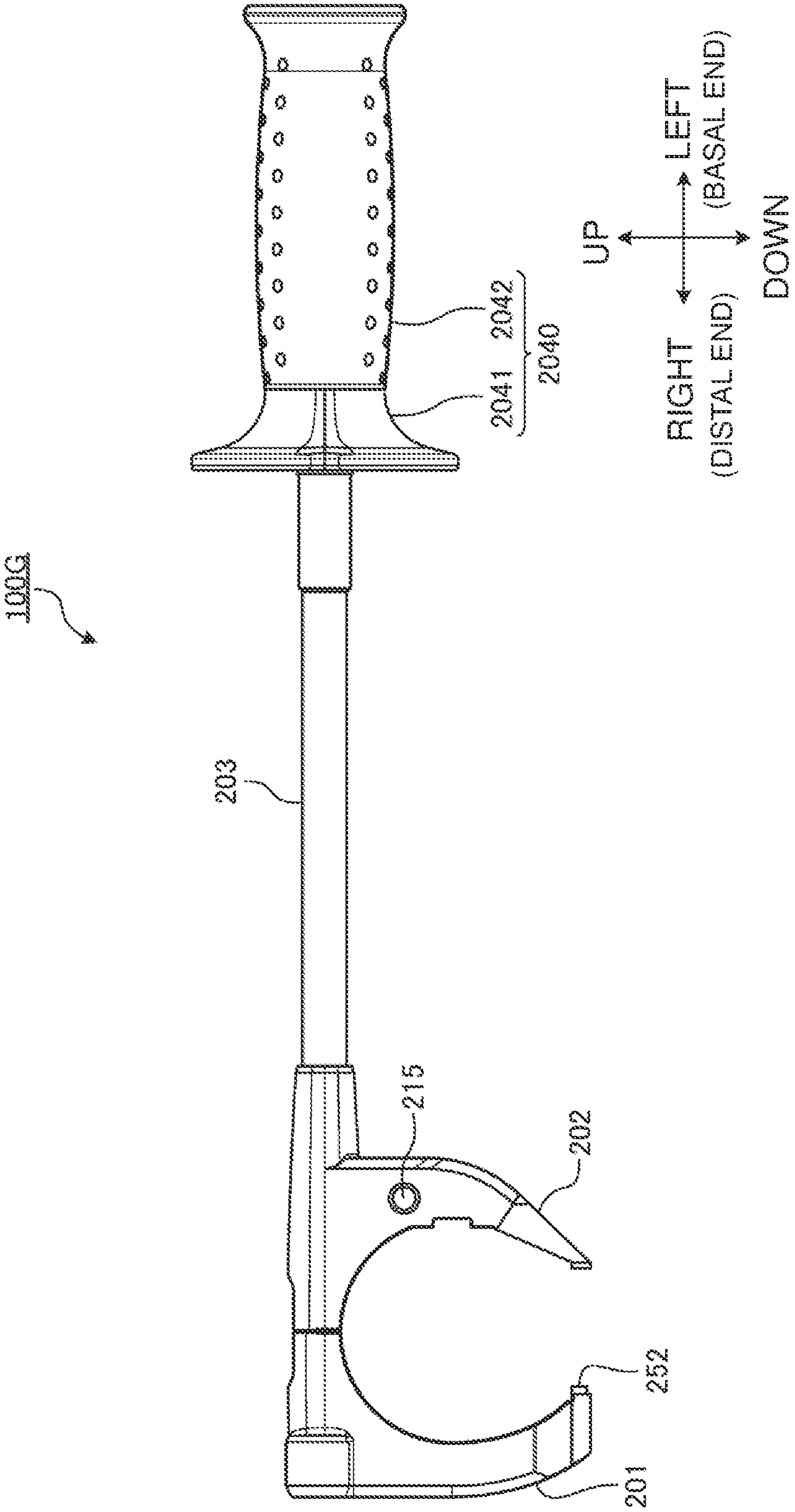
FIG. 30 is a side view of an auxiliary handle according to an eleventh embodiment.
Figure 31:
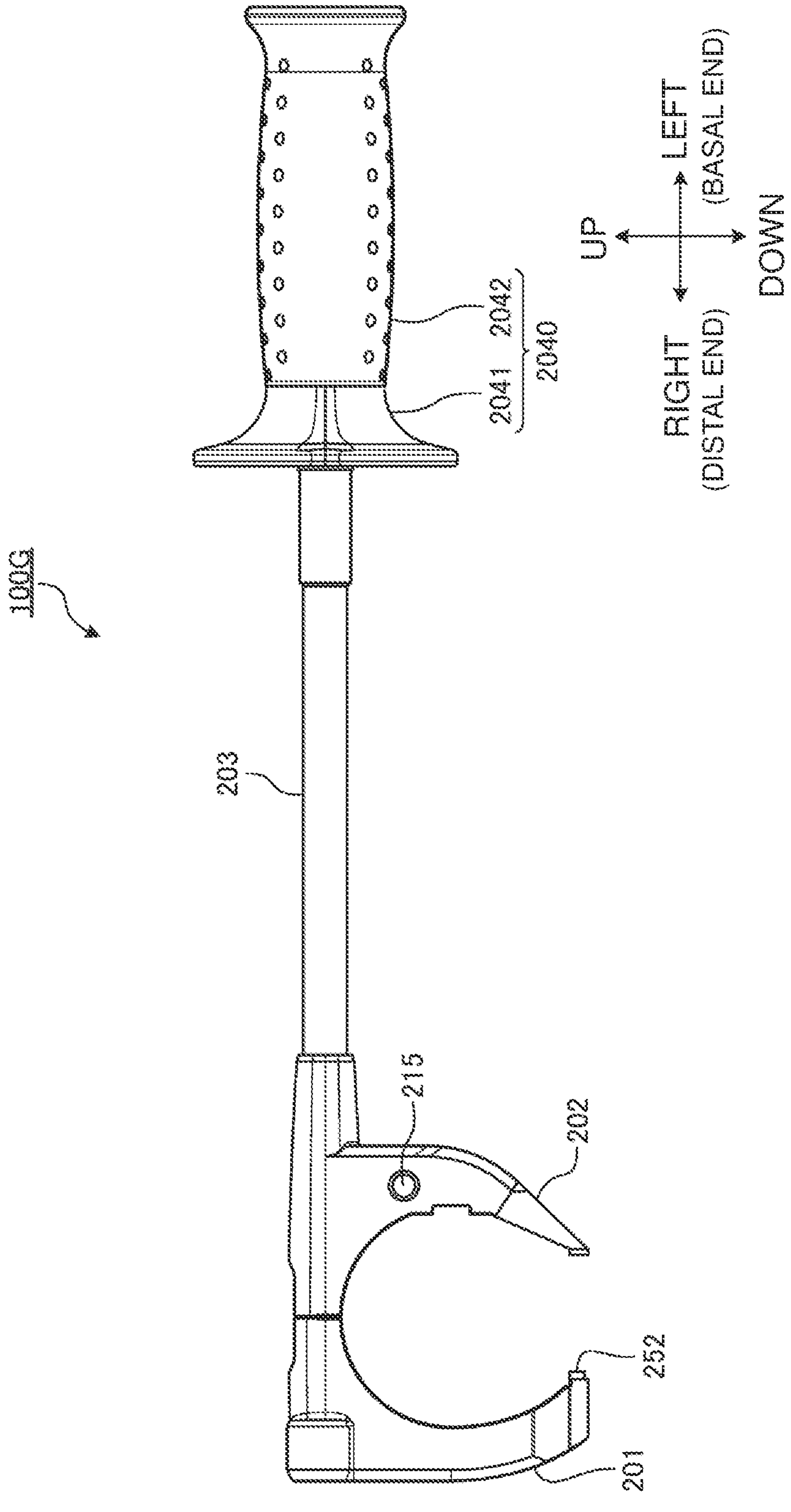
FIG. 31 is a sectional view of the auxiliary handle according to the eleventh embodiment.
Figure 32:
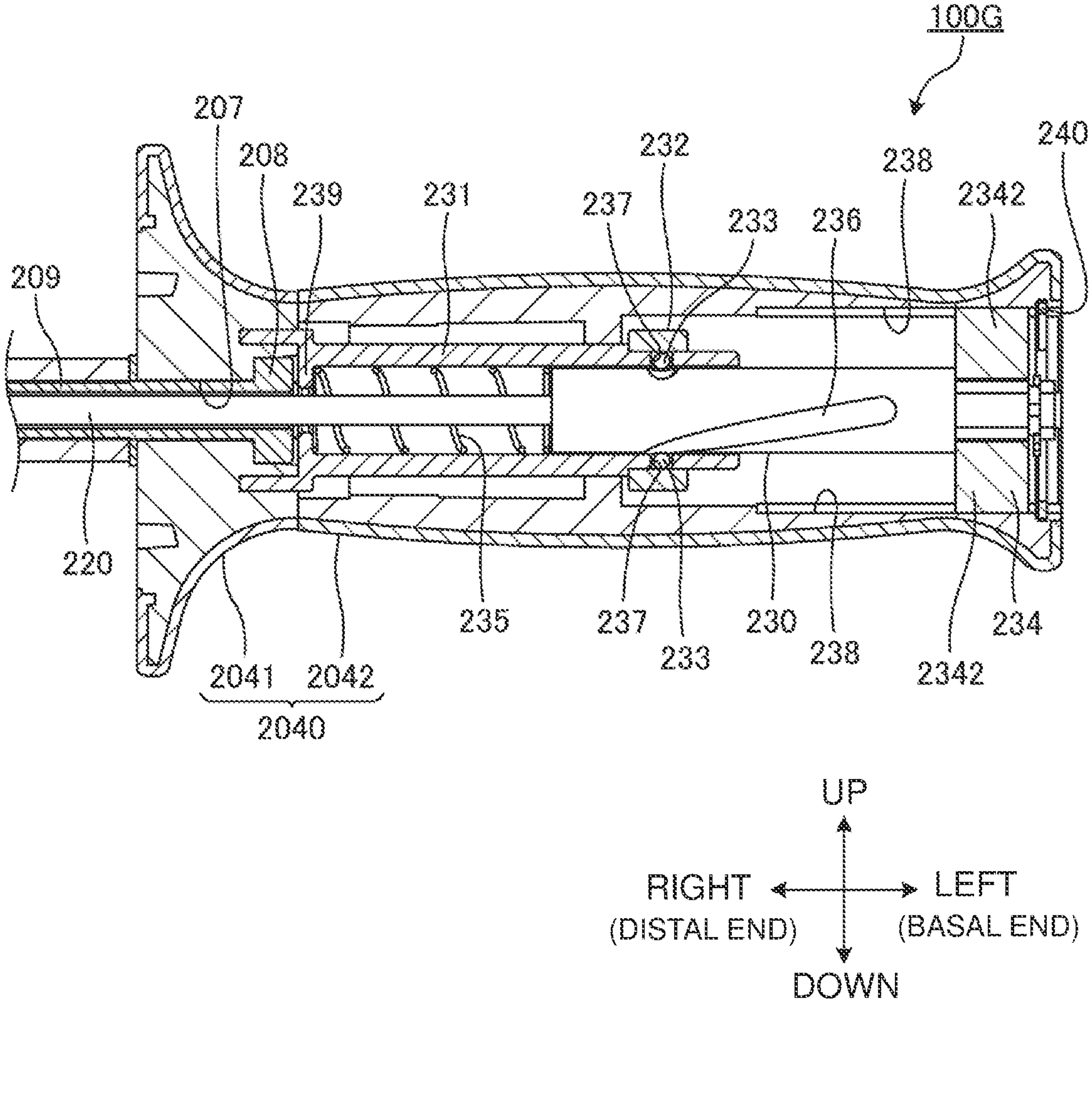
FIG. 32 is a sectional view of a handle in the auxiliary handle according to the eleventh embodiment.
Figure 33:
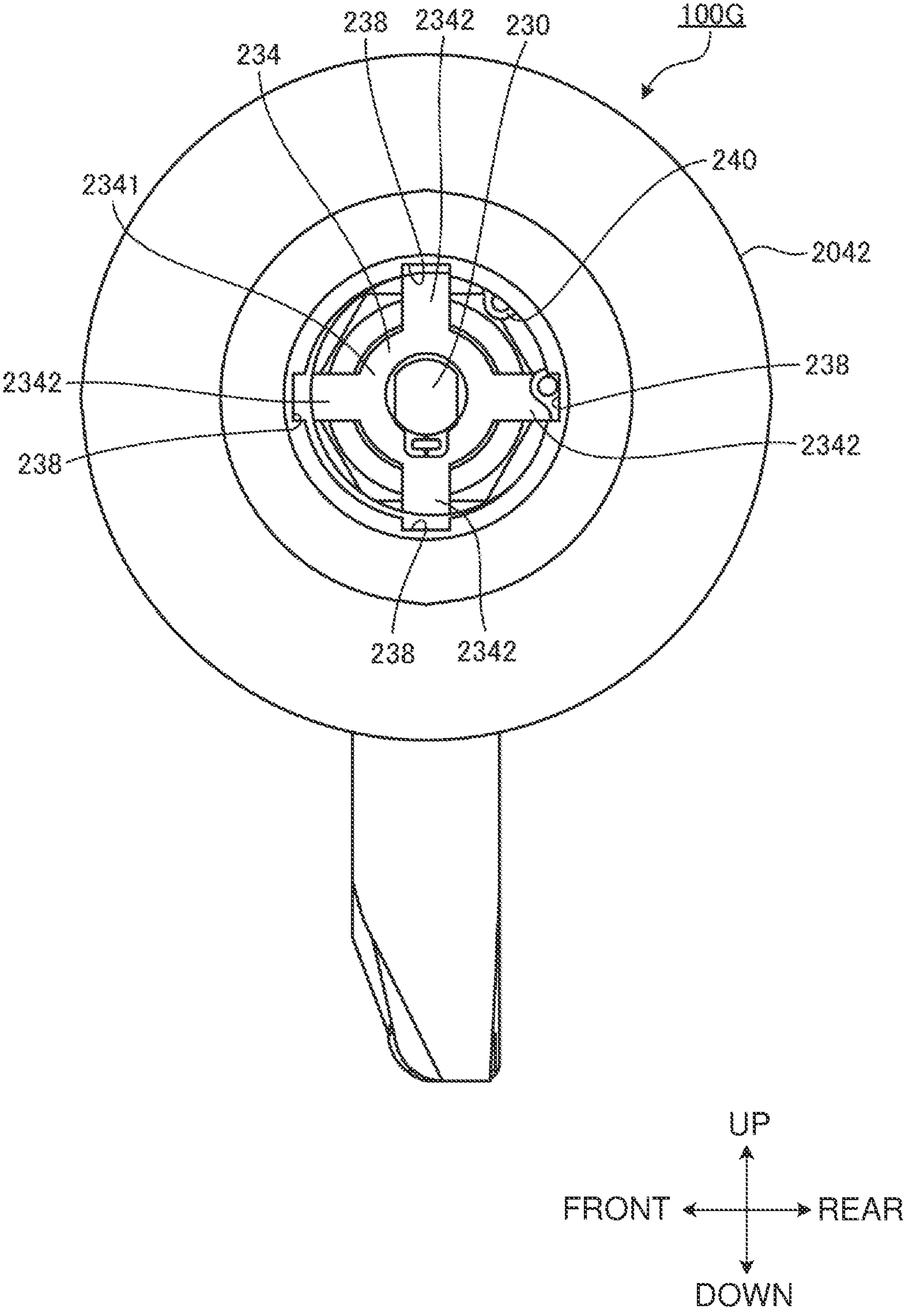
FIG. 33 is a left view of the auxiliary handle according to the eleventh embodiment.

FIG. 30 is a side view of an auxiliary handle 100G according to the present embodiment. FIG. 31 is a sectional view of the auxiliary handle 100G according to the present embodiment. FIG. 32 is a sectional view of the handle 204 in the auxiliary handle 100G according to the present embodiment. FIG. 33 is a left view of the auxiliary handle 100G according to the present embodiment.

The auxiliary handle 100G according to the present embodiment is a modification of the auxiliary handle 100D described in the eighth embodiment. Similarly to the auxiliary handle 100D described in the eighth embodiment, the auxiliary handle 100D includes the first arm 201, the second arm 202, the rod 203, a handle 2040, the pipe 209, the fastener 210, the actuation rod 220, the actuation lever 223, and the second elastic member 224.

The fastener 210 includes the pipe 211 and the slider 212. The pipe 211 is fixed to the first arm 201. The slider 212 is movable relative to the pipe 211. Similarly to the auxiliary handle 100D described in the eighth embodiment, when the operator rotates the handle 2040, the second arm 202 moves in a direction toward the first arm 201 or in a direction away from the first arm 201.

Similarly to the auxiliary handle 100D described in the eighth embodiment, as the actuation rod 220 moves rightward, the actuation lever 223 rotates with the upper end 223A moving rightward and the lower end 223B moving leftward. As the actuation rod 220 moves leftward, an elastic force from the second elastic member 224 rotates the actuation lever 223 with the upper end 223A moving leftward and the lower end 223B moving rightward.

Similarly to the auxiliary handle 100D described in the eighth embodiment, the control board 250 and the grip sensor 251 are located inside the first arm 201. The first arm 201 includes the signal output unit 252 at its lower end. The grip sensor 251 detects the lower end 223B of the actuation lever 223. In response to the lower end 223B of the actuation lever 223 reaching the left, the signal output unit 252 outputs a grip signal. In response to the lower end 223B of the actuation lever 223 reaching the right, the signal output unit 252 outputs a grip release signal.

In the eighth embodiment, the operation lever 221 is operated to move the actuation rod 220 rightward. The auxiliary handle 100G according to the present embodiment includes no operation lever 221. In the present embodiment, the actuation rod 220 moves rightward when the auxiliary handle 100G is attached to at least a part of the power tool 1A and the handle 2040 is rotated by the operator.

The handle 2040 is movable in the rotation direction with the gear case 5 in the power tool 1A fastened between the first arm 201 and the second arm 202. The handle 2040 is rotatable relative to the first arm 201 and the second arm 202 with the gear case 5 of the power tool 1A fastened between the first arm 201 and the second arm 202.

The handle 2040 in the present embodiment includes a distal handle portion 2041 and a basal handle portion 2042. The distal handle portion 2041 is located rightward from (closer to the distal end than) the basal handle portion 2042. The operator twists the handle 2040 in the auxiliary handle 100G attached to the power tool 1A. The handle 2040 rotates as the operator twists it. This moves the actuation rod 220 rightward.

The auxiliary handle 100E includes a pillar 230, a pipe 231, a nut 232, balls 233, a slide member 234, and an elastic member 235.

The pillar 230 is fixed to the left end of the actuation rod 220. In the present embodiment, the pillar 230 and the actuation rod 220 are integral with each other. The pillar 230 has a helical groove 236 on its surface.

The pipe 231 surrounds the pillar 230. At least a part of the pillar 230 is located inside the pipe 231. The pipe 231 has its right end fixed to the distal handle portion 2041.

The nut 232 surrounds the pipe 231. The nut 232 is fastened to the pipe 231.

The balls 233 are received in holes 237 located in the pipe 231. The holes 237 extend through the inner and outer surfaces of the pipe 231. The balls 233 are held by the nut 232. The inner surface of the nut 232 faces the balls 233. A part of each ball 233 is received in the groove 236. The balls 233 move along the groove 236.

The slide member 234 is fixed to the left end of the pillar 230. As shown in FIG. 33, the slide member 234 includes a ring portion 2341 and protrusions 2342. The ring portion 2341 surrounds the pillar 230. The protrusions 2342 protrude radially outward from the ring portion 2341. The ring portion 2341 is fixed to the pillar 230. Four protrusions 2342 are arranged along the circumference of the ring portion 2341 at intervals.

The basal handle portion 2042 has the inner surface including guide grooves 238. The guide grooves 238 extend laterally. At least a part of each protrusion 2342 is received in the corresponding guide groove 238. The guide grooves 238 guide the protrusions 2342 in the lateral direction. With the protrusions 2342 received in the guide grooves 238, the basal handle portion 2042 and the slide member 234 are less likely to rotate relative to each other.

A circlip 240 is located at the left end of the slide member 234. The circlip 240 prevents the slide member 234 from slipping off from an internal space of the basal handle portion 2042.

The elastic member 235 is located inside the pipe 231. The elastic member 235 is a coil spring. The elastic member 235 surrounds the actuation rod 220. The elastic member 235 has its right end supported by the left surface of a support 239 located at the right end of the pipe 231. The elastic member 235 has its left end supported by the right end face of the pillar 230. The elastic member 235 is compressed between the left surface of the support 239 and the right end face of the pillar 230.

When the handle 2040 is rotated with the gear case 5 between the first arm 201 and the second arm 202, the first arm 201 and the second arm 202 move toward each other and fasten the gear case 5 between them. When the handle 2040 is twisted further, the pipe 231 rotates inside the handle 2040.

The balls 233 are received in the holes 237 in the pipe 231. The balls 233 are held by the pipe 231. A part of each ball 233 is received in the groove 236 on the pillar 230. As the pipe 231 rotates, the pillar 230 is pulled by the balls 233 and moves rightward.

The protrusions 2342 of the slide member 234 are received in the guide grooves 238. The pillar 230 and the slide member 234 are fixed to each other. Thus, the handle 2040 is less likely to rotate relative to the pillar 230 and the slide member 234.

As the pillar 230 moves rightward, the slide member 234 fixed to the pillar 230 moves rightward. The slide member 234 moves rightward while being guided along the guide grooves 238. As the slide member 234 is guided along the guide grooves 238, the pillar 230 moves rightward without rotating.

As the pillar 230 moves rightward, the actuation rod 220 fixed to the pillar 230 moves rightward. As in the eighth embodiment, the actuation lever 223 rotates with the upper end 223A moving rightward and the lower end 223B moving leftward. In response to the lower end 223B reaching the left, the signal output unit 252 outputs a grip signal.

In response to a release of the twisting operation on the handle 2040, the pillar 230 moves leftward under an elastic force from the elastic member 235. This moves the actuation rod 220 leftward. As the pillar 230 moves leftward, the pipe 231 is pulled by the balls 233 and rotates. As in the eighth embodiment, as the actuation rod 220 moves leftward, the actuation lever 223 rotates with the upper end 223A moving leftward and the lower end 223B moving rightward under an elastic force from the second elastic member 224. In response to the lower end 223B of the actuation lever 223 reaching the right, the signal output unit 252 outputs a grip release signal.

As described above, at least a portion of the handle 2040 is twisted to move the actuation rod 220 and the actuation lever 223 in the present embodiment.

Twelfth Embodiment

A twelfth embodiment will now be described. The same or corresponding components as those in the above embodiments are herein given the same reference numerals, and will be described briefly or will not be described.

Auxiliary Handle

Figure 34:
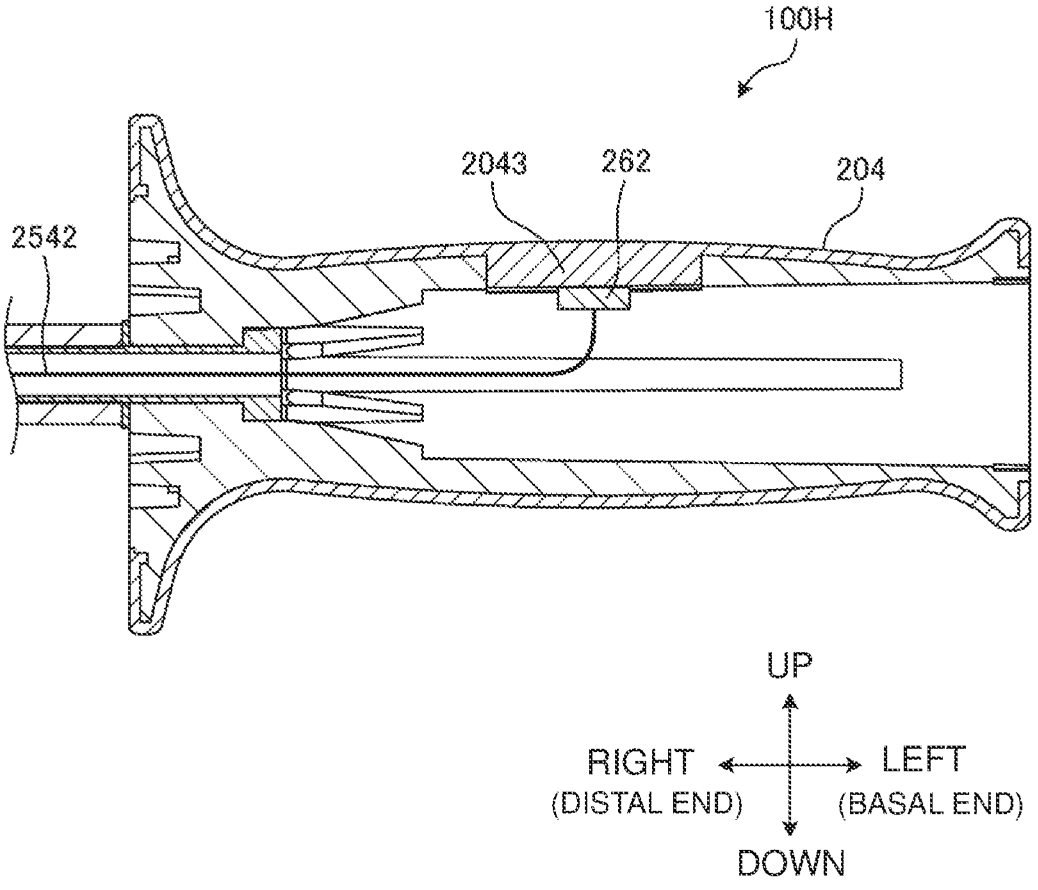
FIG. 34 is a sectional view of a handle in an auxiliary handle according to a twelfth embodiment.

FIG. 34 is a sectional view of the handle 204 in an auxiliary handle 100H according to the present embodiment.

In the present embodiment, the handle 204 includes a grip sensor 262 in its internal space. The grip sensor 262 is a pressure sensor. The handle 204 includes a protrusion 2043 on the upper surface defining its internal space. The protrusion 2043 protrudes downward from the upper surface of the internal space in the handle 204. The protrusion 2043 is formed from rubber. The outer surface of the protrusion 2043 is a part of the surface of the handle 204. The lower surface of the protrusion 2043 is in contact with the grip sensor 262.

The grip sensor 262 detects the handle 204 being gripped by the operator. When the operator grips the handle 204, the grip sensor 262 receives a force from the protrusion 2043. The grip sensor 262 detects the handle 204 being gripped by the operator by detecting the force applied from the protrusion 2043.

The detection signal from the grip sensor 262 is transmitted through a lead wire 2542 to a control board (not shown) located in the auxiliary handle 100H. As in the above embodiments, the auxiliary handle 100H includes the signal output unit 252 located at the lower end of the first arm 201. Based on the detection signal from the grip sensor 262, the control board outputs a control signal to the signal output unit 252.

When the grip sensor 262 detects that the handle 204 is gripped by the operator, the signal output unit 252 outputs a grip signal. When the grip sensor 262 detects that the handle 204 is not gripped by the operator, the signal output unit 252 outputs a grip release signal.

As described above, the structure according to the present embodiment also controls the rotation of the output shaft 6 to avoid an increase in the rotational load on the output shaft 6 when the auxiliary handle 100H is attached to the power tool 1A but not with its handle 204 gripped by the operator.

Thirteenth Embodiment

A thirteenth embodiment will now be described. The same or corresponding components as those in the above embodiments are herein given the same reference numerals, and will be described briefly or will not be described.

Figure 35:
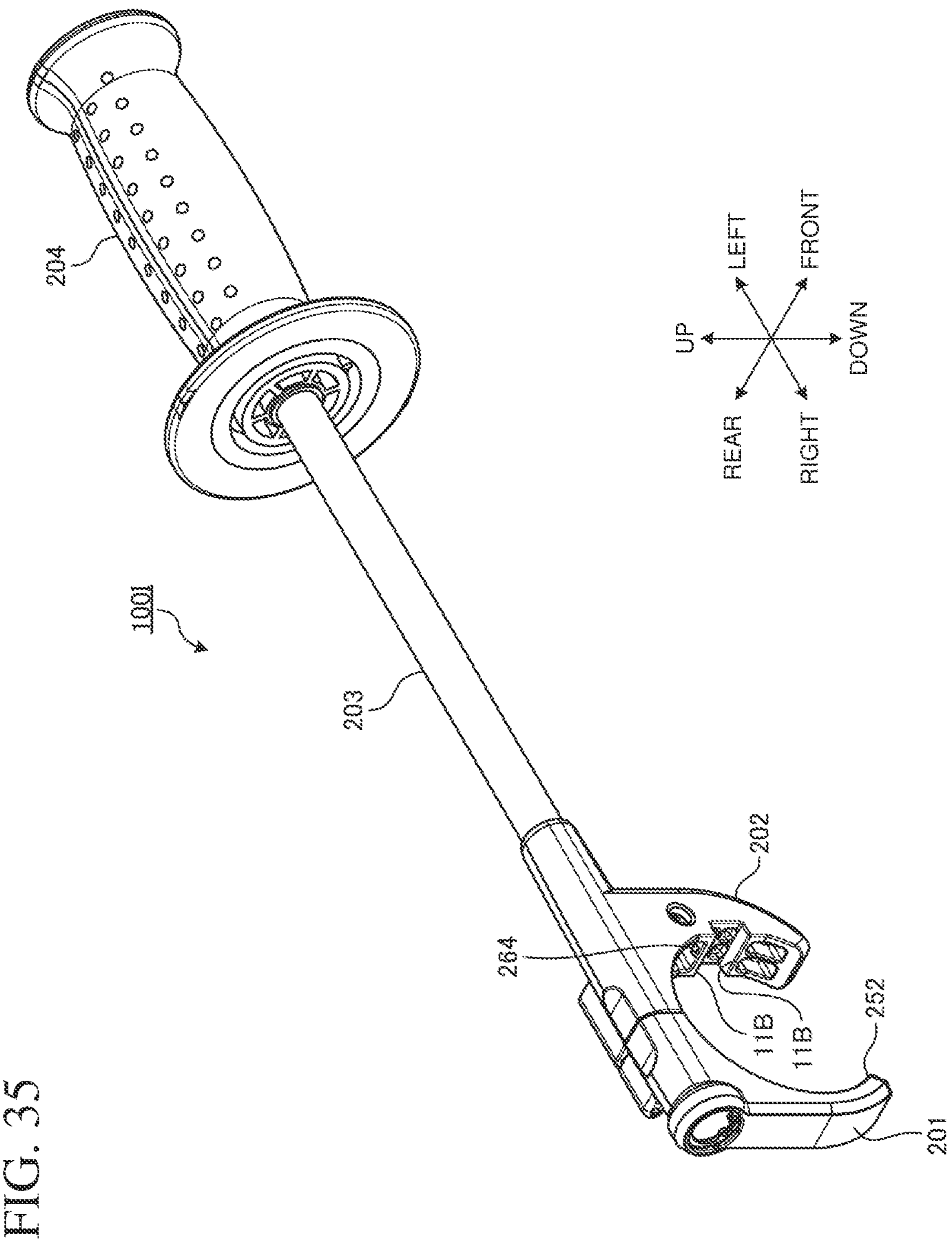
FIG. 35 is a perspective view of an auxiliary handle according to a thirteenth embodiment.
Figure 36:
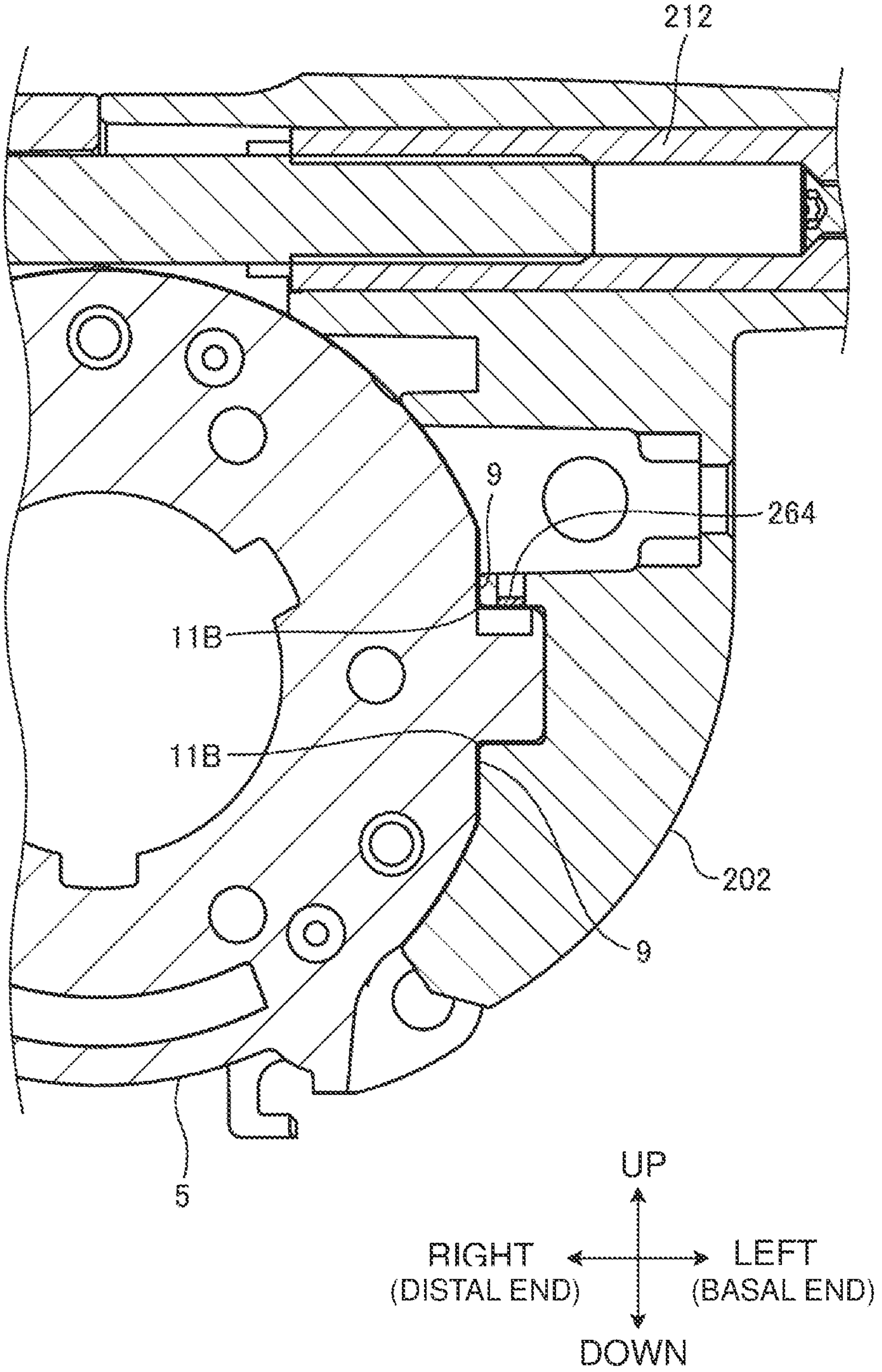
FIG. 36 is a sectional view of a second arm in the auxiliary handle according to the thirteenth embodiment.

FIG. 35 is a perspective view of an auxiliary handle 100I according to the present embodiment. FIG. 36 is a sectional view of the second arm 202 in the auxiliary handle 100I according to the present embodiment.

As in the embodiments described above, the auxiliary handle 100I includes the joints 11B engageable with the engaging portions 9 of the gear case 5. The joints 11B are located on the second arm 202.

In the present embodiment, a grip sensor 264 is located at the joints 11B. The grip sensor 264 is a pressure sensor.

During work with a rotating output shaft 6, the auxiliary handle 100I receives a higher torque when the auxiliary handle 100I is attached to at least a part of the power tool 1A with the operator gripping the handle 204. Thus, the grip sensor 264 detects a high pressure. During work with a rotating output shaft 6, however, the grip sensor 264 does not detect a high pressure when the handle 204 is not gripped by the operator. Thus, the grip sensor 264 detects the handle 204 being gripped by the operator with the output shaft 6 rotating.

The grip sensor 264 transmits a detection signal to a control board (not shown) located in the auxiliary handle 100I. The auxiliary handle 100I includes the signal output unit 252 located at the lower end of the first arm 201. Based on the detection signal from the grip sensor 264, the control board outputs a control signal to the signal output unit 252.

When the grip sensor 264 detects that the handle 204 is gripped, the signal output unit 252 outputs a grip signal. In the present embodiment, the controller 13 in the power tool 1A increases the threshold gradually based on the grip signal with the output shaft 6 rotating. When the grip sensor 264 detects that the handle 204 is not gripped, the signal output unit 252 outputs a grip release signal. The controller 13 in the power tool 1A reduces the threshold gradually based on the grip release signal with the output shaft 6 rotating.

As described above, the grip sensor 264 in the present embodiment detects the handle 204 being gripped by the operator after the power tool 1A starts operating with the rotating output shaft 6. The structure according to the present embodiment also controls the rotation of the output shaft 6 to avoid an increase in the rotational load on the output shaft 6 when the auxiliary handle 100I is attached to the power tool 1A but not with its handle 204 gripped by the operator.

Modification

In the embodiments described above, the actuation lever 223 (2230) may be pivotably supported by the second arm 202 with a pivot.

OTHER EMBODIMENTS

Although the embodiments described above include the engaging portions 9 located on the gear case 5, the engaging portions 9 may be located on the motor compartment 2A. The engaging portions 9 may be located on, for example, side portions of the motor compartment 2A.

In the embodiments described above, the engaging portions 9 may be located in front of either the mode change ring 17 or the change ring 18. In other words, the engaging portions 9 may be located on at least a part of the power tool.

In the embodiments described above, the mode change ring 17 and the change ring 18 may be integral with each other. In other words, one ring may be used to switch the operation mode and set the release value for disabling power transmission to the output shaft 6.

REFERENCE SIGNS LIST

1A power tool
1B power tool
1C power tool
1D power tool
1E power tool
25 1F power tool
1G power tool
2 housing
2A motor compartment
2B grip
2C controller compartment
3 rear cover
4A inlet
4B outlet
5 gear case
5A first gear case
5B second gear case
5C protrusion
5D threaded hole
6 output shaft
7 battery mount
8 motor
9 engaging portion
9L left engaging portion
9R right engaging portion
10 power transmission
11 joint
12 battery
12C release button
13 controller
13A determiner
13B threshold setter
13C motor controller
13D determiner
13E actuator controller
13F determiner
13G threshold setter
13H motor controller
13I determiner
13J torque range setter
13K motor controller
13L determiner
13M motor controller
13N determiner
13O threshold setter
13P motor controller
13Q determiner
13R torque range setter
13S motor controller
14 trigger switch
14A trigger
14B switch body
15 forward-reverse switch lever
16 speed switch lever
17 mode change ring
17A operation ring
17B cam ring
18 change ring
19 lamp
20 reducer
21 first planetary gear assembly
21C first carrier
21P planetary gear
21R internal gear
21S pinion gear
22 second planetary gear assembly
22C second carrier
22P planetary gear
22R internal gear

22S sun gear
23 third planetary gear assembly
23C third carrier
23P planetary gear
23R internal gear
23S sun gear
24 speed switch ring
25 connection ring
30 vibrator
31 first cam
32 second cam
33 vibration switch lever
33A opposing portion
34 coil spring
40 clutch assembly
41 spring holder
42 coil spring
43 washer
45 coupling ring
61 spindle
62 chuck
63 bearing
64 bearing
70 attachment sensor
71 inverter
72 actuator
73 connector
74 accelerometer
75 dial
76 position sensor
77 attachment sensor
81 stator
81A stator core
81B front insulator
81C rear insulator
81D coil
81E sensor circuit board
81F connection wire
82 rotor
82A rotor shaft
82B rotor core
82C permanent magnet
83 bearing
84 bearing
85 centrifugal fan
100A auxiliary handle
100B first auxiliary handle
100C second auxiliary handle
101 first arm
102 second arm
103 rod
103A smaller-diameter portion
103B larger-diameter portion
104 handle
105 through-hole
106 through-hole
107 through-hole
108 nut
100D auxiliary handle
100E auxiliary handle
100F auxiliary handle
100G auxiliary handle
100H auxiliary handle
100I auxiliary handle
110 fastener
111 rod
112 slider
113 guide
114 nut
115 through-hole
116 dial
117 permanent magnet
118 rod
118B larger-diameter portion
118C threaded portion
119 handle
201 first arm
202 second arm
203 rod
204 handle
205 through-hole
206 through-hole
207 through-hole
208 nut
209 pipe
210 fastener
211 pipe
212 slider
214 nut
215 through-hole
216 washer
217 opening
220 actuation rod (actuation portion)
221 operation lever (operable portion)
222 first elastic member
223 actuation lever (actuation portion)
223A upper end
223B lower end
223C middle portion
224 second elastic member
225 pivot
226 protrusion
227 recess
228 pivot
230 pillar
231 pipe
232 nut
233 ball
234 slide member
2341 ring portion
2342 protrusion
235 elastic member
236 groove
237 hole
238 guide groove
239 support
240 circlip
250 control board
251 grip sensor
252 signal output unit
253 battery
254 lead wire
260 grip sensor
262 grip sensor
264 grip sensor
2170 opening
2171 opening
2210 operation lever
2211 permanent magnet
2250 pivot
2220 elastic member
2040 handle
2041 distal handle portion
2042 basal handle portion

2043 protrusion
2500 control board
2510 grip sensor
2540 lead wire
2542 lead wire
AX rotation axis

The invention claimed is:

1. An auxiliary handle attachable to a power tool, the auxiliary handle comprising:

a first arm;

a second arm configured to fasten, together with the first arm, at least a part of the power tool between the first arm and the second arm;

a handle;

an operable portion movable with the first arm and the second arm;

an actuation portion movable in response to movement of the operable portion;

a grip sensor configured to detect movement of the actuation portion so as to detect the handle being gripped with the first arm and the second arm that fasten at least the part of the power tool in between; and a signal output unit configured to output, to the power tool, a grip signal indicating that the handle is gripped based on a detection signal from the grip sensor.

2. The auxiliary handle according to claim 1, wherein the signal output unit is located in at least one of the first arm and the second arm.

3. The auxiliary handle according to claim 1, wherein the grip sensor is located in at least one of the first arm and the second arm, and the actuation portion is located in at least one of the first arm and the second arm.

4. The auxiliary handle according to claim 1, wherein the grip sensor detects movement of the operable portion to detect the handle being gripped.

5. The auxiliary handle according to claim 1, wherein the operable portion includes an operation lever pivotably supported by the handle with a first pivot.

6. A power tool to which an auxiliary handle is attachable, the power tool comprising:

a motor;

a housing including a motor compartment accommodating the motor;

a gear case located in front of the motor compartment;

an output shaft protruding frontward from the gear case and rotatable with a rotational force from the motor;

an attachment sensor configured to detect the auxiliary handle being attached; and a controller configured (i) to set a threshold for rotation of the output shaft based on a detection signal from the attachment sensor and (ii) to output a control signal to control rotation of the output shaft based on the threshold, wherein:

the threshold includes a threshold for a rotational load on the output shaft;

the control signal includes a control signal to stop rotation of the motor in response to the rotational load exceeding the threshold; and based on the detection signal from the attachment sensor, the threshold is set by the controller to a first torque value in response to determining that the auxiliary handle is attached and to a second torque value less than the first torque value in response to determining that the auxiliary handle is not attached.

7. The power tool according to claim 6, wherein the threshold includes a threshold for acceleration of the housing, the control signal includes a control signal to stop rotation of the motor in response to the acceleration exceeding the threshold, and the controller sets, based on the detection signal from the attachment sensor, the threshold to a first acceleration value in response to determining that the auxiliary handle is attached and to a second acceleration value less than the first acceleration value in response to determining that the auxiliary handle is not attached.

8. The power tool according to claim 6, further comprising:

a speed switch lever configured to switch a rotational speed of the output shaft between a high-speed mode and a low-speed mode; and an actuator configured to operate the speed switch lever, wherein the controller controls, based on the detection signal from the attachment sensor, the actuator to enter the high-speed mode in response to determining that the auxiliary handle is not attached.

9. The power tool according to claim 8, wherein the controller controls, based on the detection signal from the attachment sensor, the actuator to enter the low-speed mode in response to determining that the auxiliary handle is attached.

10. The power tool according to claim 6, further comprising:

a speed switch lever configured to switch a rotational speed of the output shaft between a high-speed mode and a low-speed mode; and a position sensor configured to detect a position of the speed switch lever, wherein the controller disables, based on the detection signal from the attachment sensor and a detection signal from the position sensor, rotation of the motor in response to determining that the auxiliary handle is not attached and that the low-speed mode is set.

11. The power tool according to claim 10, wherein the controller causes to rotate, based on the detection signal from the attachment sensor and the detection signal from the position sensor, the motor in response to determining that the auxiliary handle is not attached and that the high-speed mode is set.

12. The power tool according to claim 10, wherein the controller causes to rotate, based on the detection signal from the attachment sensor and the detection signal from the position sensor, the motor in response to determining that the auxiliary handle is attached.

13. The power tool according to claim 6, wherein the threshold includes a threshold for acceleration of the housing, the control signal includes a control signal to stop rotation of the motor in response to the acceleration exceeding the threshold, the attachment sensor determines a length of the auxiliary handle, and the controller sets, based on the detection signal from the attachment sensor, the threshold to a first acceleration value in response to determining that the auxiliary handle being attached has a first length, to a second acceleration value less than the first acceleration value in response to determining that the auxiliary handle being attached has a second length shorter than the first length, and to a third acceleration value less than the second acceleration value in response to determining that the auxiliary handle is not attached.

14. The power tool according to claim 6, wherein in a clutch mode in which rotation of the motor is stopped in response to a rotational load on the output shaft reaching a release value, the controller sets a torque range indicating a range of release values, the attachment sensor determines a length of the auxiliary handle, the controller sets, based on the detection signal from the attachment sensor, the torque range to a first torque range in response to determining that the auxiliary handle being attached has a first length, to a second torque range in response to determining that the auxiliary handle being attached has a second length shorter than the first length, and to a third torque range in response to determining that the auxiliary handle is not attached, the third torque range has a maximum value less than the second torque range, and the second torque range has a maximum value less than the first torque range.

15. The power tool according to claim 6, wherein the attachment sensor detects the auxiliary handle being attached and at least a part of the auxiliary handle being gripped, and the controller outputs the control signal based on the detection signal from the attachment sensor.

16. The power tool according to claim 15, wherein the auxiliary handle includes a signal output unit to output a grip signal indicating that at least the part of the auxiliary handle is gripped, and the attachment sensor detects at least the part of the auxiliary handle being gripped based on the grip signal.

17. A power tool to which an auxiliary handle is attachable, the power tool comprising:

a motor;

a housing including a motor compartment accommodating the motor;

a gear case located in front of the motor compartment;

an output shaft protruding frontward from the gear case and rotatable with a rotational force from the motor;

an attachment sensor configured to detect the auxiliary handle being attached; and a controller configured to:

output a control signal to control rotation of the output shaft based on a detection signal from the attachment sensor;

in a clutch mode in which rotation of the motor is stopped in response to a rotational load on the output shaft reaching a release value, set a torque range indicating a range of release values; and set, based on the detection signal from the attachment sensor, the torque range to a first torque range in response to determining that the auxiliary handle is attached and to a second torque range in response to determining that the auxiliary handle is not attached, wherein the second torque range has a maximum value less than the first torque range.

* * * * *